US008193713B2

(12) United States Patent
Jung et al.

(10) Patent No.: US 8,193,713 B2
(45) Date of Patent: Jun. 5, 2012

(54) APPARATUS AND A METHOD COMPRISING ILLUMINATION LIGHTING FIXTURE AND SENSOR

(75) Inventors: Edward K. Y. Jung, Bellevue, WA (US); Roderick A. Hyde, Redmond, WA (US); Muriel Y. Ishikawa, Livermore, CA (US); Jordin T. Kare, Seattle, WA (US); Nathan P. Myhrvold, Medina, WA (US); Clarence T. Tegreene, Bellevue, WA (US); Charles Whitmer, North Bend, WA (US); Lowell L. Wood, Jr., Bellevue, WA (US); Victoria Y. H. Wood, Livermore, WA (US)

(73) Assignee: The Invention Science Fund I, LLC

( * ) Notice: Subject to any disclaimer, the term of this patent is extended or adjusted under 35 U.S.C. 154(b) by 856 days.

(21) Appl. No.: 12/291,021

(22) Filed: Oct. 30, 2008

(65) Prior Publication Data

US 2010/0109536 A1 May 6, 2010

(51) Int. Cl.

| | |
|---|---|
| ***H05B 37/02*** | (2006.01) |
| ***H05B 39/04*** | (2006.01) |
| ***H05B 41/36*** | (2006.01) |
| *H05B 37/00* | (2006.01) |
| *H05B 39/00* | (2006.01) |
| *G03B 15/02* | (2006.01) |
| *G05B 19/18* | (2006.01) |

(52) U.S. Cl. ........ 315/158; 315/160; 315/161; 315/162; 315/164; 362/5; 362/11; 362/249.02; 700/56; 700/59; 700/60

(58) Field of Classification Search .................. 315/158, 315/160–162, 164; 362/5, 11, 249.02; 700/56, 700/59–60

See application file for complete search history.

(56) References Cited

U.S. PATENT DOCUMENTS

| | | | | |
|---|---|---|---|---|
| 5,597,223 | A | 1/1997 | Watanabe et al. | |
| 6,702,453 | B2 | 3/2004 | Weedon | |
| 6,774,584 | B2 * | 8/2004 | Lys et al. | 315/362 |
| 6,796,685 | B1 | 9/2004 | Nemirow | |
| 6,799,865 | B2 | 10/2004 | Ellens et al. | |
| 6,815,906 | B1 | 11/2004 | Aarons et al. | |
| 6,906,465 | B2 | 6/2005 | Cavallaro | |
| 7,012,376 | B2 | 3/2006 | Yamashita et al. | |
| 7,014,336 | B1 * | 3/2006 | Ducharme et al. | 362/231 |
| 7,042,158 | B2 | 5/2006 | Nishio et al. | |
| 7,061,191 | B2 | 6/2006 | Chitta | |
| 7,083,293 | B2 | 8/2006 | Kalinski | |
| 7,246,919 | B2 | 7/2007 | Porchia et al. | |
| 7,293,897 | B2 | 11/2007 | Mendelsohn | |
| 7,387,405 | B2 * | 6/2008 | Ducharme et al. | 362/231 |

(Continued)

OTHER PUBLICATIONS

"Compact Fluorescent Lamp"; Wikipedia, the free encyclopedia; Bearing a date of Oct. 16, 2007; pp. 1-13; Wikipedia.

(Continued)

*Primary Examiner* — Ramesh Patel

(57) ABSTRACT

One aspect relates to combining an at least one primary general illumination lighting with an at least one LED-based secondary general illumination lighting. The aspect further comprises sensing an at least one sensed electric characteristics used to produce the at least one primary general illumination lighting. The aspect further comprises controlling an optical characteristic of the at least one LED-based secondary general illumination lighting at least partially responsive to the sensing the at least one sensed electric characteristics used to produce the at least one primary general illumination lighting.

75 Claims, 18 Drawing Sheets

U.S. PATENT DOCUMENTS

| | | | | |
|---|---|---|---|---|
| 7,425,453 | B1 | 9/2008 | Hutchens et al. | |
| 7,482,565 | B2 * | 1/2009 | Morgan et al. | 250/205 |
| 7,543,951 | B2 | 6/2009 | Koerner et al. | |
| 7,764,026 | B2 * | 7/2010 | Dowling et al. | 315/307 |
| 7,959,320 | B2 * | 6/2011 | Mueller et al. | 362/231 |
| 2006/0146527 | A1 | 7/2006 | VanderSchuit | |
| 2007/0297169 | A1 * | 12/2007 | Holmes | 362/227 |
| 2008/0001551 | A1 | 1/2008 | Abbondanzio et al. | |
| 2008/0106887 | A1 | 5/2008 | Salsbury et al. | |
| 2008/0224849 | A1 * | 9/2008 | Sirhan | 340/521 |
| 2008/0273331 | A1 * | 11/2008 | Moss et al. | 362/294 |
| 2009/0167483 | A1 * | 7/2009 | Jones et al. | 340/3.7 |
| 2009/0194670 | A1 * | 8/2009 | Rains et al. | 250/205 |
| 2009/0303705 | A1 | 12/2009 | Waumans et al. | |
| 2010/0110682 | A1 * | 5/2010 | Jung et al. | 362/249.02 |
| 2010/0204841 | A1 * | 8/2010 | Chemel et al. | 700/282 |

OTHER PUBLICATIONS

"Electrical Ballast"; Wikipedia, the free encyclopedia; Bearing a date of Sep. 26, 2007; pp. 1-7; Wikipedia.

"Fluorescent Lamp"; Wikipedia, the free encyclopedia; Bearing a date of Oct. 11, 2007; pp. 1-14; Wikipedia.

GE Lighting, Frequently Asked Questions-Halogen; Commercial Products & Solutions; 1997-2008; pp. 1-5; General Electric Company.

Stern, David P.; Peredo, Mauricio; "#7a. The Fluorescent Lamp: A Plasma you can use"; Bearing a date of Nov. 25, 2001; pp. 1-3.

* cited by examiner

APPARATUS AND A METHOD COMPRISING ILLUMINATION LIGHTING FIXTURE AND SENSOR

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

1. For purposes of the USPTO extra-statutory requirements, the present application constitutes a continuation-in-part of U.S. patent application Ser. No. 12/291,022, entitled "LED Based Secondary General Illumination Lighting Component Color Slaved To Alternate General Illumination Lighting", naming Edward K. Y. Jung, Jordin T. Kare; Roderick A. Hyde, Muriel Y. Ishikawa, Nathan P. Myhrvold, Clarence T. Tegreene, Charles Whitmer, Lowell L. Wood, Jr. and Victoria Y. H. Wood, as inventors, filed contemporaneously herewith.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

Certain aspects of this disclosure can relate to, but are not limited and, a variety of embodiment of general illumination lighting device or systems, and associated devices and/or techniques.

DETAILED DESCRIPTION

Figure 1:
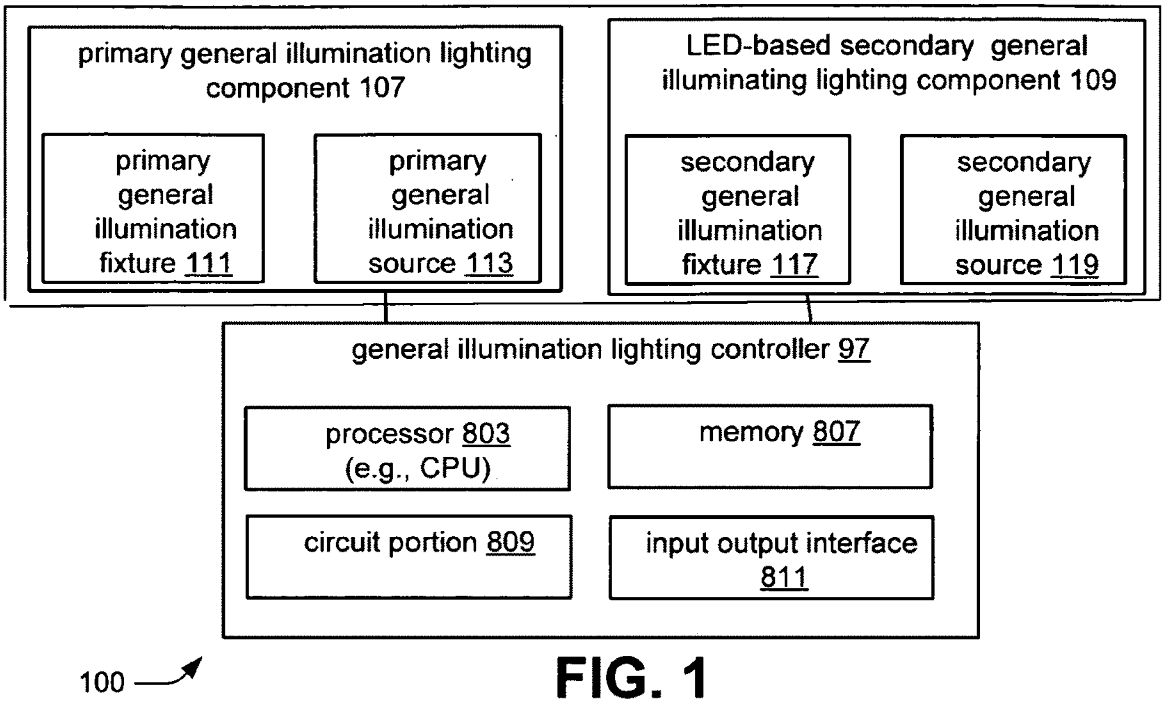
FIG. 1 is a block diagram of one embodiment of a general illumination lighting device or system including an at least one primary general illumination lighting component and/or an at least one LED-based secondary general illumination lighting component.

At least certain portions of the text of this disclosure (including claims, detailed description, and/or drawings as set forth herein) can support various different claim groupings and/or various different applications. Although, for sake of convenience and understanding, the detailed description can include section headings that generally track various different concepts associated with claims or general concepts contained therein, and the detailed description is not intended to limit the scope of the invention as set forth by each particular claim. It is to be understood that support for the various applications or portions thereof thereby, can appear throughout the text and/or drawings at one or more locations, regardless of the section headings.

1. GENERAL ILLUMINATION LIGHTING DEVICE OR SYSTEM

General illumination lighting may, depending on context, be viewed as relating to illumination lighting that illuminates a space, region, or surface to facilitate sight, vision, machine vision, etc. in areas, regions, services, indoors, outdoors, in a manner that may assist viewing or seeing by humans, animals, machines, etc. This disclosure describes a variety of mechanisms and techniques that may be used to improve at least one color(s) and/or at least one intensity of at least one color(s) associated with such general illumination lighting. It may be desirable, depending on context, to provide for control or adjustment of one or more colors of general illumination lighting and/or intensity at one or more colors of light provided by certain embodiments of a general illumination lighting device or system 100. A variety of configurations and designs of conventional illumination lamps may be configured to provide general illumination lighting for such illustrative, but not limiting, applications as home lamps, reading lamps, office lamps, street lamps, stadium lighting, indoor lamps, outdoor lamps, automobile lighting, etc. Certain conventional general illumination lights, lamps, and/or systems may represent an improvement in certain sight, vision, or machine vision areas as compared with other conventional general illumination lights, lamps, and/or systems. FIGS. 1 to 5 provide a variety of embodiments and/or configurations of a general illumination lighting device or system 100 which can be configured to provide desirable general illumination lighting as compared with certain conventional general illumination lighting devices.

Such desirable general illumination lighting can be evidenced in a variety of ways including, but not limited to, at least one of: controlling or altering the color, intensity, or spectral intensity of the general illumination lighting; reaching or approaching a desired general illumination lighting target; causing the general illumination lighting as provided by certain embodiments of the general illumination lighting device or system 100 to be provided with greater energy luminescence efficiency (quantifiable, for example, by useful lumens of light being produced for given power); possibly providing an extended useful lifetime of certain embodiments of the general illumination lighting device or system 100; providing more desirable general illumination lighting; etc. As such, this disclosure can, depending on context, provide a variety of techniques and devices to synthesizes general illumination lighting of a desired color and/or intensity; improve energy luminescence efficiency for variety of complements are devices that generate general illumination lighting; and/or improve the operating characteristics, lifetime, or efficiency of components or devices that generate general illumination lighting.

Within this disclosure, certain embodiments of the general illumination lighting device or system 100 can be configured to approach or reach the color, intensity, or spectral intensity of a prescribed general illumination lighting target. Such general illumination lighting target indicate, in general, the desired color, intensity, spectral intensity, etc. the general illumination lighting which the general illumination lighting device or system 100 is configured to direct at a surface, or apply to within a region. Certain embodiments of the general illumination lighting target may be quantifiably or subjectively input by a user or system operator, such as make the general illumination lighting a particular color or intensity within a particular region or on a particular surface. Alternately, certain embodiment to the general illumination lighting target may reflect a given general illumination lighting, such as a particular color, intensity, or spectral intensity in the first location or surface may be copied to a second location or surface.

Within this disclosure, certain embodiments of the general illumination lighting device or system 100 can be configured to include an at least one Light Emitting Diode (LED)-based secondary general illumination lighting fixture which, when electrically connected with an at least one LED-based secondary general illumination lighting source, is configured to emit an at least one LED-based secondary general illumination lighting. Certain embodiments of the at least one secondary general illumination lighting, when combined with at least one primary general illumination lighting, at least partially results in an at least one combined general illumination lighting. Certain embodiments of the general illumination lighting device or system 100 can include at least one sensor that is configured to sense one or more sensed optical characteristics provided by an at least one alternate general illumination lighting emanating from an at least one alternate general illumination lighting source. Certain embodiments of the general illumination lighting device or system 100 can include an at least one general illumination lighting control circuit that is configured to control at least one controlled optical characteristics of an at least one secondary general illumination lighting at least partially responsive to the at least one sensor configured to sense one or more sensed optical characteristics of the an at least one alternate general illumination lighting emanating from the at least one alternate general illumination lighting source.

Certain embodiments of the general illumination lighting device or system 100 can provide for a variety of improved and/or enhanced general illumination lighting of a desired at least one color and/or intensities. A variety of embodiments of the general illumination lighting device or system 100 can be customized or configured to provide or synthesize general illumination lighting having at least one desired color(s) and/or intensities of at least one color(s). Certain embodiments of the general illumination lighting device or system 100 may thereby be provided for general illumination lighting, and/or may, in certain instances, enhance energy luminescence efficiency for a variety of general illumination lighting.

Certain embodiments of the general illumination lighting device or system 100 can be configured to provide or synthesize a desired one or more colors of general illumination lighting and/or intensity of one or more colors. Such synthesis of particular color(s) and/or intensities of general illumination lighting can be used to provide general illumination lighting to a desired room, space, surface, region, etc. that may be situated either indoors or outdoors. Within this disclosure, the term "synthesizing" can, depending on context, pertain to creating general illumination lighting of a desired controllable one or more colors of general illumination lighting and/or intensity of one or more colors at least partially using one or more embodiments of the general illumination lighting device or system 100. Certain embodiments of the general illumination lighting device or system 100 can therefore be configured to synthesize a particular color, intensity, spectral intensity, etc. of general illumination lighting as applied to a particular surface or within a particular region.

For certain applications, general illumination lighting may be desired not only for providing utilitarian sight, vision, or machine vision, but also for creating particular colors, moods, textures, shapes, pictures, text, etc. within a particular region or relative to a particular surface. It may be desired to use certain embodiments of the general illumination lighting device or system 100 indirectly or directly to create or synthesize particular colors, intensities, lighting textures, lighting color moods, etc. of the general illumination lighting indirectly such as may be deflected or reflected off a surface, or directly such as passing through a media (such as air within a particular region). Such synthesizing one or more colors and/or intensity of one or more colors of general illumination lighting can be useful when, replacing one or more inoperative general illumination lights or providing new lights within an existing set of general illumination lights, and could be provided in a manner that could allow multiple replacement general illumination lamps to provide a consistent or desired one or more colors and/or a similar intensity of one or more colors of general illumination lighting as existing, aged, or different general illumination lighting. Certain embodiments of the general illumination lighting device or system 100 can be configured to modify an existing lighting for a given room and/or surface to have a desired color and/or intensity of one or more colors regardless of the state of existing lighting.

Certain embodiments of the general illumination lighting device or system 100 may be configured, as described at various locations in this disclosure, to synthesize general illumination lighting having desired characteristics or general illumination lighting signatures such as one or more colors of general illumination lighting. The general illumination lighting signature may, depending on context, refer to providing at one or more regions, volumes, or surfaces the general illumination lighting predominantly having particular color (wavelengths), combined colors, intensity, and/or spectral intensity at one or more colors. Certain embodiments of such synthesis by the general illumination lighting device or system 100 may involve the use of at least one primary general illumination lighting component 107 acting in combination with the at least one LED-based secondary general illumination lighting component 109. Certain embodiments of such synthesis by the general illumination lighting device or system 100 may involve the use of at least one primary general illumination lighting component 107 acting by itself (exclusive of or including the functionality of the at least one LED-based secondary general illumination lighting component 109). To synthesize general illumination lighting, it may therefore be desired to provide general illumination lighting having a particular general illumination lighting signature.

Certain embodiments of the at least one primary general illumination lighting component 107 may be configured to include at least one primary general illumination fixture 111 and at least one primary general illumination source 113. Certain embodiments of the at least one primary general illumination fixture 111 may be configured to include, for example, an electric socket such as, when electrically connected to the at least one primary general illumination source 113, can provide electricity to the at least one primary general illumination source 113 to effect the general illumination lighting. Certain embodiments of the at least one primary general illumination source 113 can be configured as, for example, a light bulb of the various types (such as incandescent or gas-discharge) as described in this disclosure. Within this disclosure, the terms "primary general illumination lighting component 107", "primary general illumination fixture 111", and/or "primary general illumination source 113" may be used depending on context, in certain instances in the alternative. For instance, the primary general illumination component 107, the primary general illumination fixture 111, or the primary general illumination source 113 may be considered as providing some functionality in the emitting or generating at least some primary general illumination lighting.

Certain embodiments of the at least one LED-based secondary general illumination lighting component 109 may be configured to include at least one secondary general illumination fixture 115 and at least one secondary general illumination source 117. Certain embodiments of the at least one secondary general illumination fixture 119 may be configured to include, for example, a socket such as to be, when electrically connected to the at least one secondary general illumination source 117, can provide electricity to the at least one secondary general illumination source 119. Certain embodiments of the at least one secondary general illumination source 119 can be configured as, for example, a light bulb of the various types (such as incandescent or gas-discharge) as described in this disclosure. Within this disclosure, the terms "LED-based secondary general illumination lighting component" 109, "secondary general illumination fixture" 117, and/or "secondary general illumination source" 119 may be used depending on context, in certain instances in the alternative. For instance, the LED-based secondary general illumination component 109, the secondary general illumination fixture 117, or the secondary general illumination source 119 may be considered as providing some functionality resulting in the emitting or generating at least some LED-based secondary general illumination lighting.

Considering the different structures of various configurations of certain embodiments of the general illumination lighting device or system 100, the various embodiments and segments of the primary general illumination lighting component 107 and/or the LED-based secondary general illumination lighting component 109 may be configured differently. For instance, certain embodiments of the at least one primary general illumination lighting component 107 does not have to provide a greater intensity of general illumination lighting than the at least one LED-based secondary general illumination lighting component 109. For example, in certain instances, the LED-based secondary general illumination lighting component 119 can be physically removed or separated from the secondary general illumination fixture 117, such as by unscrewing, twisting, pressing a detent, etc., while in other instances they may be physically integrated as to limit separation. Additionally, in certain instances, the primary general illumination source 113 can be physically removed or separated from the primary general illumination fixture 111, such as by unscrewing, twisting, pressing detent, etc., while in other instances they may be physically integrated as to limit separation.

Certain embodiments of light emitting diodes (LED) can be configured to a variety of operational characteristics when applied to certain embodiments of the at least one primary general illumination lighting component 107 and/or the at least one LED-based secondary general illumination lighting component 109. Typically, LEDs have relatively low luminescence at low current, and exhibit a relatively high luminescence at higher current. Certain LED embodiments of the at least one primary general illumination lighting component 107 and/or the at least one LED-based secondary general illumination lighting component 109 can be operated to generate general illumination lighting having a square-wave configuration, such as may be used to enhance energy luminescence efficiency. Often, LEDs can be configured to operate with relatively high electrical loads, and thereby burn out relatively quickly and operate at above a high voltage threshold. Certain LED embodiments of the at least one primary general illumination lighting component 107 and/or the at least one LED-based secondary general illumination lighting component 109 can be excited with a high energy, while providing a relatively low duty cycle waveform to exploit certain physical aspects of the LEDs. Certain LED embodiments of the at least one primary general illumination lighting component 107 and/or the at least one LED-based secondary general illumination lighting component 109 can therefore provide general illumination lighting having a variety of color, intensity, and/or spectral intensity that can be controlled as a function of temperature. By providing relatively low current and/or voltage can allow certain embodiments of the general illumination lighting device or system 100 to be configured as a circuit suicide prevention circuit, and thereby not being destroyed under excessive currents by limiting current applied to the filament or other element(s) within the at least one primary general illumination lighting component 107 and/or the at least one LED-based secondary general illumination lighting component 109.

Certain embodiments of the at least one sensor 316 of the sensor and/or control portion 303 can monitor optical characteristics (intensity at one or more colors and/or color), or alternatively can monitor electric characteristics). Such monitor may result at least partially from detecting respective specified spectral and/or frequency contents of the general illumination lighting is provided by the at least one primary general illumination lighting component 107 as well as the at least one LED-based secondary general illumination lighting component 109.

Certain incandescent embodiments of the at least one primary general illumination lighting component 107 and/or the at least one LED-based secondary general illumination lighting component 109 can be configured to perform with improved energy luminescent efficiencies if configured with a relatively thin (i.e., low thermal time-constant) heated elements that are repetitively pulsed, such as may utilize a modulator such as a pulse-width modulator, an oscillator, or another device that can provide such pulses, since they will yield a number of visible photons per inputted joule if they're 'flashed' to much higher surface temperatures. Certain embodiments of the at least one primary general illumination lighting component 107 and/or the at least one LED-based secondary general illumination lighting component 109 to output variable visible output-levels such as may thereby be realized by modifying the duty-cycle aspect as applied to the at least one primary general illumination lighting component 107 and/or the at least one LED-based secondary general illumination lighting component 109. Doing such excitation in a manner that utilizes repetitive pulses can be straightforward using, for example, solid-state power-control elements associated with a variety of reactive energy storage modules. In circumstances in which continuous supply-power isn't available, (e.g., when working with AC utility power) to whatever extent isn't attainable by merely slicing-into the cyclic voltage-wave that utility-power offers, though such embodiments operate with reduced energy luminescence efficiencies.

Certain embodiments of the general illumination lighting device or system 100 can thereby be configured as to 'synthesize' a desired output (e.g., one or more colors, intensities, and/or spectral intensities of general illumination lighting vs.

time) which may, depending on context, be considered as a general elimination lighting target (including, e.g., a primary general illumination lighting target, a secondary general illumination lighting target, a combined general illumination lighting target, etc.). Certain embodiment of the general illumination lighting target may therefore be stored or maintained as to indicate the particular general illumination lighting that one may desire or specify, e.g., within certain limits, based at least partially on the output of the primary general illumination lighting component 107. certain embodiment of the general illumination lighting target may be maintained digitally, in analog form, as pre-created information, as calculated information, etc., and may or may not compensate for ambient light, color of surfaces, etc. The general illumination lighting of certain embodiments of the primary general illumination lighting component 107 can thereby be, or may not be, augmented based at least partially on general illumination lighting as provided by the LED-based secondary general illumination lighting component 109 to "synthesize" a one or more colors and/or intensity at one or more colors of the general illumination lighting for a variety of general illumination lighting applications such as, e.g., residential, commercial, office, automotive, internal, external, etc.

Certain embodiments of the general illumination lighting device or system 100 may operate by sensing, detecting, or measuring the combined general illumination lighting as provided by the at least one primary general illumination lighting component 107 and/or the at least one LED-based secondary general illumination lighting component 109 at one or more locations, as deflected through one or more media, and/or as deflected off one or more surfaces. Such altering of light by combining it at one or more locations, as deflected through one or more media, and/or as deflected off one or more surfaces can be considered as one type of synthesis. Such synthesized colors of general illumination lighting can be provided within desired or suitable limits for particular applications. For example, it might be desired to maintain the general illumination lighting of a particular living space such as a living room, kitchen, or bedroom, etc. within strict spectral limits as desired by the user (such as to suitably illuminate a space, create a mood by lighting, provide a texture to a surface, etc.), whereas the general illumination lighting of other less used space (e.g., garage or outdoors) may be maintained within less stringent user limits such as to provide basic illumination.

Considering the recent increased energy costs, it may be particularly desirable to limit the expenses associated with obtaining or operating a variety of embodiments of the general illumination lighting device or system 100. By providing for synthesizing one or more colors of general illumination lighting and/or intensity at one or more colors of general illumination lighting that may include certain embodiments of the at least one primary general illumination lighting component 107 and/or certain embodiments of the LED-based secondary general illumination lighting component 109, it is envisioned that desirable light can be designed or synthesized.

Such synthesized or designed light can have a variety of benefits including, but not limited to: being relatively energy and/or cost efficient by allowing use of efficient general illumination lighting component(s), while allowing for desired color or intensity at one or more colors, etc. Whichever one of these or other factors that is particularly desired can be provided, or designed, using a variety of embodiments of the general illumination lighting device or system 100 configured or designed for those particular desired factor(s). Additionally, it may be desirable for certain embodiments of the LED-based secondary general illumination lighting component 109 to "globally" augment a relatively lesser portion of being lit by the general illumination lighting that may be included within a relatively larger region. Consider, for example, a variety of embodiments of the LED-based secondary general illumination lighting component 109, that can be used to "locally" augment the general illumination lighting to within a relatively small region as provided by a variety of embodiments of the LED-based secondary general illumination lighting component 109 as described with respect to FIG. 1 or 2.

There may be a variety of techniques and applications by which certain embodiments of the general illumination lighting device or system 100 can provide for desired or more consistent general illumination lighting effect. Certain embodiments of the general illumination lighting device or system 100 can be configured to provide general illumination lighting of a selected or desired one or more colors of general illumination lighting and/or a selected or desired intensity at one or more colors. Certain embodiments of the general illumination lighting device or system 100 can be configured to provide general illumination lighting having limited start-up duration, or a particular or desired characteristic(s). Certain embodiments of the general illumination lighting device or system 100 can be configured to provide general illumination lighting with a consistent or desired illumination and/or one or more colors of general illumination lighting near the end-of-life using a variety of techniques, as described in this disclosure.

Certain embodiments of the general illumination lighting device or system 100 can be configured to include an at least one primary general illumination lighting component 107 configured to operate in combination with the at least one LED-based secondary general illumination lighting component 109, such as described with respect to FIGS. 1 and/or 2, as well as other locations in this disclosure. By comparison, certain embodiments of the general illumination lighting device or system 100 can be configured to include the at least one primary general illumination lighting component 107 (that operate by itself such as without at least one LED-based secondary general illumination lighting component 109) as described with respect to FIGS. 3 and/or 4, as well as other locations in this disclosure.

The general illumination lighting as provided by certain embodiments of either or both of the at least one primary general illumination lighting component 107 and/or the at least one LED-based secondary general illumination lighting component 109, such as may be provided alone or in combination with ambient or other general illumination lighting, may, but does not have to, depending on context, be referred to inclusively as "general illumination lighting". Alternatively, the general illumination lighting as provided by the at least one primary general illumination lighting component 107 may, depending on context, be referred to particularly as "primary general illumination lighting". Additionally, the general illumination lighting as provided by the at least one LED-based secondary general illumination lighting component 109 may, depending on context, be referred to particularly as "secondary general illumination lighting". Certain embodiments of the general illumination lighting device or system 100 may be configured to make the overall color and/or intensity more consistent or pleasing, regardless of time of day, existing ambient conditions, other lighting which may be variable, etc.

Certain embodiments of the at least one primary general illumination lighting component 107 and/or the at least one LED-based secondary general illumination lighting component 109 can be configured, depending on context, to provide general illumination lighting having improved energy luminescence efficiency using such techniques as controlling operating conditions such as temperature, filament conditions, filament materials, filament age, etc. Certain embodiments of the general illumination lighting device or system 100 can be configured to provide increased efficiencies as compared with conventional lamps or lights, whether the at least one primary general illumination lighting component 107 is operating alone, the at least one LED-based secondary general illumination lighting component 109 is operating alone, or the at least one primary general illumination lighting component 107 is operating in combination with the at least one LED-based secondary general illumination lighting component 109.

Within this disclosure, the term "filament" or other similar element can, depending upon context, refer to filaments, arcs, or other devices that can be used to provide general illumination lighting.

The color and/or intensity of the general illumination lighting as provided by at least certain of the at least one primary general illumination lighting component 107 and/or the at least one LED-based secondary general illumination lighting component 109 may or may not be controlled or altered in certain embodiments. There can therefore be a variety of embodiments of each of the at least one primary general illumination lighting component 107 and/or the at least one LED-based secondary general illumination lighting component 109.

In general, though, in certain embodiments of the general illumination lighting device or system 100, the at least one LED-based secondary general illumination lighting component 109 may be configured or operated to alter or improve the at least one color and/or intensity of the general illumination lighting as provided by the at least one primary general illumination lighting component 107 such as to achieve or approach some general illumination lighting target. Within this disclosure, the general illumination lighting may or may not be provided under conditions including (or be configured to adapt for) ambient general illumination lighting or other such general illumination lighting. By comparison, within certain embodiments of the general illumination lighting device or system 100, certain embodiments of the primary general illumination lighting component 107 and/or the LED-based secondary general illumination lighting component 109 may be configured to provide improved lighting or more efficient lighting by themselves. This disclosure provides a variety of incandescent embodiments of the at least one primary general illumination lighting component 107 and/or the at least one LED-based secondary general illumination lighting component 109 that can operate with such luminous energy efficiencies as to be competitive with such gas discharge embodiments of general illumination lighting components.

A variety of embodiments of the general illumination lighting device or system 100 of a variety of configurations can, depending on context, be configured to controllably augment or control the one or more colors of general illumination lighting and/or intensity at one or more colors of the output of the emitted general illumination light. Within this disclosure, certain embodiments of illumination lighting can provide general illumination lighting by which persons, animals, robots, machines, etc. can use for a variety of tasks including, but not limited to: seeing, visualization, observation, reading, imaging, observing, navigation, positioning, etc.

A variety of embodiments of the at least one primary general illumination lighting component 107 and/or the at least one LED-based secondary general illumination lighting component 109 of the general illumination lighting device or system 100 may be capable of providing all of, or alternately at least a portion of, at least some general illumination lighting for: a region, a surface, a media, and/or an area, etc. As such, certain embodiments of the general illumination lighting device or system 100 can be used to augment existing, ambient, or other such general illumination lighting such as to provide general illumination lighting of a desired or prescribed color and/or intensity.

In general, the at least one primary general illumination lighting component 107 and/or the at least one LED-based secondary general illumination lighting component 109 may each, or in combination, be configured to provide at least some of the general illumination lighting that may be used for such illustrative applications as home lamps, office lamps, street lamps, reading lamps, stadium lighting, automobile lighting (including headlights), outdoor lighting, etc. Within this disclosure, certain embodiments the at least one primary general illumination lighting component 107 can be configured as the general illumination device(s) that provides enhanced or augmented illumination (e.g., is capable of generating the greatest photons in the absence of other ambient light, etc.) within the general illumination lighting device or system 100. Within this disclosure, certain embodiments of the at least one LED-based secondary general illumination lighting component 109 can be configured as the general illumination device(s) that is most capable of controlling the color of the general illumination lighting as provided by the general illumination lighting device or system 100.

A variety of embodiments, configurations, and/or operations of the general illumination lighting device or system 100 may be provided such that the at least one primary general illumination lighting component 107 (which may operate alone or in combination with ambient or other general limitation lighting) may provide the primary general illumination lighting within a region being illuminated by the general illumination lighting device or system. For example, the at least one primary general illumination lighting component 107 can be configured to provide most of or much of the illumination associated with the general illumination lighting within the general illumination lighting device or system 100.

Certain embodiments of the at least one LED-based secondary general illumination lighting component 109 can be configured to augment and/or add to an intensity at one or more colors and/or intensities of one or more color(s) of the primary general illumination lighting (e.g., make particular general illumination lighting colors brighter, weaker, modulated, etc.) either alone or in combination with at least one primary general illumination lighting component 107. Certain examples of the at least one LED-based secondary general illumination lighting component 109 can be configured such as to augment or affect the one or more colors, energy luminescence efficiency, or intensity at one or more colors of the general illumination lighting as provided largely by the at least one primary general illumination lighting component 107, e.g., make it more consistent, more energy efficient to provide the certain luminescence, having fewer spectral irregularities, more optically pleasing, nicer, and/or more naturally appearing and/or otherwise more desirable general illumination lighting than, for example, the general illumination lighting as provided by the at least one primary general illumination lighting component 107 alone or in combination with conventional gas discharge lamps (e.g., fluorescent) or conventional incandescent lamps, etc.

Within this disclosure, the terms "primary general illumination lighting component" 107 (also possibly including the at least one primary general illumination fixture 111 and/or the at least one primary general illumination source 113) can thereby encompass a variety of general illumination lighting component(s) or device(s) that can operate using a variety of techniques or devices including, but may not be limited to: certain gas discharge lamps, certain incandescent lamps, certain light emitting diode (LED) lights, certain solid state lights, certain plasma lights, etc. This disclosure thereby describes a variety of embodiments of the at least one primary general illumination lighting component 107 as well as the at least one LED-based secondary general illumination lighting component 109.

The structure and operation of certain embodiments of the at least one LED-based secondary general illumination lighting component 109 (also possibly including the at least one secondary general illumination fixture 117 and/or the at least one LED-based secondary general illumination source 119), can in a number of ways to change, augment, add to, or modify the general illumination lighting as provided by certain embodiments of the at least one primary general illumination lighting component 107 (also possibly including the at least one primary general illumination fixture 111 and/or the at least one primary general illumination source 113). Such augmentation may depend at least partially on the type, structure, and/or operation of the at least one primary general illumination lighting component 107. For example, it may be desired to augment or alter the color of certain gas discharge (e.g., fluorescent) embodiments of the at least one primary general illumination lighting component 107 by providing an at least one LED-based secondary general illumination lighting component 109 that improves or otherwise augments the overall color and/or intensity of the general illumination lighting as provided by the at least one primary general illumination lighting component 107.

As such, if the at least one primary general illumination lighting component 107 is configured to include such gas discharge lamps as fluorescent lamps, then the at least one LED-based secondary general illumination lighting component 109 may be configured to augment such potential (or inherent) limitations in such gas discharge lamps as fluorescent lamps as one or more undesirable general illumination lighting color, relatively slow increase in general illumination lighting intensity at one or more colors or undesirable color during start-up; relatively diminished general illumination lighting intensity at one or more colors or undesirable color during near end-of-life conditions, etc.

By comparison, it may be desired to make certain incandescent embodiments of the primary general illumination lighting component 107 and/or the at least one LED-based secondary general illumination lighting component 109 more efficient in providing a given output general illumination lighting as measurable in lumens for an input power as measurable in watts. If the at least one primary general illumination lighting component 107 is configured to include at least one incandescent lamp, then the at least one LED-based secondary general illumination lighting component 109 may be configured to augment such potential limitations in incandescent lamps as improving one or more general illumination lighting colors, synthesizing desired general illumination lighting, improving energy luminescence efficiency, prolonging typical operating lives of the components, establishing uniformity of general illumination across an array including the at least one primary general illumination lighting component 107 and/or the at least one LED-based secondary general illumination lighting component 109, etc. By configuring or controlling certain embodiments of the at least one primary general illumination lighting component 107 and/or the at least one LED-based secondary general illumination lighting component 109 to provide a given general illumination lighting in the prescence or abscence of additional ambient light, certain embodiments of the general illumination lighting device or system 100 may be configured to operate in different modes. For example, certain embodiments of the at least one primary general illumination lighting component 107 and/or the at least one LED-based secondary general illumination lighting component 109 may be configured to provide a relatively low percentage of the general illumination lighting under relatively high ambient light conditions, which may be useful to limit glare, etc. By comparison, the at least one primary general illumination lighting component 107 and/or the at least one LED-based secondary general illumination lighting component 109 may provide a considerable percentage of the general illumination lighting under relatively low ambient lighting conditions.

In the instance of certain sporting events, certain stage events, certain outside events, certain office environments, etc., certain color and/or intensity combinations of the general illumination lighting can be utilized to provide suitable or even improved lighting without the need to provide excessively bright general illumination lighting, the latter of which may disrupt neighbors, commercial districts, or wildlife, etc. Such bright conventional general illumination lighting can even make it undesirable for neighbors, businesses, animals, etc. to live or be present within the region of the illuminated sporting events, concerts, businesses, parking lots, homes, offices, etc. This disclosure provides a number mechanisms by which the suitable level of general illumination lighting can be provided to create desirable, pleasing, efficient, and/or suitably bright general illumination lighting. Certain operations of the general illumination lighting device or system 100 can be modified based at least partially on ambient lighting, lighting color, and/or desired lighting, etc. in a manner that can ensure relatively high energy luminescence efficiency.

Certain conventional outdoor general illumination lighting typically focuses on providing a similar illumination level regardless of time a day, ambient lighting conditions, etc. Certain embodiments of the general illumination lighting device or system 100 may preferably be configured to output desired total illumination intensity regardless of variations in the ambient lighting, time of day, color of illuminated surfaces, etc.

This disclosure provides a variety of embodiments of the general illumination lighting device or system 100 that can exhibit a variety of operational techniques that can result in considerably enhanced energy luminescence efficiency. Within this disclosure, the term "energy luminescence efficiency" can, depending on context, relate to the luminescence indicating how much useful general illumination lighting is provided for a given energy input. Certain conventional lamps and lights (particularly many incandescent embodiments) may have a relatively low energy luminescence efficiency for a variety of such illustrative, but not limiting, purposes as generation of considerable ultraviolet (UV) radiation (which is not visible for people), generation of considerable heat, operation at a relatively inefficient power level, etc. As at least a partial result of their relatively low energy luminescence efficiency (e.g., measured in lumens/Watt), the use of certain conventional lights, particularly certain incandescent, are being considered to be banned by law in certain states, municipalities, countries, etc.

Certain embodiments of the general illumination lighting device or system 100 can be configured with the at least one sensor of the sensor and/or control portion 303 and/or the general illumination lighting controller 97, as described with respect to FIGS. 1 to 4, such as can control the intensity and/or color of the general illumination lighting. Certain embodiments of the at least one sensor and/or control portion 303 can include a multi-color embodiment of the sensor 316 that can synthesize and/or sense the one or more colors and/or intensities at one or more colors of general illumination light. The general illumination light that is synthesized by the at least one sensor and/or control portion 303 and/or the multi-color embodiment of the sensor 316 can exist either alone or in combination with ambient light, natural light, outdoors light, and/or other light in which the general illumination lighting device or system 100 is being configured to interoperate). Certain embodiments of the at least one sensor and/or control portion 303 can include a variable light control 312 and/or input control 322 as described with respect to FIG. 5, that controls the illumination and/or color of the general illumination lighting as provided by the at least one primary general illumination lighting component 107 and/or the at least one LED-based secondary general illumination lighting component 109 as described with respect to FIGS. 1 to 4.

Figure 5:
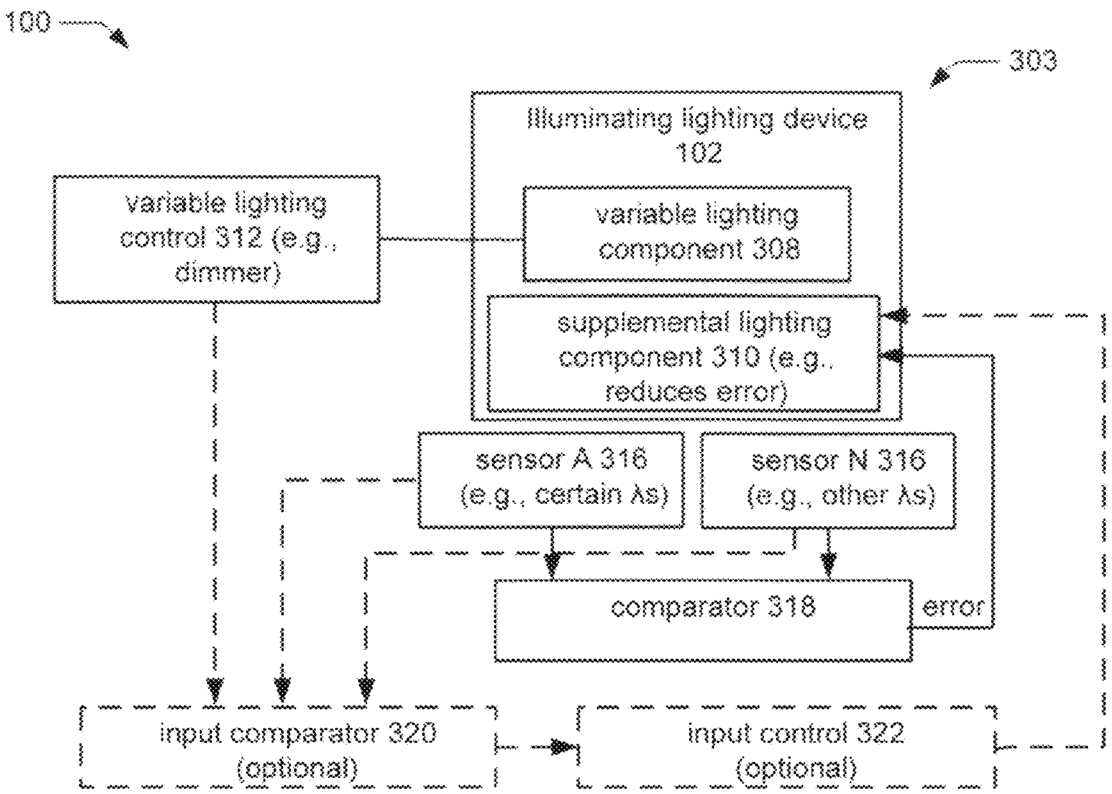
FIG. 5 is a diagram of an embodiment of a sensor and/or control portion that can be used to control operation of the general illumination lighting device or system of FIG. 1, 2, 3, or 4, and other locations in this disclosure.

FIG. 5 therefore shows one embodiment of the general illumination lighting device or system 100 that can be configured to include the sensor and/or control portion 303, that may be configured with the sensor portion 316 and the control portion. Certain embodiments of the sensor and/or control portion 303 can be configured to control the relative general illumination lighting as provided by the at least one primary general illumination lighting component 107 (particularly the at least one primary general illumination source 119) as compared with the at least one LED-based secondary general illumination lighting component 109 (particularly the at least one secondary general illumination source 113). Certain embodiments of the sensor and/or control portion 303 can sense, monitor, and/or control the general illumination lighting output of the general illumination lighting based at least partially on sensed general illumination lighting of one or more colors (corresponding to controlling wavelengths) as may be provided at a surface, at a region, at a particular region or location, or some media through which the general illumination lighting passes. For example, a particular user can configure the general illumination lighting device or system 100 to provide general illumination lighting having one or more particular colors of general illumination lighting, intensity at one or more colors, and/or other characteristic and the prescribed illumination spatial location (e.g., illuminated area).

Certain embodiments of the general illumination lighting device or system 100 as described with respect to FIG. 5 can depending on context include, but may not be limited to: a variable lighting control 312, a variable lighting component 308, a supplemental lighting component 310, and/or one more sensors 316. Each of the one or more sensor(s) 316 may be associated with a particular one or more colors or wavelengths of the general illumination lighting, a comparator 318, an input comparator 320, and/or an input control 322. Certain embodiments of the variable lighting control 312 can generally be configured to act as a dimmer, such as may be used to adjust or control the desired one or more colors or intensities of the general illumination lighting such as towards the general illumination lighting target as provided by the general illumination lighting device or system 100. Certain embodiments of the variable lighting component 308 can be configured to adjust the intensities, at one or more colors, such as by adjusting and/or controlling the electrical frequencies, voltages, and/or currents applied by the at least one primary general illumination lighting component 107 and/or the at least one LED-based secondary general illumination lighting component 109 as described with respect to FIGS. 1 to 4, such as to achieve some general illumination lighting target. Certain embodiments of the general illumination lighting device or system 100 can be configured to provide substantially all (or some percentage of) the general illumination lighting within a region in space or on the surface.

Certain embodiments of the general illumination lighting device or system 100 can be configured to adjust and/or control certain embodiments of the at least one LED-based secondary general illumination lighting component 109 and/or the at least one primary general illumination lighting component 107. Such control and/or adjustment can rely on sensing: a) electric characteristics of the at least one primary general illumination lighting; The other thing to sense is optical characteristics of either the at least one primary general illumination lighting, or the at least one primary general illumination lighting and/or the at least one LED-based secondary general illumination lighting, also include an optical profile from another (e.g., alternate) general illumination lighting source. In other words, each region to be illuminated can be illuminated using conventional general illumination lighting devices (or there may not be any lighting present). Certain embodiments of the general illumination lighting device or system 100 can be adapted to install another one of the of the at least one LED-based secondary general illumination lighting component 109 and/or the at least one primary general illumination lighting component 107, and it may be desired to have optical characteristics match existing optical characteristics at that or another region. Certain embodiments of the general illumination lighting device or system 100 can be configured to obtain or reach for this type of optical characteristics or spectra, such as by suitably adjusting and/or controlling the at least one LED-based secondary general illumination lighting component 109 and/or the at least one primary general illumination lighting component 107. Certain embodiments of the at least one sensor 316 of the sensor and/or control portion 303, as described with respect to FIGS. 5, 7, and 8, can be configured to sensed light (that could be single color or multi-color general illumination lighting).

Figure 34:
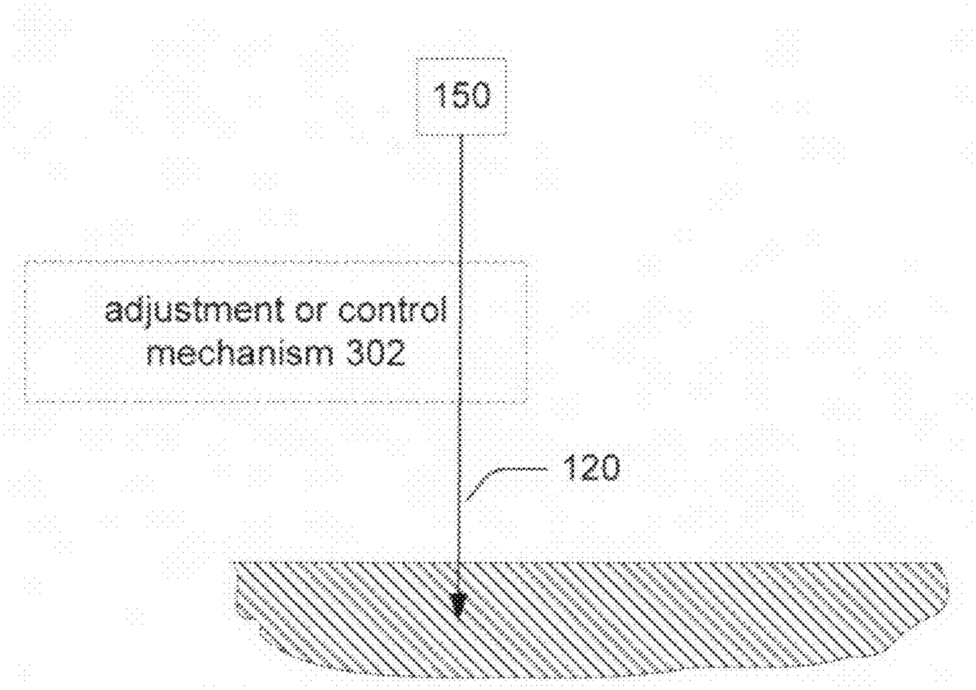
FIG. 34 is a cross-sectional diagram of one embodiment of an adjustment or control mechanism.
Figure 35:
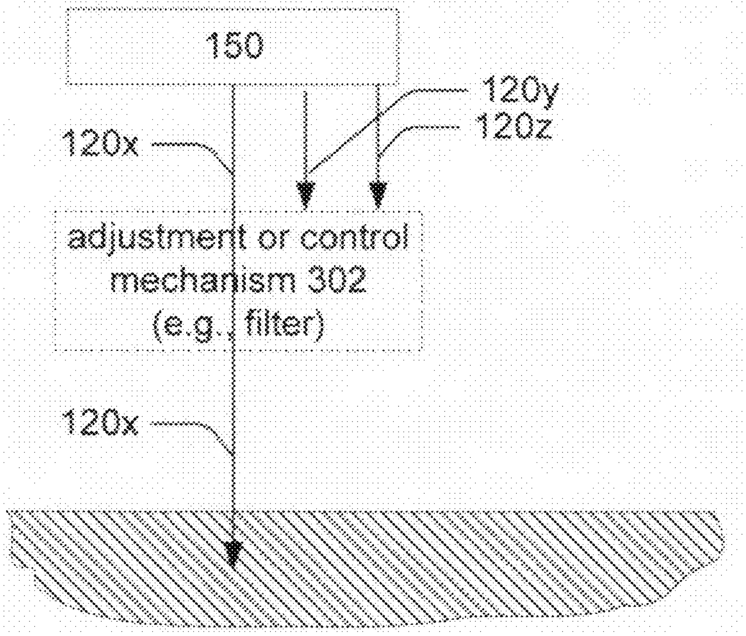
FIG. 35 is a cross-sectional diagram of another embodiment of the adjustment or control mechanism.

A variety of embodiments of an adjustment or control mechanism 302 that can adjust or control a variety of combined general illumination lighting 120 of FIG. 34 (as well as the combined general illumination lighting having different frequency components 120$x$, 120$y$, and 120$z$ of FIG. 35). Certain embodiments of the general illumination lighting device or system 100 can utilize certain embodiments of the general illumination lighting controller 97 to operate the adjustment or control mechanism 302 to adjust or control a variety of combined general illumination lighting 120 of FIG. 34 (as well as the combined general illumination lighting having different frequency components 120$x$, 120$y$, and 120$z$ of FIG. 35). As such, certain embodiments of the general illumination lighting device or system 100 can utilize general illumination light filtering techniques as described with respect to FIGS. 34 and 35 to controllably filter out prescribed colors, or alternately certain embodiments of the general illumination lighting device or system 100 as described elsewhere in this disclosure can utilize a variety of modulation or other techniques to general primary general illumination lighting and/or LED-based secondary general illumination lighting having controllable and/or adjustable colors, intensities, and/or spectral intensities.

Certain embodiments of the one or more sensor(s) 316 associated with the sensor and/or control portion 303 as described with respect to FIG. 5 can be configured to sense and/or detect the one or more colors of general illumination lighting and/or intensity of at least one color as emanating from at least one surface, via at least one media, within the at least one region, from at least one target, or from at least one of the general illumination lights 107 and/or 109, as described in this disclosure with respect to FIGS. 1 to 4. Certain embodiments of the supplemental lighting component 310 can be configured to adjust the desired one or more colors of general illumination lighting and/or intensity of at least one color of the secondary general illumination light that is generated by the at least one LED-based secondary general illumination lighting component 109.

Certain embodiments of the comparator 318 as described with respect to FIG. 5 can be used to determine the one or more colors of general illumination lighting and/or intensities of at least one color of the general illumination light as provided by the at least one primary general illumination lighting component 107, the at least one LED-based secondary general illumination lighting component 109, ambient light, a target such as an illuminated surface, etc., such as may be used to provide an error from a desired one or more colors of general illumination lighting and/or intensity of at least one color. Certain embodiments of the input comparator 320, which is optional in certain embodiments of the general illumination lighting device or system 100, can be configured to compare desired input color with actual color as detected by the at least one sensor 316 of the sensor and/or control portion 303. Certain embodiments of the input control 322, which is optional, can be used to control the desired color and/or intensity of the at least one color(s) that are emitted by the at least one LED-based secondary general illumination lighting component 109 and/or the at least one primary general illumination lighting component 107.

As such, the color(s) and/or intensities of certain embodiments of the at least one primary general illumination lighting component 107 and/or the at least one LED-based secondary general illumination lighting component 109 as described with respect to FIGS. 1 to 5 can be controlled or adjusted not only based on each other, but also based on stable or controlling ambient light, outside lighting, as well as other natural or man-made lighting, etc. As such, if considerable general illumination lighting from the ambient light, outside lighting, as well as other natural or man-made lighting, etc. is applied to a region or surface illuminated by the general illumination lighting device or system 100, then it would be expected the at least one primary general illumination lighting component 107 and/or the LED-based secondary general illumination lighting component 109 would be configured to provide less general illumination lighting as compared to if the ambient light, outside lighting, as well as other natural or man-made lighting, etc. is providing relatively little general illumination lighting. Also, certain embodiments the at least one LED-based secondary general illumination lighting component 109 could be expected to alter or modify the color of the general illumination lighting provided by the ambient light, outside lighting, as well as other natural or man-made lighting, etc. as well as the at least one primary general illumination lighting component 107. These are thereby a variety of embodiments of the at least one primary general illumination lighting component 107 and/or the at least one LED-based secondary general illumination lighting component 109, which can be configured radiate with a relatively complex spectra of electromagnetic radiation that can be used to efficiently generate visible general illumination lighting.

Figure 3:
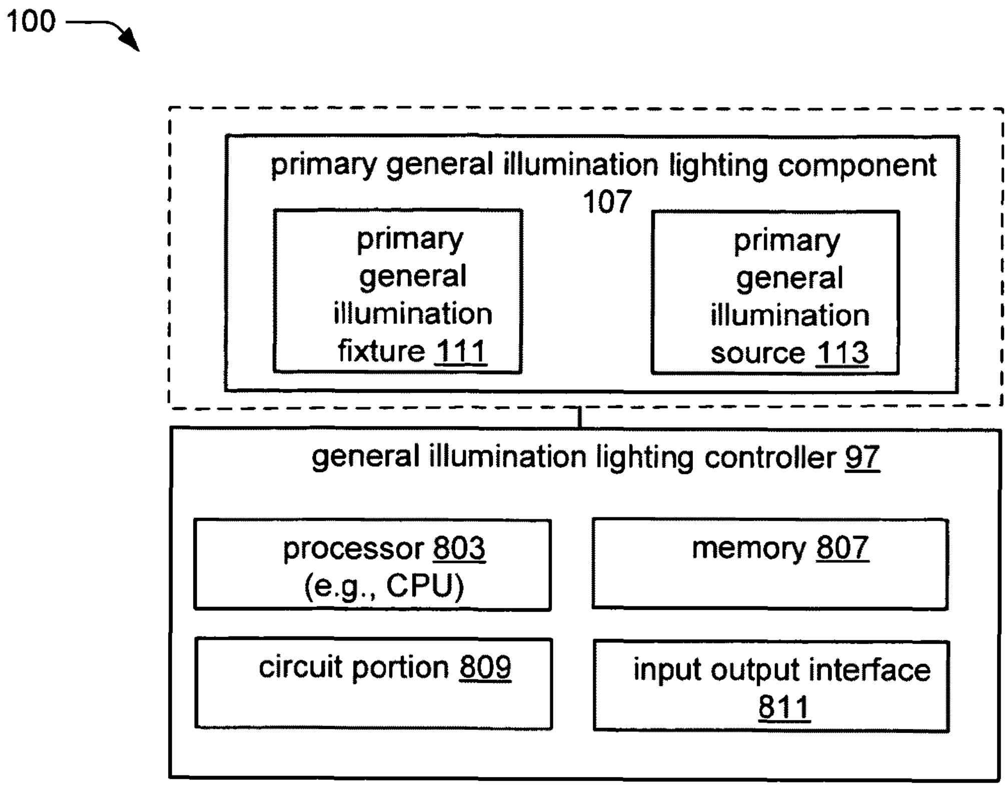
FIG. 3 is a block diagram of an embodiment of a general illumination lighting device or system including at least one primary general illumination lighting component.

A variety of embodiments of the at least one general illumination lighting device or system 100 can be configured with multiple ones of the at least one primary general illumination lighting component 107 (also possibly including the at least one primary general illumination fixture 111 and/or the at least one primary general illumination source 113 as shown in FIGS. 1 and 3) and/or at least one LED-based secondary general illumination lighting component 109 (also possibly including the at least one secondary general illumination fixture 117 and/or the at least one secondary general illumination source 119 as shown in FIG. 1), examples of such configurations which may be can be supplier and/or user assembled from components each of which has a distinct electrical and/or luminous function and which can be configured interact to enhance each other.

Consider the base and socket recognizable Edison-type screw-bulb is in very common usage, which may be expected to provide a common-interface of certain embodiments of the at least one primary general illumination lighting component 107 and/or the at least one LED-based secondary general illumination lighting component 109. In certain instances, for example, at least one sensor of the sensor and/or control portion 303 as described with respect to FIG. 5 can be physically as well as operationally combined with the at least one primary general illumination lighting component 107 (also possibly including the at least one primary general illumination fixture 111 and/or the at least one primary general illumination source 113 as shown in FIGS. 1 and 3) and/or the at least one LED-based secondary general illumination lighting component 109 (also possibly including the at least one secondary general illumination fixture 117 and/or the at least one LED-based secondary general illumination source 119 as shown in FIG. 1), such as may be configured to 'stack together' to realize an enhanced general illumination lighting function. One such function may be to at least partially provided a power-control unit, such as may be stacked between the fixture-socket and the controlled lamp, that may respond to user-commands, e.g., voice-given commands regarding some aspect of operation (e.g., "Turn off lighting", "Turn on lighting", "Dim lighting", "Brighter lighting", "Redder lighting", "Bluer lighting", etc.).

Certain embodiments of the at least one primary general illumination lighting component 107 and/or the at least one LED-based secondary general illumination lighting component 109 can include a "gentle-turn-on" function that minimizes electromagnetic and/or thermo-mechanical stresses and/or transient demands on the power-supplying means for the filament and other sensitive portions of the lamp. Such gentle-turn-on functions can be implemented by, for example, appropriate control of voltage and/or current vs. time applied to lamp terminals such as to draw an appropriate amount of current when first turned on. Certain typical conventional tungsten-based incandescent can draw, for example, approximately 15 times their steady-state power when they are first energized.

Figure 6:
FIG. 6 is a diagram of an embodiment of the general illumination lighting device or system including the at least one primary general illumination lighting component and/or the at least one LED-based secondary general illumination lighting component.

FIG. 6 illustrates a fluorescent embodiment of the at least one primary general illumination lighting component 107 (that can utilize a dimmer-for-gas-discharge or fluorescent lamps) which is combined with the at least one LED-based secondary general illumination lighting component 109. One gas-discharge (e.g., fluorescent) embodiment of the at least one primary general illumination lighting component 107 and/or at least one LED-based secondary general illumination lighting component 109 could use a dimmer could be retrofit-compatible with extant fluorescent primary general illumination lighting components 107 so as to confer high-quality dimmer performance on them. Certain ones of such control circuits can be configured to "interpret" the usual silicon controlled rectifier (SCR) clipped voltage-wave out of a dimmer-unit that may be used as a 'signal' of user-intent relating to dimming output and/or averaging output of the general illumination lighting, and also can be configured to extract from this voltage-wave (via a switcher/charge-pump and storage module) the time-averaged power required to operate a variable-duty-cycle exciter for the fluorescent lamp, albeit for a time-limited duration, in a rep-pulsed mode. For example, it can be configured to provide current pulses at 120 Hz rates to the filament or other element(s) 912, which rate would be adequate to 'visually appear' continuous to humans, in certain instances of a highly-variable pulse-width. It may be preferably desired to aid in this process by a continuously-sustained, very-low-level 'ionization maintenance' current through the lamp which can also be provided by the exciter.

Certain embodiments of the at least one primary general illumination lighting component 107 and/or the at least one LED-based secondary general illumination lighting component 109 could be configured to synthesize general illumination lighting of a desired color and/or intensity. An example of such desired general illumination lighting might be to provide similar to or intended to interact with that emitted from, for example, a variety of configurations of embodiments of the at least one primary general illumination lighting component 107 such as may be configured as energy-efficient "compact fluorescents", and thereupon realize a 'universal' retrofit such as may include the at least one sensor of the sensor and/or control portion 303 could be combined with the at least one LED-based secondary general illumination lighting component 109 could be configured as a modular unit, in which the at least one primary general illumination lighting component 107 could be configured to screw into, or otherwise operationally attach, to the modular LED-based secondary general illumination lighting component.

It might likely be desired in certain embodiments to provide a dimmer-function implementation such as could be used to adjust the at least one color and/or the intensities of the at least one color of the general illumination lighting, by employing the extant fluorescent lamps per se. Certain embodiments of the at least one primary general illumination lighting component 107 configured as compact fluorescents seemingly represent a considerable percentage of the entire general illumination lighting device or system 100, and could be produced in a relatively straightforward manner by modifying existing compact fluorescents to be included in modular unit including the at least one sensor of the sensor and/or control portion 303 as well as the at least one LED-based secondary general illumination lighting component 109. Such modified compact fluorescents included in certain embodiments of the general illumination lighting device or system 100 could therefore provide augmented general illumination lighting whose color, and intensity of at least one color, could be controlled or adjusted such as by the at least one LED-based secondary general illumination lighting component 109 being controlled, dimmed, etc. Certain embodiments of such dimming can be provided, for example, by turning the at least one LED-based secondary general illumination lighting component 109 and/or the at least one primary general illumination lighting component 107 on or off at such a high rate to provide a duty cycle that limits the output general illumination lighting.

Certain embodiments of the at least one LED-based secondary general illumination lighting component 109 may therefore be configured to augment certain undesirable colors and/or intensities of at least one color, as generated around the at least one primary general illumination lighting component 107. In certain instances, certain embodiments of the at least one LED-based secondary general illumination lighting component 109 can be configured as an add-on to an existing at least one primary general illumination lighting component 107. One example of such add-on embodiments can be configured as the at least one LED-based secondary general illumination lighting component 109 that provides secondary general illumination lighting whose color and/or intensity of one or more colors can be selected and/or controlled based at least partially responsive on primary general illumination lighting as provided by the at least one primary general illumination lighting component 107.

Figure 2:
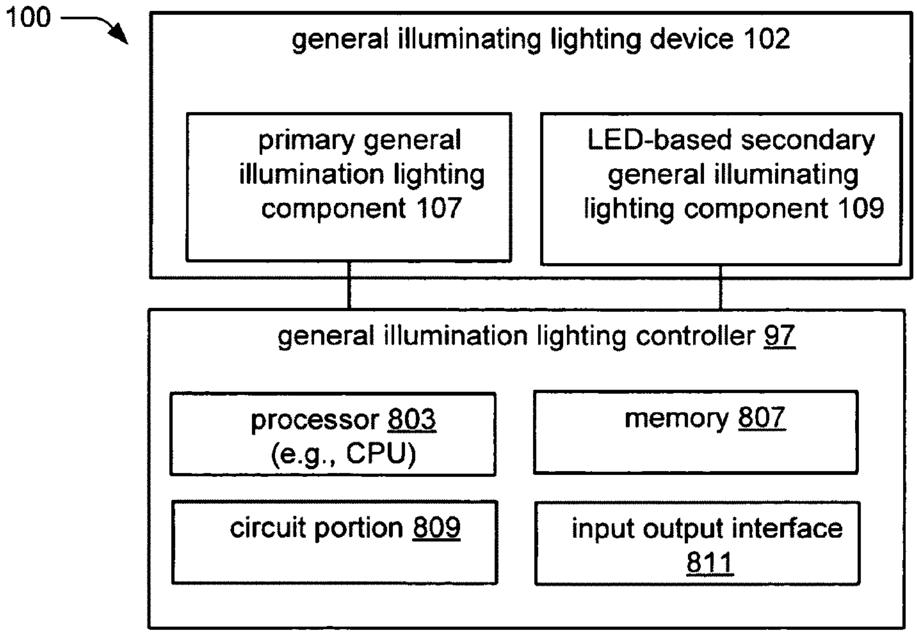
FIG. 2 is a block diagram of another embodiment of the general illumination lighting device or system including the at least one primary general illumination lighting component and/or the at least one LED-based secondary general illumination lighting component.

FIG. 2 shows one embodiment of the general illumination lighting device or system 100 that can be configured to provide general illumination lighting from the at least one of the primary general illumination lighting component 107 and/or the at least one LED-based secondary general illumination lighting component 109. In the FIG. 2 embodiment of the general illumination lighting device or system 100, the at least one primary general illumination lighting component 107 and/or the LED-based secondary general illumination lighting component 109 can be configured as a modular unit, which may or may not include the general illumination lighting controller 97, as described with respect to FIGS. 1 to 5. Certain embodiments of the primary general illumination lighting component 107 and/or the at least one LED-based secondary general illumination lighting component 109 may both or either be configured as a modular unit, as combined units, or as add-on lighting units. As such, certain embodiments of the general illumination lighting device or system 100 can be configured such that the primary general illumination lighting effect or characteristic as provided by the at least one primary general illumination lighting component 107 can be modified and/or altered based at least partially on the addition of the secondary general illumination lighting effect or characteristic of the general illumination lighting as provided by the at least one LED-based secondary general illumination lighting component 109.

Certain embodiments of each of the at least one primary general illumination lighting component 107 can be divided into multiple or numerous primary general illumination lighting components (e.g., an array, spaced general illumination lighting devices or components, etc.). Certain embodiments of each of the at least one LED-based secondary general illumination lighting component 109 can be divided into multiple or numerous LED-based secondary general illumination lighting components. Certain reasons for combining general illumination lighting from multiple ones of the at least one primary general illumination lighting component 107 and/or the at least one LED-based secondary general illumination lighting component 109 can include, but may not be limited to, altering the luminescence or intensity of the general illumination lighting, altering color and/or effect of the general illumination lighting, allowing for more precise control of the generation of various colors and/or intensities at one or more colors, etc.

As such, certain embodiments of the at least one primary general illumination lighting component 107 can be provided as a distinct unit from the at least one LED-based secondary general illumination lighting component 109. Alternately, certain embodiments of the at least one primary general illumination lighting component 107 can be provided within a unitary, modular, integrated, and/or combined device as compared with the at least one LED-based secondary general illumination lighting component 109, as described with respect to FIG. 1 or 2. For instance, certain embodiments of the at least one primary general illumination lighting component 107 can be fabricated to be operationally positioned in close proximity with, or as a unitary device, with certain embodiments of the at least one LED-based secondary general illumination lighting component 109. FIG. 2 shows an embodiment of the general illumination lighting device or system 100 in which the at least one primary general illumination lighting component 107, as well as the at least one LED-based secondary general illumination lighting component 109 included within a general illumination lighting device 102 such as a modular unit or a combined unit. FIG. 1 shows certain embodiments of the general illumination lighting device or system 100 that includes the at least one primary general illumination lighting component 107 and the at least one LED-based secondary general illumination lighting component 109 that are not integrated within a general illumination lighting device.

Figure 4:
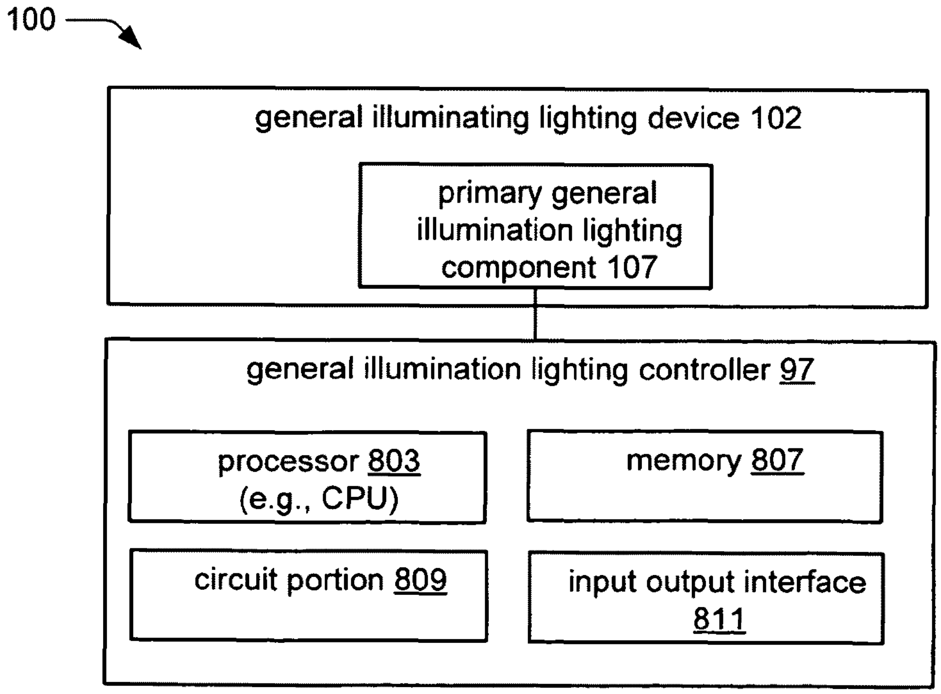
FIG. 4 is a block diagram of yet another embodiment of the general illumination lighting device or system including the at least one primary general illumination lighting component.

Certain embodiments of the at least one primary general illumination lighting component 107 can be provided as distinct unitary or combined units, as described respectively with respect to FIGS. 3 and/or 4. For instance, certain embodiments of the at least one primary general illumination lighting component 107 and the at least one sensor and/or control portion 303 (or the general illumination lighting controller 97) can be fabricated as a unitary device that can operate alone or in combination with other devices. FIG. 4 shows one embodiment of the general illumination lighting device or system 100 that includes the at least one primary general illumination lighting component 107 included within a general illumination lighting device 102, such as a modular unit or a combined unit. Such modular or combined units can include, for example, some combination of the at least one primary general illumination lighting component 107 and/or the at least one LED-based secondary general illumination lighting component 109, the at least one sensor and/or control portion 303 as described with respect to FIG. 5, and/or the general illumination lighting controller 97, as described in this disclosure. In the FIG. 4 embodiment of the general illumination lighting device or system 100, the at least one primary general illumination lighting component 107 can be configured as a modular unit, which may or may not include the general illumination lighting controller 97. FIG. 3 shows one embodiment of the general illumination lighting device or system 100 that includes the at least one primary general illumination lighting component 107 that is not integrated within a general illumination lighting device.

Certain add-on embodiments of the general illumination lighting device or system 100 can be associated with (and operationally integrate) certain conventional gas discharge lights or lamps. Certain add-on embodiments of the general illumination lighting device or system 100 may be advantageously configured as modular units that can be operationally and/or structurally associated with the conventional gas discharge light or lamp. Certain of these modular units may interface with other existing or newly added general illumination devices (e.g., fluorescent or incandescent lamps) that may be configured as and/or act as certain embodiments of the at least one primary general illumination lighting component 107.

Certain embodiments of the general illumination lighting device or system 100 can therefore include the at least one LED-based secondary general illumination lighting component 109 and the at least one sensor 316 of the sensor and/or control portion 303 that can be configured as certain embodiments of the add-on or combined unit, such as may be added to an existing conventional light that may be configured as the at least one primary general illumination lighting component 107. Certain embodiments of the at least one primary general illumination lighting component 107 can be configured as a conventional fluorescent, incandescent, plasma, solid state, or other light. Certain embodiments of the at least one LED-based secondary general illumination lighting component 109, such as described with respect to FIG. 6, can be configured as the add-on light that is structurally and operationally associated with the at least one sensor and/or control portion 303 as described in this disclosure. For instance, the at least one sensor and/or control portion 303 with the at least one LED-based secondary general illumination lighting component 109 can be configured to interface with the at least one primary general illumination lighting component 107 to approach or achieve the general illumination lighting target. The combined add-on unit therefore can physically or operationally combine the at least one LED-based secondary general illumination lighting component 109 and/or the at least one sensor and/or control portion 303; and the add-on unit can be added on to existing primary general illumination lighting component 107 such as a fluorescent light, for example. In the general illumination lighting device or system 100 as described with respect to FIG. 6, certain embodiments of the at least one LED-based secondary general illumination lighting component 109 can, using the sensing and/or control of the sensor and/or control portion 303, effect or alter the one or more colors of general illumination lighting and/or intensity of the colors of the light being provided by certain embodiments of the at least one primary general illumination lighting component 107 (and/or the ambient light).

The color and/or intensities at one or more colors of the general illumination lighting, as provided by certain embodiments of the general illumination lighting device or system 100, that include at least one gas discharge-based primary general illumination lighting component 107, can be adjusted or controlled by controlling the intensity of the electrical current and/or voltage passing through the at least one gas discharge-based primary general illumination lighting component 107. Such adjustment or controlling can be used, for example, to approach or achieve the general illumination lighting target. Consider, for instance, the at least one incandescent-based primary general illumination lighting component 107 described with respect to FIG. 6, in which a greater intensity of the output from the primary general illumination lighting as compared with the secondary general illumination lighting (which may include adapting to ambient general illumination lighting). Under certain circumstances, the amount of secondary general illumination lighting associated with providing certain color enhancing aspects (and the associated energy associated with generating the secondary general illumination lighting) by the at least one LED-based secondary general illumination lighting component 109 may likely be relatively small. It may be desired to maximize the percentage of general illumination lighting being provided by the at least one LED-based secondary general illumination lighting component 109 with certain embodiments of the general illumination lighting device or system 100.

If the electricity (current and/or voltage) flowing through certain gas discharge embodiments of the primary general illumination lighting component 107 falls below a prescribed limit, however, the primary general illumination lighting component 107 may turn off, and provide little or no illumination. In this manner, the color of light provided by certain embodiments the general illumination lighting device or system 100 that include the at least one gas discharge-based primary general illumination lighting component 107 and the at least one LED-based secondary general illumination lighting component 109 can be controlled by adjusting or controlling the intensity of the primary general illumination lighting provided by the at least one gas discharge-based primary general illumination lighting component 107. By comparison, a lesser intensity of the output from the primary general illumination lighting as compared with the secondary general illumination lighting as well as ambient general illumination lighting results in a lesser percentage of the overall general illumination lighting being provided by the at least one gas discharge-based primary general illumination lighting component 107. Under these circumstances, the color enhancing aspects of the at least one LED-based secondary general illumination lighting component 109 may likely have a relatively enhanced effect. The intensity of the general illumination lighting provided by certain embodiments of the at least one gas discharge-based primary general illumination lighting component 107 can often be altered within a prescribed and determinable range by controlling the electricity flowing there through in such a manner.

Certain embodiments of the general illumination lighting as provided by certain embodiments of the general illumination lighting device or system 100 can be considered as a combination of the at least some primary general illumination lighting as provided by the at least one primary general illumination lighting component 107 as well as the at least some secondary general illumination lighting as provided by the at least one LED-based secondary general illumination lighting component 109. By comparison, certain embodiments of the general illumination lighting as provided by certain embodiments of the general illumination lighting device or system 100 can be provided by modifying, or otherwise augmenting, the at least some primary general illumination lighting as provided by the at least one primary general illumination lighting component 107.

The positioning of certain embodiments of the at least one primary general illumination lighting component 107 with certain embodiments of the at least one LED-based secondary general illumination lighting component 109 can lead to such aspects as desirable general illumination lighting color or intensity at one or more colors, as well as improved energy luminescence efficiency. For example, certain embodiments of the at least one primary general illumination lighting component 107 can provide relatively efficient global general illumination for a relatively large region or area (such as an exhibition room, stadium, outdoor space, etc.). By comparison, certain embodiments of the at least one LED-based secondary general illumination lighting component 109 can augment the general illumination lighting within selected (e.g., perhaps relatively large or small portions) of the region or area, or alternately all of the region or area being illuminated. For example, if a person was interested in providing quality lighting of a desired or suitable one or more colors of general illumination lighting and/or intensity of one or more colors where they, or other persons, events, things to be generally illuminated, etc. were located, then the at least one primary general illumination lighting component 107 could be used to provide primarily un-augmented light to the majority of the stadium. Only areas of particular interest (or desire to illuminate the region or a surface in a particular manner) need to be augmented with certain embodiments of the LED-based secondary general illumination lighting component 109. Since the overall energy used by un-augmented general illumination light as provided by the primary general illumination lighting component 107 can be reduced if not concerned with having to provide very good illumination lighting coloring, only those regions of interest in which augmented general illumination light is desired need to be augmented by the addition of certain embodiments of the LED-based secondary general illumination lighting component 109. Such regions of interest that are to be augmented can be static in certain embodiments of the general illumination lighting device or system 100, or alternately can be displaced or controlled in certain embodiments of the general illumination lighting device or system 100.

Figure 7:
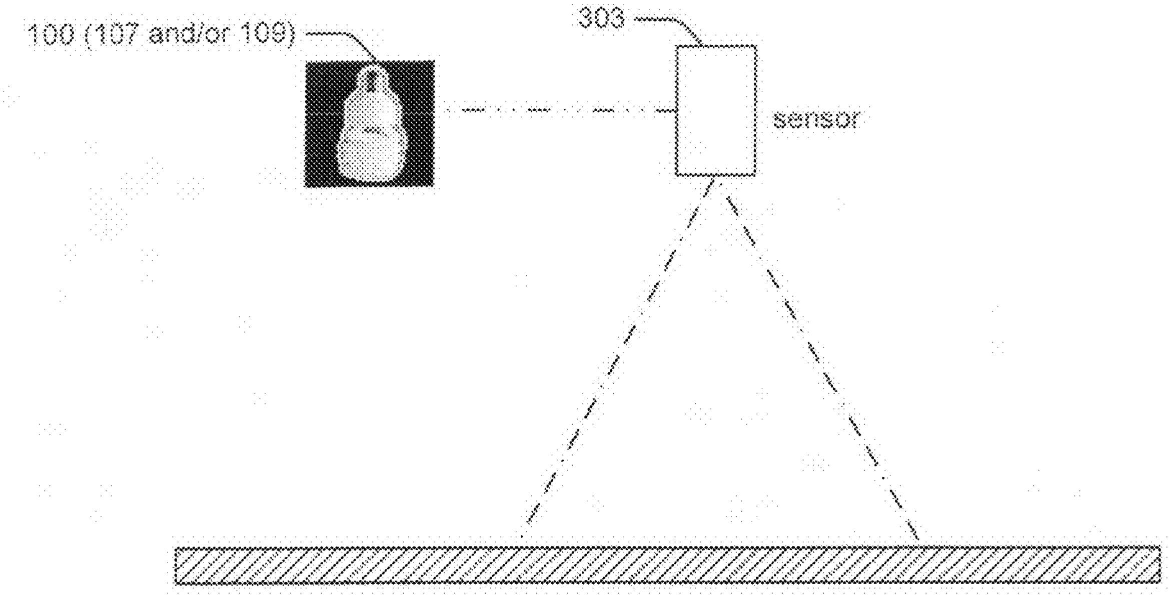
FIG. 7 is a diagram of one example of relative positioning of an at least one sensor of the sensor and/or control portion relative to other portions of the general illumination lighting device or system.
Figure 8:
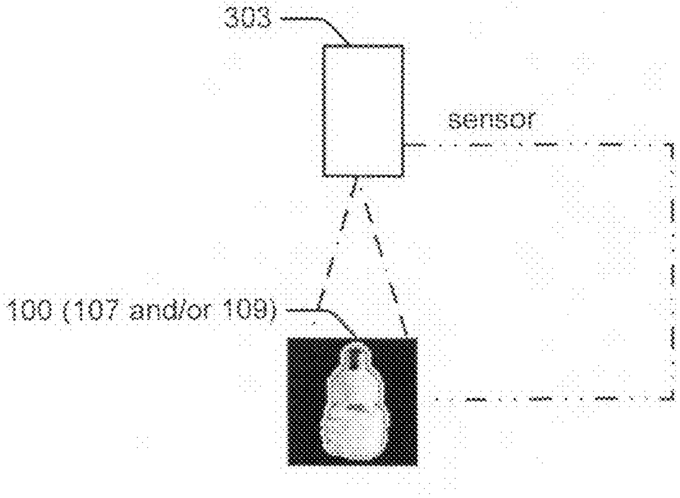
FIG. 8 is a diagram of one example of relative positioning of the at least one sensor of the sensor and/or control portion relative to other portions of the general illumination lighting device or system.

Certain embodiments of the general illumination lighting device or system 100 can provide direct general illumination lighting in which the sensor of the sensor and/or control portion 303 receives light substantially directly from the at least one primary general illumination lighting component 107 and/or the at least one LED-based secondary general illumination lighting component 109, with the general illumination lighting passing through a media such as air. Other embodiments of the general illumination lighting device or system 100 can provide indirect general illumination lighting in which the at least one sensor 316 of the sensor and/or control portion 303 of FIG. 5 receives light substantially indirectly from the at least one primary general illumination lighting component 107 and/or the at least one LED-based secondary general illumination lighting component 109, with the general illumination lighting reflecting off at least one surface, passing through a media that differs from air such as glass, etc. FIGS. 7 and 8 show a variety of illustrative but not limiting embodiments of the general illumination lighting device or system 100 illustrating a variety of relative positioning of the at least one primary general illumination lighting component 107 and/or the LED-based secondary general illumination lighting component 109 relative to the at least one sensor 316 of the sensor and/or control portion 303 (as described with respect to FIG. 5) that can be configured to effect the sensing of the one or more colors and/or intensity at one or more colors of the general illumination light as provided by certain embodiments the at least one primary general illumination lighting component 107, the at least one LED-based secondary general illumination lighting component 109, as well as ambient or other natural or man-made light.

As described with respect to FIG. 7, certain embodiments of the at least one sensor and/or control portion 303 can be configured or positioned to sense light directed by the general illumination lighting device or system 100 that reflects off at least one surface 722. The color as well as the intensities of one or more color(s) of the general illumination lighting as well as ambient light that is reflected, deflected, or otherwise emanates from the surface 722 can be some combination (using additive and/or subtractive optical techniques) of the general illumination lighting as provided by the at least one primary general illumination lighting component 107 and/or the at least one LED-based secondary general illumination lighting component 109, the color and/or intensity of the ambient light, as well as the color, texture, and other color-relative features of the at least one surface 722. As with certain other embodiments of the general illumination lighting device or system 100, the effects of ambient light can be considered relative to the combination of the at least one primary general illumination lighting and/or the at least one secondary general illumination lighting.

As described with respect to FIG. 8, certain embodiments of the at least one sensor and/or control portion 303 can be positioned some distance from at least certain portions of the general illumination lighting device or system 100 to sense directly color and/or intensity of general illumination lighting as provided from the at least one primary general illumination lighting component 107, ambient light, and/or the at least one LED-based secondary general illumination lighting component 109 as may be provided either directly or indirectly via a media (e.g., air, glass, etc.) from the general illumination lighting device or system 100. In such instances, the color and/or intensity of the general illumination lighting as obtained by the sensor and/or control portion 303 from certain embodiments of the at least one primary general illumination lighting component 107 and/or the at least one LED-based secondary general illumination lighting component 109 is often a function of the color of the light emanating from the at least one primary general illumination lighting component 107, the ambient light, and/or the at least one LED-based secondary general illumination lighting component 109, as well as the color of the media through which the general illumination lighting passes.

Certain embodiments of the at least one primary general illumination lighting component 107 and/or the at least one LED-based secondary general illumination lighting component 109 can therefore be positioned at different positions and distances from the sensor and/or control portion 303, as well as surfaces and/or spaces that could be illuminated by certain embodiments of the general illumination lighting device or system 100. Such factors can be used to make providing relative uniformity of the general illumination lighting within a region or across surfaces that may be relatively computationally complex in certain instances. Such techniques as adaptive filtering, error reduction, image processing, etc. can be used to increase the uniformity of the general illumination lighting as provided by certain embodiments of the general illumination lighting device or system 100 within at least one region and/or across at least one surface. The general illumination lighting from certain embodiments of the general illumination lighting device or system 100 can be adjusted or controlled such as to be directed at certain locations or at places of interest. In certain embodiments of the general illumination lighting device or system 100, the at least one sensor 316 of the sensor and/or control portion 303 of FIG. 5 can be positioned at different locations from the general illumination lighting controller 97 as described with respect to FIGS. 1 to 5, but for purposes of simplicity in this disclosure the sensor portion may be described as coincident with the controller portion.

As such, certain embodiments of the sensor and control portion 303 can be configured to sense and/or control the one or more colors and/or intensity at one or more colors of the general illumination lighting, as provided by certain embodiments of the general illumination lighting device or system 100. If the desired one or more colors of the general illumination lighting and/or intensity at one or more colors as can be provided by certain embodiments of the general illumination lighting device or system 100 can involve a prescribed setting of the at least one primary general illumination lighting component 107 as combined with a prescribed setting from the at least one LED-based secondary general illumination lighting component 109 such as with spectral values that can be quantified using analog techniques, digital techniques, or other information type techniques, then the primary general illumination lighting component 107 and the LED-based secondary general illumination lighting component 109 can be set accordingly. As such, certain embodiments of the sensor and/or control portion 303 can determine the settings of the at least one primary general illumination lighting component 107 and the at least one LED-based secondary general illumination lighting component 109 that can achieve a variety of desired colors and/or intensities of one or more colors at a surface or within a region.

A variety of configurations of the sensor and/or control portion 303 can be configured to act using a variety of techniques. Certain embodiments of the sensor and/or control portion 303, as well as a general illumination lighting controller 97, can be configured to compare the general illumination lighting to the general illumination lighting target. The more precise the controllability of one or both of the at least one primary general illumination lighting component 107 and the at least one LED-based secondary general illumination lighting component 109 can lead to increasing the adjustability, adaptability, or controllability of the color, intensity, and/or spectral intensity of the general illumination lighting provided by certain embodiments of the general illumination lighting. Certain aspects of the controllability of one or both of the at least one primary general illumination lighting component 107 and the at least one LED-based secondary general illumination lighting component 109 can result from such factors as dimmer circuits or varying electrical sources being applied to certain of the lighting components, etc. For example, there might be one or a variety of general illumination lighting parameters that can be sensed using certain embodiments of the at least one sensor 316 of the sensor and/or control portion 303, and from that a difference between the general illumination lighting target as representative of a desire to setting, and the detected are or measured setting of the general illumination lighting can be determined. Certain embodiments of the general illumination lighting controller 97 can use the difference between a desired setting and the detected setting to control general illumination lighting of the general illumination lighting device or system 100.

Certain gas discharge embodiments of the at least one primary general illumination lighting component 107 and/or the at least one LED-based secondary general illumination lighting component 109 are now described. The use of particular gas discharge (including, but not limited to, fluorescent) materials that can condense at higher operating temperatures such as at preferred locations on the filament or other element(s) 912, such as in certain gas-discharge embodiments of the at least one primary general illumination lighting component 107. Mercury (Hg) may be employed as a 'basal' material in such gas discharge lamps as fluorescent lamps largely because it has a suitable vapor pressure at room-temperature to source the gas discharge general illumination lighting. At least certain of the alkali and/or alkaline earth metals may be as attractive for the photo-physical performance as sources of electrically-excited fluorescence radiation, although they may have relatively low vapor pressures at room temperature. However, the use of mercury in such high use areas as from the gas discharge lamps, such as fluorescent lamps, is undesirable, since they necessitate such considerations as hazardous material disposal as well as potential health dangers associated therewith. It is therefore envisioned that certain embodiments of the primary general illumination lighting component 107 can utilize alkali or alkaline earth metals, as to satisfy a variety of potentially impending anti-mercury regulatory considerations.

Certain fluorescent alkali or alkaline earth metal embodiments of the at least one primary general illumination lighting component 107 can be configured to operate with considerable energy luminescence efficiency. To provide such operations for alkali or alkaline earth metal embodiments of the at least one primary general illumination lighting component 107, it may therefore be important to provide for usefully-high densities of fluorescent atoms quite quickly; for example, within less than 0.3 seconds after operational power is applied to them. One approach is to provide transiently-high-power heating of at-least-one supply or 'pot' of fluorescent material at or prior to each time the lamp commences operation, so as to vaporize at least a portion of its contents. Certain embodiments of the supply or 'pot' is positioned and configured such as to cool (e.g., by radiation, or into a cool portion of the lamp, such as its 'base') more rapidly than its surroundings when the lamp is powered-down, and thus to condense a usefully-large fraction of the vaporized-during-operation fluorescent material back into it. Such condensation of the vaporized fluorescence material can be configured to facilitate prompt re-evaporation upon the next start-up of the various embodiments (which may or may not include alkali or alkaline earth metal) of the at least one primary general illumination lighting component 107.

An alternate approach is to simply heat the pertinent inner portions of the lamp, certain ones of which contain the fluorescent material(s), at considerably higher than conventional power-levels until these portions come up to temperatures which adequately vaporize the material(s). This forced heating by drawing more power from the lamp's power-supply for time-scales can be performed in the order of seconds. In variety of embodiments, the masses of the inner-portion could preferably be of the order of tens of grams, and that heat-capacities are of the order of 100 J/gm to move from 25 degrees C. to the few-hundred degrees C. are of interest. As such, a relatively small amount (e.g., less than one to a few kJoules might well suffice to properly heat such as to provide for desirable general illumination lighting as the primary general illumination lighting component having a 1000-3000 W luminous output range is initially 'fired up' or started.

For certain mass-utilization circumstances (e.g. of large areas illuminated by dozens or more of such primary general illumination lighting component 107 and/or LED-based secondary general illumination lighting component 109), a 'smart' power-on feature can be utilized in the general illumination lighting component's 'base' that could likely refrain from drawing 'more-than-normal' power from the utility line whenever the present line-voltage was less than approximately 95% of the long-term-average value. Indeed, such consideration of efficiency relating to of start-up power-draw might provide considerable energy efficiency returns. Certain embodiments of the at least one primary general illumination lighting component 107 and/or the at least one LED-based secondary general illumination lighting component 109 can be configured to operate with two or more stages or modules in a power-on or power-off sequence.

To accomplish this, it may be desirable to utilize certain embodiments of the at least one primary general illumination lighting component 107 and/or the at least one LED-based secondary general illumination lighting component 109 whose power supplies applied at least two types-or-modes of excitation to them, in the process of either starting them up or shutting them down. A specific example is the maintenance of a fluorescent lamp in an "instantly ready-to-go" condition involves the maintenance of minimal end-to-end ionization (e.g., with a very small micro-Amp-level of 'trickle current' from which ionization-bootstrapping could be induced without excessive terminal-voltage being required). This trickle current preferably does not rise to the level of a "vampire power draw" in the US Department of Energy sense of the term, considering the power-involved may in numerous configurations operate within the mWatt range, not in the Watt range.

Certain incandescent, gas discharge, fluorescent, or other embodiments of the at least one primary general illumination lighting component 107 and/or the at least one LED-based secondary general illumination lighting component 109 may be configured as or be considered as a "smart" device, to adequately respond to their exceedingly variable output impedance. Certain incandescent, gas discharge, fluorescent, or other embodiments of the at least one primary general illumination lighting component 107 and/or the at least one LED-based secondary general illumination lighting component 109 typically operate as if they are configured to start under lamp-conditions which are electrically very different than those at which they are configured to operate. Additionally, the conditions at which they are configured to operate may be quite different than conditions under which they may be, at-least-occasionally, desired to operate.

Consider that at start-up, certain embodiments of the at least one primary general illumination lighting component 107 and/or the at least one LED-based secondary general illumination lighting component 109 typically have very high impedances at start-up due, at least in part, to their relatively cool starting temperatures. However, there starting impedances often 'evolve' very rapidly into far lower impedances as their operating increase (often with negative slope-resistance characteristics). Certain conventional gas-discharge systems often utilize 'ballasts' to effectively inject inductive reactance in series with such lamps in such a manner as to substantially stabilize their power levels during startup, normal operation, controlling operation, shut down, etc.

This disclosure provides a number of embodiments of switching-type supplies which efficiently sources into the lamp that satisfies supply aspect (current, voltage power, impedance, etc.) which optimizes energy luminescence efficiency under all lamp (e.g., thermal) conditions, or alternatively which provides light-output that satisfies a variety of user's demands as well as the supply aspects (e.g., which is capable of also delivering suitably-high 'start-up' voltages to compensate for relatively high impedance). Certain embodiments of such switching-type supplies may differ from conventional electronic ballasts, in that they may, e.g., impose a "maintenance current" of minimal magnitude on the lamp considering the impedance or other electronic state, and which then apply "production current" which may be sufficient to generate photons as necessary. Certain embodiments of such switching-type supplies may also be configured as power-control modules which embed a processor to provide a physical model of the lamp(s) being controlled, and thereby permit at least some automation as well as perform significantly more optimally. In particular, certain embodiments of the general illumination lighting device or system 100 can enable dimming of 'ordinary' fluorescent lamps by imposing a highly-variable duty-cycle of more-or-less full operational current "on top of" the maintenance current, moreover at a frequency well above the flicker-frequency of the human retina, so that lamp photo-output may be served over a few dozen decibel (dB) range that can diminish the associated 'flutter'/'flicker' or low-energy luminescence efficiency operation.

Certain incandescent embodiments of the at least one primary general illumination lighting component 107 and/or the at least one LED-based secondary general illumination lighting component 109 provide a nearly inverse starting and/or operating characteristics as compared with fluorescent or other gas discharge embodiments of the at least one primary general illumination lighting component 107 and/or the at least one LED-based secondary general illumination lighting component 109; however certain fundamentally similar solutions may be applied. For instance, certain incandescent embodiments of the at least one primary general illumination lighting component 107 and/or the at least one LED-based secondary general illumination lighting component 109 can be provided with switcher-type power-supplies of very highly-variable voltage outputs such as can provide suitable impedances during startup, normal operating, varied operating, shut down, and other suitable conditions. Certain embodiments of the general illumination lighting controller 97 can be configured to be, for example, embedding in various portions of the lamps, or proximate thereto, such as which sense lamp characteristics sufficiently accurately and often enough to be operate the lamp to respond to user demands.

Figure 9:
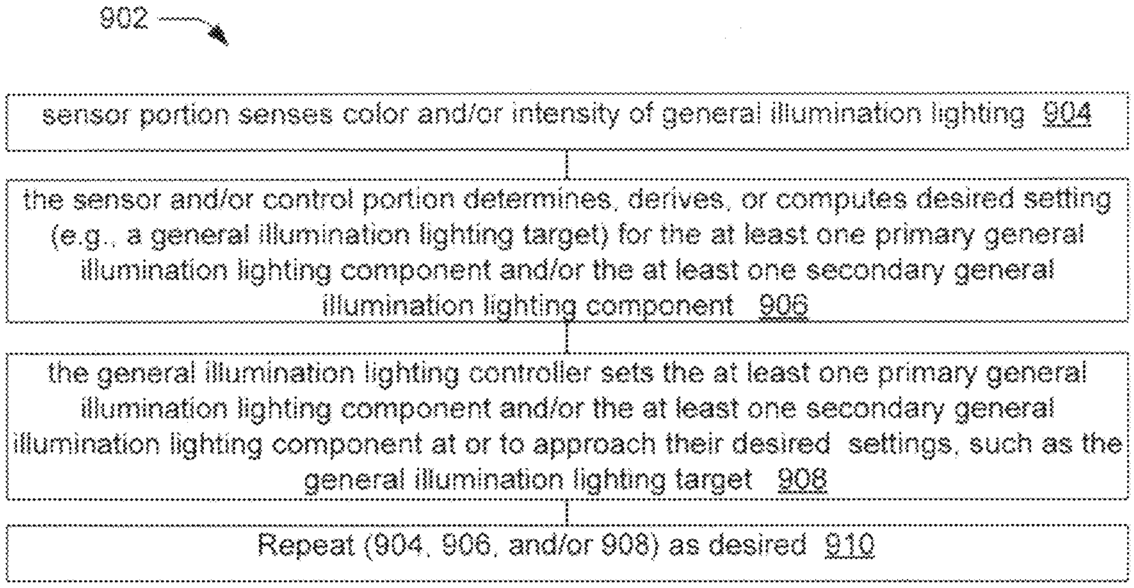
FIG. 9 is a flow chart of one embodiment of a general illumination lighting sensing and control technique as can be performed using certain embodiments of the sensor and/or control portion associated with the general illumination lighting device or system.

FIG. 9 shows one embodiment of a general illumination lighting sensing and control technique 902 that includes processes 904, 906, 908, and/or 910. Certain embodiments of the general illumination lighting sensing and control technique 902 can be used by the at least one sensor and/or control portion 303 and/or the general illumination lighting controller 97 as described with respect to FIGS. 1, 2, 3, 4, and/or 5, as well as other locations in this disclosure, to sense and/or control the operation(s) of the general illumination light as provided by at least one primary general illumination lighting component 107 and/or the at least one LED-based secondary general illumination lighting component 109, as well as ambient light, other natural or man-made lights, etc. Certain embodiments of the process 904 can include, but is not limited to, the at least one sensor 316 of the sensor and/or control portion 303 to sense the one or more colors and/or intensity at one or more colors of the general illumination lighting as provided by the general illumination lighting device or system 100. Certain embodiments of the general illumination lighting device or system 100 may operate without the use or process 904 within the general illumination lighting sensing and control technique 902. For example, it might be possible for the at least one sensor 316 of the sensor and/or control portion 303, as described with respect to FIG. 5, to observe the general illumination lighting color and/or intensity within a room, or one or more surfaces within the room such as may be used to monitor whether the color and/or intensities at one or more colors is within desired or allowed limits.

Alternately, the at least one sensor 316 of the sensor and/or control portion 303 can be directed at certain lights (which may include general illumination lighting from the at least one primary general illumination lighting component 107 and/or the at least one LED-based secondary general illumination lighting component 109, as well as ambient light) that may be providing desired general illumination lighting. For example, certain embodiments of the at least one sensor 316 of the sensor and/or control portion 303, which may be associated with the at least one general illumination lighting controller 97, can be configured to control additional light to the general illumination lighting provided by the at least one primary general illumination lighting component 107, the at least one LED-based secondary general illumination lighting component 109, ambient general illumination lighting, or other man-made or natural general illumination lighting as to provide the same or similar general illumination lighting one or more colors of general illumination lighting and/or intensity at one or more colors Consider multiple general illumination lights, some being older or being used for some time, while others such as replacement or new lights. Such different lights having different types (incandescent, fluorescent, gas discharge, etc.), operating durations, the limit configurations, etc. will likely produce different colors and/or intensities of general illumination lighting. Certain embodiments of the general illumination lighting controller 97 can attempt to control the general illumination lights either alone or in combination with ambient lights as to provide similar or desired general illumination lighting regardless of age, start-up characteristics, end of life characteristics, etc, as a result of detected condition. There may be a variety of general illumination lighting parameters that can be detected or sensed that may include, but is not limited to: detecting luminescence condition in a region such as a room or outside, or surface; or combination of detecting output, and detecting features of room.

Certain embodiments of the process 906 of the general illumination lighting sensing and control technique 902 of FIG. 9 can include, but is not limited to, the sensor and/or control portion 303 determining, deriving, and/or computing desired settings for the at least one primary general illumination lighting component 107 and/or the at least one LED-based secondary general illumination lighting component 109 (e.g., to provide the general illumination lighting target). Such sensing and/or control can be performed, at least partially, by the general illumination lighting controller 97 and/or the sensor and/or control portion 303 (which can operate together or separately in different embodiments of the general illumination lighting device or system 100) as described with respect to FIGS. 1 to 5, as well as other locations in this disclosure.

Such settings as can be applied to the general illumination lighting controller 97 and/or the sensor and/or control portion 303 can be based on such aspects as, for example, the primary general illumination lighting one or more colors of general illumination lighting and/or intensity, the secondary general illumination lighting color and/or intensity, the ambient light, the one or more colors of general illumination lighting of illuminated surfaces or media, etc. Certain embodiments of the process 908 of the general illumination lighting sensing and control technique 902 can include, but is not limited to, the general illumination lighting controller 97 and sensor and/or control portion 303 sets the at least one primary general illumination lighting component 107 and/or the at least one LED-based secondary general illumination lighting component 109 at or to approach their general illumination lighting target (which may be configured in a sequential loop such as to recursively approach a desired color, intensity, and/or spectral intensity setting). Certain embodiments of the process 910 of the general illumination lighting sensing and control technique 902 as described with respect to FIG. 9 can include but are not limited to repeating processes 904, 906, 908, and/or 910 as desired or appropriate.

Certain embodiments of the general illumination lighting device or system 100 can be configured to augment or modify constant or variable existing light, or be applied to constant or variable conditions. For example, certain embodiments the general illumination lighting device or system 100 can be applied to outside conditions such that the intensity at one or more colors of the general illumination lighting as provided by certain embodiments of the at least one primary general illumination lighting component 107 and/or the LED-based secondary general illumination lighting component 109 can be varied as the ambient light varies.

Certain embodiments the general illumination lighting device or system 100 can be configured to provide at least some general illumination lighting that enhances viewing, imaging, photography, or other uses. Enhancing the intensity by certain colors that would considerably improve the intended purpose of the general illumination lighting device or system 100 (while limiting the intensity of other colors) may be desired. For example, consider that certain conventional incandescent lamps provide relatively broadband general illumination lighting (e.g., even including some light in the non-visible infrared and/or ultraviolet ranges), much of which plays little or no factor in improving general illumination lighting for humans.

Figure 10:
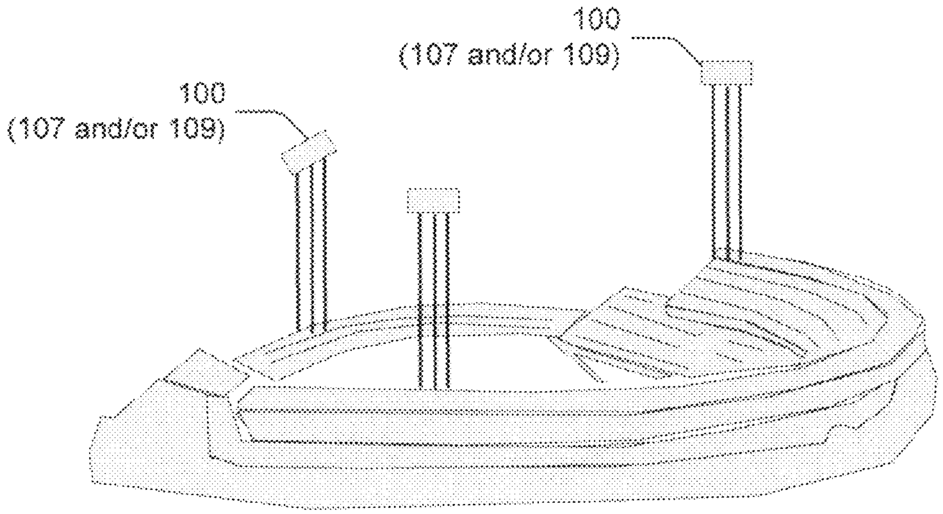
FIG. 10 is another embodiment of the general illumination lighting device or system that may be used for general illumination lighting within a large outdoor area such as a stadium.

The FIG. 10 embodiment of the general illumination lighting device or system 100 can be configured to provide the general illumination lighting for an athletic field, a stadium, an outdoors location, etc. Such outdoor concepts and the embodiment of the general illumination lighting device or system 100 can also be applied to relatively large outdoor spaces, certain areas of which the quality of illumination is relatively important, but in certain areas the illumination quality (such as one or more colors of general illumination lighting and/or intensity at one or more colors) to the general illumination lighting target may not be particularly important. The amount of energy involved with lighting the stadium is considerable with conventional lighting for athletic stadiums. Certain embodiments of the general illumination lighting device or system 100 could limit such energy spent by limiting the brightest or greatest quality lighting to those areas that require such bright lighting or good quality lighting.

Consider that relative to the FIG. 10 embodiment, while it may be important to provide augmented or enhanced general illumination lighting (e.g., "secondary illumination lighting level) to certain portions of the athletic stadium such as around a baseball pitchers mound, around a batter's box, at a football or soccer playing field, nearby a basketball hoop, etc. to the general illumination lighting target. It may not be as important to provide quality lighting to certain other portions such as seats, remote portions of the playing field, the roof, etc., in which the primary general illumination lighting acting alone or in combination with ambient light may suffice. As such, certain embodiments of the at least one primary general illumination lighting component 107 can be used to provide the general low level of lighting that may be used by the majority of the stadium. Additionally, it may be desirable to augment particular regions of the athletic stadium that are in common use, or alternately some activity is focused on (e.g., left field in a baseball game when there is a hit to left field). Such adjustment, synthesis, and/or control of general illumination lighting in certain instances to a particular desired or synthesized color, intensity, and/or spectral intensity based on its particular location can be performed in a variety of ambient or other lighting conditions.

At times when the ambient light is within appropriate limits to the desired general illumination lighting conditions, the general illumination lighting device or system 100 may be configured to limit general illumination lighting as provided by at least one primary general illumination lighting component 107 and/or the at least one LED-based secondary general illumination lighting component 109 to only enhancing the color and not actually providing general illumination lighting for illumination purposes. When certain embodiments of the general illumination lighting device or system 100 is configured to provide general illumination lighting color only, it would be expected that the amount of necessary emitted general illumination lighting by the at least one primary general illumination lighting component 107 and/or the at least one LED-based secondary general illumination lighting component 109 could be reduced considerably, thereby improving the energy luminescence efficiency.

Certain embodiments of the general illumination lighting device or system 100 may be configured not only to provide relatively intense lighting to certain desired areas, but instead to provide general illumination lighting of a desired one or more colors of general illumination lighting and/or intensity of the at least one color. As such, a more limited illumination may provide improved lighting with the same or less energy spent on lighting. The augmentation of the particular regions of the athletic field or stadium, as well as other areas to be lit, for example, may be selected based at least partially on such factors which an general illumination lighting designer may consider (e.g., how much space or regions certain athletes need to be illuminated, such as a concert or baseball game would be expected to require considerably more area to undergo enhanced or augmented general illumination lighting than a high jump event, for example). It might be desirable to provide enhanced or augmented general illumination lighting of particular regions temporarily; and as such can the general illumination lighting be turned on and/or off sufficiently quickly to provide adequate general illumination lighting. Certain embodiments of the general illumination lighting device or system 100 can be applied to either indoor and/or outdoor lighting arrangements.

It might be desired for a considerable and temporally variable area to be under general illumination lighting such as to approach or reach the general illumination lighting target during such importantly-lit events as sporting events, concerts, speeches, meetings, etc. Consider a baseball hit to the outfield, or a European football (soccer) player kicking a ball a considerable distance across a field, or an American football quarterback throwing a long pass. It might be desirable to ensure all areas that are likely to be desired to be illuminated are under general illumination lighting for the duration of the game or sporting event. By comparison, it may be desirable to ensure that particular regions of the athletic field or stadium are lit to the level as provided by the at least one primary general illumination lighting component 107, and when some further activity occurs in that area, the activity portion of the field or stadium can thereupon be lit up using certain embodiments of the at least one LED-based secondary general illumination lighting component 109.

Certain embodiments of the LED-based secondary general illumination lighting component 109 can be configured to act quickly such as to light up the field at a sufficiently responsive rate to be able to "follow the action" such as to particularly illuminate where a ball is going or some other event in the sporting event by providing enhanced or augmented quality general illumination lighting for that particular area. It may also be desirable in certain applications to provide the more or better general illumination lighting sufficiently quickly and responsively such as to ensure the desired surfaces or areas (e.g., of the venues, athletic fields, stadiums, etc. are being lit). Such configurations of the general illumination lighting device or system 100 may be desirable since it might allow the overall intensity at one or more colors of illumination lighting to be reduced, while allowing emphasis on desired areas that may be continually or evanescently important and/or undergo desired illumination by certain embodiments of the general illumination lighting device or system 100. The general illumination lighting provided to neighbors of stadiums, parking lots, or other areas illuminated by a variety of embodiments of the general illumination lighting device or system 100 can thereby be limited, as well as providing more efficient general illumination lighting.

While the FIG. 10 embodiment of the general illumination lighting device or system 100 providing general illumination lighting that has been described relative to athletic stadiums or other such venues; similar outdoor concepts can be applied to office exteriors, parking lots, outsides of homes, parks, outdoor regions, etc., as well as certain indoor venues Certain embodiments of the at least one primary general illumination lighting component 107 can thereby be provided for a variety of applications, and may be used to provide a relatively low level of general illumination lighting (which may be energy efficient). Certain embodiments of the LED-based secondary general illumination lighting component 109 can be used in conjunction with the variety of applications such as to enhance general illumination lighting in particular areas as desired or selected. Certain embodiments of the general illumination lighting controller 97, as described with respect to FIGS. 1 to 5, can be utilized to control the general illumination lighting provided by some embodiment of the at least one primary general illumination lighting component 107 in combination with some embodiment of the at least one LED-based secondary general illumination lighting component 109, for a considerable variety of applications as described in this disclosure such as the venue embodiment of FIG. 10.

Figure 11:
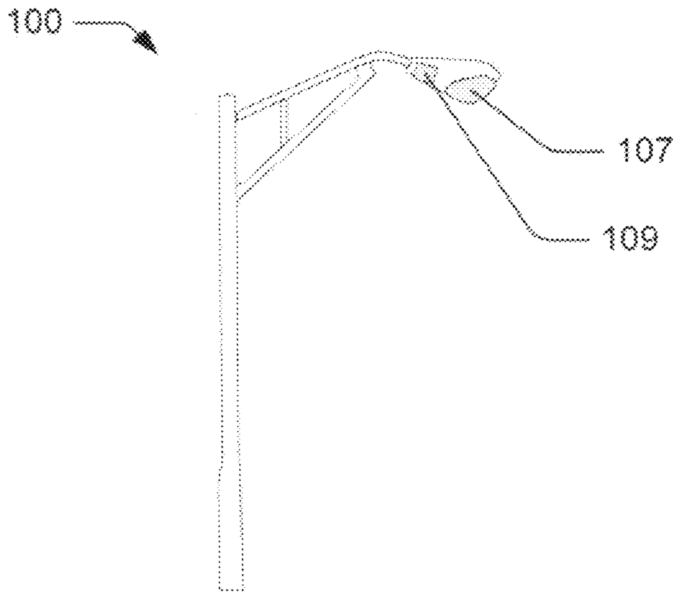
FIG. 11 is another embodiment of the general illumination lighting device or system that may be used, for example, for a street lamp.

There are a variety of other configurations and uses for the general illumination lighting device or system 100. FIG. 11 shows one embodiment of the general illumination lighting device or system 100 which may be configured as a street lamp, for example. In certain street-lamp embodiments of the general illumination lighting device or system 100, the at least one primary general illumination lighting component 107 can be for example configured as a gas discharge lamp (such as a fluorescent lamp) or an incandescent lamp (in this instance which may include, but is not limited to, a compact fluorescent lamp, a halogen lamp, etc.). Certain street lamp type embodiments of the general illumination lighting device or system 100 may include the at least one LED-based secondary general illumination lighting component 109 being configured as including but not limited to one or a series of light emitting diodes (LEDs), organic light emitting diodes (OLEDs), incandescent lights, gas discharge lamps, or other general illumination lighting component that may be configured to provide a variety of general illumination lighting as a combination of the light from the primary general illumination lighting component 107 and the LED-based secondary general illumination lighting component 109. Certain embodiments of the general illumination lighting controller 97, as described with respect to FIGS. 1 to 5, can be used to control the relative and/or distinct general illumination between the primary general illumination lighting component 107 and the LED-based secondary general illumination lighting component 109 as described in this disclosure. Certain street lamp embodiments of the general illumination lighting device or system 100 as described with respect to FIG. 11 may be designed to improve general illumination lighting quality, color, durability, and/or energy luminescence efficiency. It might be desirable to be able to see more clearly in a region as a result of the streetlamp, or alternately make the streetlamp's color lenses intense or less stark, and/or less aggravating to many people's eyes, particularly under sensitive lighting conditions.

In certain embodiments, certain "smart" embodiments of the general illumination lighting device or system 100 can be provided by which the one or more colors, intensities, or spectral intensities of general illumination lighting can be transformed using wireless, mote-based, communication link, or other technology such that a person could interface with certain programmable or computerized embodiments of the sensor and/or control portion 303 as described with respect to FIG. 5 such that the one or more colors of general illumination lighting provided by certain embodiments of the general illumination lighting device or system 100 can be selected by a user. For example, a user of certain embodiments of the general illumination lighting device or system 100 can program their home, office, store, or other location to provide a desirable or suitable color. They can "store" data or information associated with or representing a particular general illumination lighting color and/or intensity, and if the user travels to another location (e.g., hotel, building, etc.), the other location can be programmed to the same general illumination lighting color and/or intensity using known data, digital, analog, networking, or other such techniques.

Figure 12:
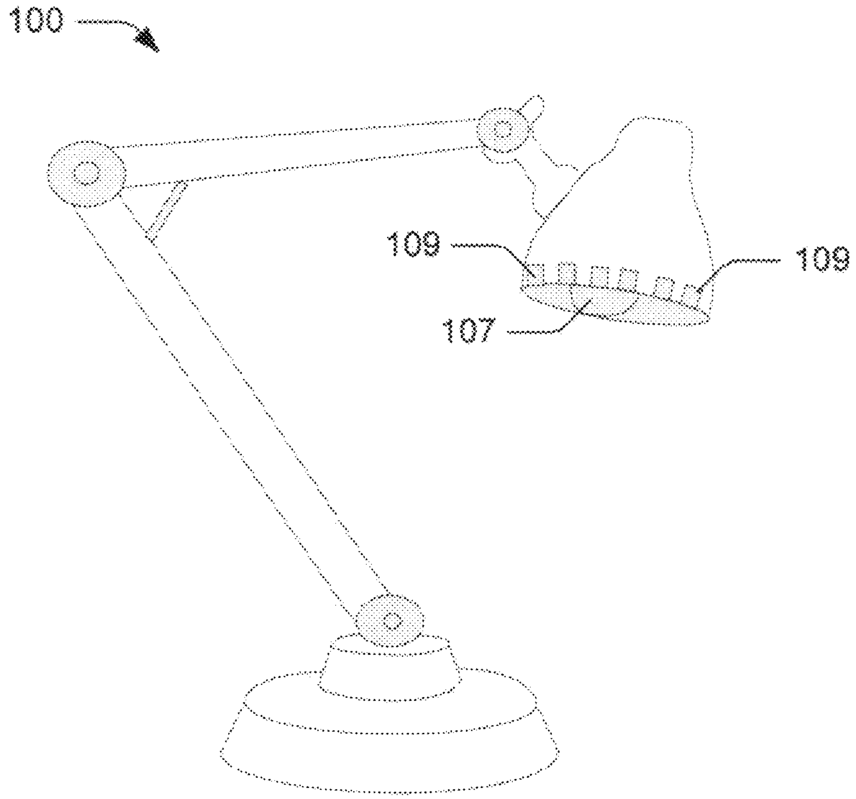
FIG. 12 is another embodiment of the general illumination lighting device or system that may be used for a table lamp.

FIG. 12 shows one embodiment of the general illumination lighting device or system 100 which may be configured as a desktop lamp, for example, in which the at least one primary general illumination lighting component 107 is configured as a gas discharge lamp or an incandescent lamp (in this instance which may include, but is not limited to, a compact fluorescent lamp, a halogen lamp, a fluorescent lamp, etc.). Certain desk-top type embodiments of the general illumination lighting device or system 100 may include the at least one LED-based secondary general illumination lighting component 109 is configured as a series of light emitting diodes (LEDs), liquid crystal displays (LCDs), organic light emitting diodes (OLEDs), or other general illumination lighting component that may be configured to provide a variety of general illumination lighting as a combination of the light from the primary general illumination lighting component 107 and the LED-based secondary general illumination lighting component 109. Certain embodiments of the general illumination lighting controller 97, as described with respect to FIGS. 1 to 5, can be used to control the relative and/or distinct general illumination between the primary general illumination lighting component 107 and the LED-based secondary general illumination lighting component 109 as described in this disclosure.

Certain embodiments of the general illumination lighting device or system 100, as described with respect to FIG. 12, may be designed to improve general illumination lighting quality, color, durability, and/or energy luminescence efficiency of the at least one general illumination lighting. By providing by adaptability or control of the one or more colors and/or intensity at one or more colors of the general illumination light emitted by certain embodiments of the general illumination lighting device or system 100, a single general illumination lighting device or system 100 can be configured for reading, illumination, alert, night-time lighting, etc., or other situations. Certain embodiments of the at least one LED-based secondary general illumination lighting component 109 as described with respect to FIG. 12, can be arranged about the periphery of the at least one primary general illumination lighting component 107, as well as perhaps follow people as they travel within particular areas. It might be possible for at least some of the LED-based secondary general illumination lighting component 109 to provide relatively narrow-band light (which color may control between different ones of the at least one LED-based secondary general illumination lighting component 109) that may be selected based on at least some operational limitations of the at least one primary general illumination lighting component 107.

Certain conventional incandescent lights are generally known for providing quality general illumination lighting of such colors of general illumination characteristics such as many people tend to favor. As such, certain people may prefer to be around areas lit by certain conventional incandescent lamps. Certain incandescent lights that may be configured as the at least one primary general illumination lighting component 107 and/or the at least one LED-based secondary general illumination lighting component 109, as described with respect to FIG. 13 can be configured to produce a relatively broadband light general illumination (such as may contain a considerable variety of general illumination lighting spectral characteristics, intensities, and/or colors of the at least one general illumination lighting) as described with respect to FIG. 14. In certain instances, the color of the general illumination lighting may be configured as blackbody radiation 320, relatively closely simulating outdoor light over a relatively broad range, by at least some broadband incandescent light 322. FIG. 14 indicates that the general illumination lighting as provided by certain incandescent embodiments of the at least one primary general illumination lighting component 107 and/or the at least one LED-based secondary general illumination lighting component 109 is relatively broadband since the frequency range of the broadband incandescent light 322 extending for a considerable distance with considerable intensity along the abscissa 324 (which likely ranges from the ultra-violet to the infrared range) having considerable intensity as indicated by the ordinate 326. As a result of the broadband incandescent light 322 as provided by a variety of the incandescent lamps, and other aspects, certain ones of the general illumination lighting produced by the at least one primary general illumination lighting component 107 and/or the at least one LED-based secondary general illumination lighting component 109 may be characterized by such terms as “warm”, “friendly”, “appealing”, etc. largely because of such desirable characteristics encompassing the general illumination lighting of such particular colors and/or intensities. Certain incandescent lights have been traditionally and still are used for such general illumination lighting applications where particular lighting condition such as one or more colors of general illumination lighting, intensity at one or more colors, reflectivity, etc. are desired as, e.g., home lighting, office lighting, vehicle lighting, photographic lighting, stage lighting, etc.

The color of the general illumination lighting as provided by certain embodiments of the general illumination lighting device or system 100 that include at least one incandescent-based primary general illumination lighting component 107 can be adjusted or controlled by controlling the intensity of the electrical current and/or voltage passing through the at least one incandescent-based primary general illumination lighting component 107. Consider, for instance, the at least one incandescent-based primary general illumination lighting component 107 described with respect to FIG. 13, in which a greater intensity of the output from the primary general illumination lighting as compared with the secondary general illumination lighting as well as ambient general illumination lighting results in a greater percentage of the overall general illumination lighting being provided by the at least one incandescent-based primary general illumination lighting component 107. Under these circumstances, the color enhancing aspects of the at least one LED-based secondary general illumination lighting component 109 may likely have a relatively small effect.

By comparison, a lesser intensity of the output from the primary general illumination lighting as compared with the secondary general illumination lighting as well as ambient general illumination lighting results in a lesser percentage of the overall general illumination lighting being provided by the at least one incandescent-based primary general illumination lighting component 107. Under these circumstances, the color enhancing aspects of the at least one LED-based secondary general illumination lighting component 109 may likely have a relatively enhanced effect. Quite often, the intensity of the general illumination lighting provided by a number of embodiments of the at least one incandescent-based primary general illumination lighting component 107 can be altered considerably by controlling the electricity flowing there through in such a manner. In this manner, the color of light provided by certain embodiments the general illumination lighting device or system 100 that include the at least one incandescent-based primary general illumination lighting component 107 and the at least one LED-based secondary general illumination lighting component 109 can be controlled by adjusting or controlling the intensity of the primary general illumination lighting provided by the at least one intensity-based primary general illumination lighting component 107. There are a variety of such techniques by which the color and/or intensity of one or more colors of the general illumination lighting as produced by certain embodiments of the general illumination lighting device or system 100, that include an incandescent-based embodiments of the at least one primary general illumination lighting component 107, can be adjusted.

Certain embodiments of the general illumination lighting device or system 100 can be configured to make optical characteristics (color and/or intensity at one or more colors) of the combined general illumination (which may be produced by the at least one primary general illumination lighting component 107, the at least one LED-based secondary general illumination lighting component 109, and/or at least some alternate general illuminating lighting that may be naturally occurring or man-made. The determination of the general illumination lighting as produced by the at least one primary general illumination lighting component 107, the at least one LED-based secondary general illumination lighting component 109, and/or at least some alternate general illuminating lighting may be measured such as by using a detector after some intensity, color, or intensity change is provided, or alternately may be based on design specifications, and/or tables. As such, certain embodiments of the general illumination lighting controller 97 can be configured to operate such as by “knowing the general illumination lighting that the alternate general illumination lighting device provides (as well as the at least one primary general illumination lighting component 107, and/or the at least one LED-based secondary general illumination lighting component 109), and adjust the particular combined general illumination lighting as such I look at tables, etc. to approach a general illumination lighting target. As such, the at least one LED-based secondary general illumination lighting component 109, and/or at least some alternate general illuminating lighting can be configured in an open loop adjustment and/or control system to make the combined general illumination lighting provided thereby approach some desired, prescribed, or programmed general illumination lighting target.

Alternately, the at least one LED-based secondary general illumination lighting component 109, and/or at least some alternate general illuminating lighting can be configured in a closed loop adjustment and/or control system to make the combined general illumination lighting provided thereby approach some desired, prescribed, or programmed general illumination lighting target. Such closed loop adjustment or control can rely on feedback from one or more sensors, that consider a variety of optical or electric characteristics including, but not limited to: a) sensing electric characteristics of the at least one primary general illumination lighting component, b) sensing optical characteristics (color and/or intensity at one or more colors) of the least one primary general illumination lighting component, or c) sensing combined optical characteristics of the least one primary general illumination lighting component or the at least one secondary general illumination lighting component).

Certain embodiments of the general illumination lighting device or system 100 may be configured, e.g., as light fittings such as outdoor and/or indoor lamps as described at various locations in this disclosure, automotive lamps, stage lighting, office lamps, outdoor lighting, stadium lighting, etc. that contain one or more conventional incandescent lamps may rely to a considerable degree on the appearance of general illumination lighting as may be provided by certain conventional incandescent lamp(s) itself (e.g., light-bulbs). For example, certain incandescent lamps as the at least one primary general illumination lighting component 107 and/or the at least one LED-based secondary general illumination lighting component 109 may be included in, encased within, and/or otherwise associated with, a variety of light fixtures, such as described with respect to FIGS. 11 and 12, and at other locations through this disclosure, such that the incandescent lamps can be formed with an outer glass envelope 920, the filament or other element(s) 912 as described with respect to FIG. 13, and a threaded connector (which may be included as a portion of the primary general illumination source 113 and/or the secondary general illumination source 119) that is typically connected to and receives electricity from a socket (which may be included in the primary general illumination fixture 111 and/or the secondary general illumination fixture 117).

Figure 13:
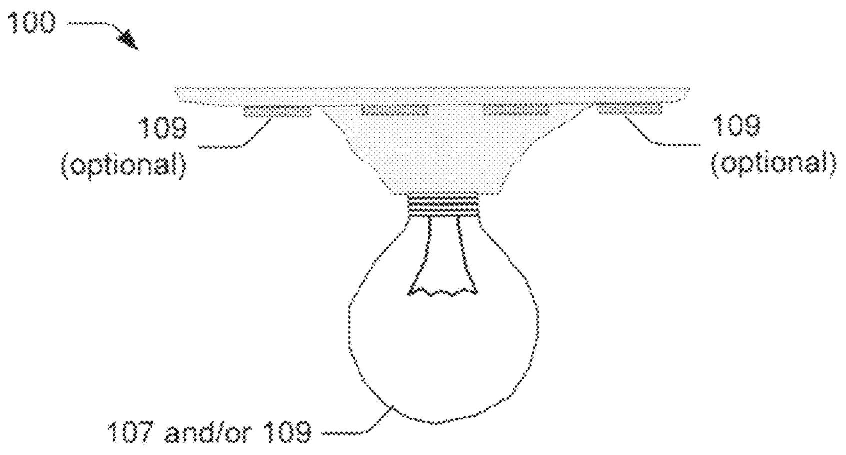
FIG. 13 is a diagram of another embodiment of the general illumination lighting device or system including an incandescent primary general illumination lamp.
Figure 14:
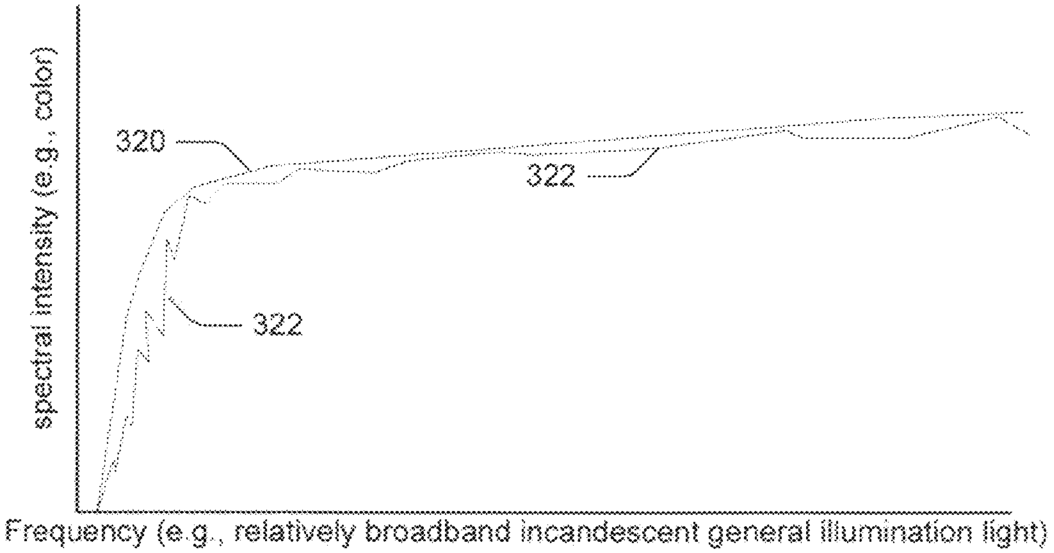
FIG. 14 is a generalized (not quantitative) graph of general illumination lighting as provided by blackbody radiation as compared with general illumination lighting as provided by certain general illumination lighting as provided by certain incandescent embodiments of the general illumination lighting device or system as described with respect to FIG. 13.
Figure 16:
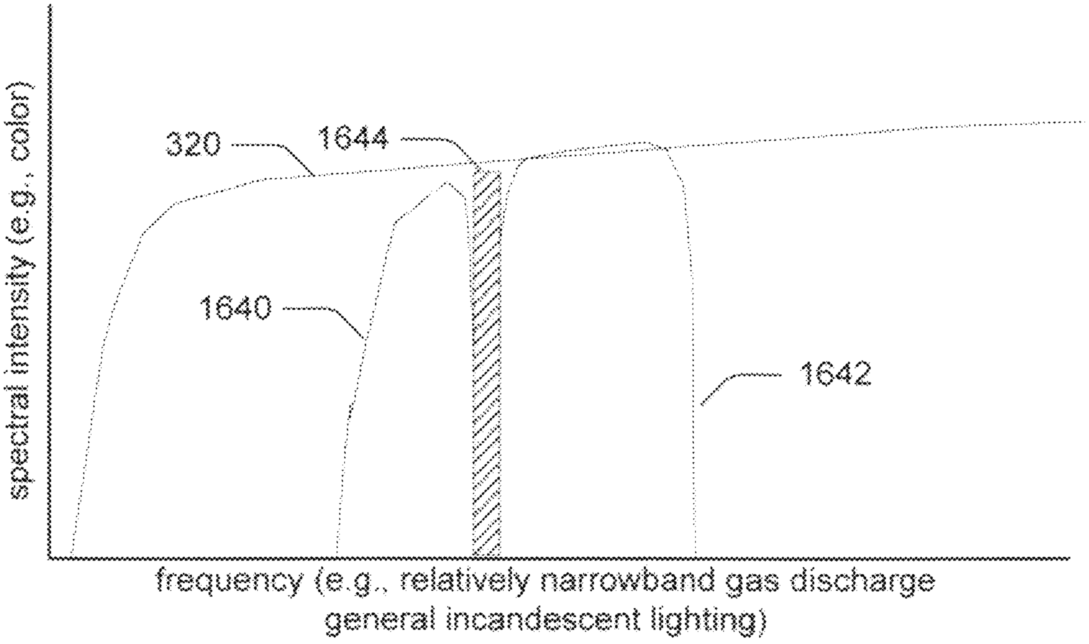
FIG. 16 is a generalized (not quantitative) graph of general illumination lighting as provided by blackbody radiation as compared with general illumination lighting as provided by certain general illumination lighting as provided by certain gas discharge embodiments of the general illumination lighting device or system as described with respect to FIG. 15.

FIGS. 13 and 16 illustrates certain embodiments of the general illumination lighting device or system 100 including, respectively, an incandescent lamp embodiment of the primary general illumination lighting component 107 and a gas discharge lamp embodiment of the primary general illumination lighting component 107, in which electricity is used to provide the general illumination lighting may be provided via the socket, the electrical connector, and through the filament or other element(s) 912 as described with respect to FIG. 13. With the incandescent embodiment of the at least one primary general illumination lighting component 107 and/or the at least one LED-based secondary general illumination lighting component 109 as described with respect to FIG. 13, mush of the general illumination light emanating from the filament or other element(s) 912 of certain conventional incandescent lamps will pass through a clear, frosted, colored, or other outer glass envelope 920 as described with respect to FIG. 13 forming a vacuum with the filament or other element(s) 912 within. With the gas discharge embodiment of the at least one primary general illumination lighting component 107 and/or the at least one LED-based secondary general illumination lighting component 109, the photons emitted by the filament (s) or other element(s) 912 may not be visible (e.g., ultraviolet), and by passing through the phosphors that may coat the gas discharge tube such as the fluorescent tube, the non-visible light may be converted to visible general illumination light. It may be desirable to make the general illumination light appear of the desired one or more colors of general illumination lighting, warmness, such as including are having a suitable or desired appearance (e.g., color and/or appearance similar to a flame, having a nice color, etc.).

Certain of the at least one primary general illumination lighting component 107 and/or the at least one LED-based secondary general illumination lighting component 109, can be configured as to include incandescent lamps. Certain incandescent lamps may not be very energy-efficient since they are relatively broadband, since they provide considerable general illumination lighting that is not visible including that in the infrared, ultraviolet, or other (e.g., non-visible) spectra. Certain incandescent embodiments of the general illumination lighting as provided by certain embodiments of the general illumination lighting device or system 100 can be segmented into at least some primary general illumination lighting as provided by the at least one primary general illumination lighting component 107 as well as the at least some secondary general illumination lighting as provided by the at least one LED-based secondary general illumination lighting component 109. A number of communities, municipalities, states, countries, etc. are expected in near future to limit their sales and uses of a certain incandescent lamps due to their energy inefficiencies. It is envisioned that relatively energy efficient lamps such as certain gas discharge lamps (e.g., fluorescent, compact fluorescent) as well as other lamps will likely be used in place of many of the incandescent lamps.

Certain conventional incandescent lamps may provide general illumination lighting that differs somewhat from outdoor illumination light (e.g., sunlight). Such sunlight may be approximated as "blackbody radiation" 320, such as may, generally, be indicative of sunlight, as described and illustrated graphically with respect to FIGS. 14 and/or 15. Certain conventional incandescent lamps may provide incandescent general illumination lighting 322 whose waveform differs from the blackbody radiation 320 at certain wavelengths as described with respect to FIG. 14 such as to provide a varied hue, one or more colors of general illumination lighting, intensity at one or more colors, or other spectral characteristic from the blackbody radiation, in many instances in an undesirable manner. Certain conventional incandescent lamps provide considerable radiation in the infrared spectra, thereby resulting in a considerable amount of energy that is no directed to general illumination lighting as may be viewed by or provide general illumination lighting for humans such as may be viewed by humans.

The general illumination lighting as provided by certain gas discharge embodiments of the at least one primary general illumination lighting component 107 and/or the at least one LED-based secondary general illumination lighting component 109 may be configured to be associated with one or more phosphors, each phosphor generating relatively narrowband general illumination lighting wavelength portions 1640 and 1642, as described with respect to FIG. 16. The wavelength of emitted general illumination light emitted by certain gas discharge (e.g., fluorescent) embodiments of the at least one primary general illumination lighting component 107 and/or LED-based secondary general illumination lighting component 109 (the latter may include gas-discharge components) may depend at least partially on the phosphors that are coating the gas-discharge tube 260 of FIG. 15. Consider, for example, there might be multiple phosphor wavelength portions 1640 and 1642, of FIG. 16 which each correspond to a distinct phosphor, each of which is relatively narrowband as compared with the incandescent embodiment of the at least one primary general illumination lighting component 107 and/or LED-based secondary general illumination lighting component 109, as described with respect to FIG. 14. The relatively narrow-band aspect of the phosphor wavelength portions 1640 and 1642 of FIG. 16 as compared with the a variety of conventional incandescent illumination lighting largely results in improved efficiencies of certain gas discharge embodiments of general illumination lighting as compared with certain incandescent embodiments of general incandescent lighting.

The frequencies of at least one general illumination lighting inserts 1644 as described with respect to FIG. 16 that are inserted within the waveform characterized by the two phosphor wavelength portions 1640, 1642. Certain embodiments of the at least one general illumination lighting inserts 1644 can be frequency limited, and can be made coincident with the reduced portion (e.g., notches) of the two phosphor wavelength portions 1640, 1642 provided by the primary general illumination lighting as provided by the at least one primary general illumination lighting component 107. Certain embodiments of the at least one sensor 316 of the sensor and/or control portion 303 can be used to sense the frequencies of the phosphor wavelength portions 1640, 1642; and the location of the general illumination lighting inserts 1644. Certain embodiments of such general illumination lighting inserts 1644 can be applied at the frequencies of the phosphor wavelength portion 1640 and/or 1642 to increase or smooth at least some of the phosphor wavelength portion to a desired level. Such increasing or smoothing the at least some of the phosphor wavelength portion to a desired level may be considered as one aspect of adjusting the general illumination lighting to some desired color, or intensities of at least one color.

Certain embodiments of the general illumination lighting device or system 100 can be configured as described with respect to FIGS. 1 and/or 2, and at other locations in this disclosure, such as to include certain embodiments of the at least one LED-based secondary general illumination lighting component 109 that act to augment limited intensity at one or more colors or intensities of the primary general illumination lighting as provided by the at least one primary general illumination lighting component 107 such as to achieve or approach the general illumination lighting target (note the ability of the primary general illumination lighting component 107 and the LED-based secondary general illumination lighting component 109 to each of in combination reach the general illumination lighting target can vary, depending on conditions such as age of the component and operating temperature. Such limited intensity at one or more colors of the at least one primary general illumination lighting component 107 can result from such limited intensity at one or more colors as relatively slow start-up periods, relatively limited intensity during end-of-life condition of the at least one primary general illumination lighting component 107, etc.

Certain conventional fluorescent lamps may be included as at least a portion of certain embodiments of the at least one primary general illumination lighting component 107 that may suffer from relatively slow start-up periods, also may suffer during which start-up periods the general illumination intensity at one or more colors and/or intensities at one or more color may be less than desirable. For example, certain embodiments of the general illumination lighting device or system 100 may require more time for general illumination lighting of certain colors to start up as compared with other colors. Certain embodiments of the general illumination lighting controller 97, as described with respect to FIGS. 1 to 5, can be configured to included the at least one sensor 316 of the sensor and/or control portion 303, such as to measure output of the at least one primary general illumination lighting component 107 during limited intensity at one or more colors such as during start-up, by flickering, and/or end-of-life condition, and thereupon apply a specialized excitation of the at least one LED-based secondary general illumination lighting component 109.

The energy luminescence efficiency of general illumination lighting components can therefore control based at least partially on a variety of factors. The use of certain types of lamps or lights will likely be banned or limited in certain countries, municipalities, states, etc. in the future, at least partially as a result of relatively low energy luminescence efficiency. This disclosure provides a variety of techniques or devices to improve the energy luminescence efficiency for a number of gas discharge, incandescent, LED, and other embodiments of the at least one primary general illumination lighting component 107 and/or the at least one LED-based secondary general illumination lighting component 109.

Certain embodiments of the at least one primary general illumination lighting component 107 and/or the at least one LED-based secondary general illumination lighting component 109 of the general illumination lighting device or system 100 can be configured to control their energy luminescence efficiency based at least partially on the temperature. Certain embodiments of the at least one primary general illumination lighting source 113 or the at least one LED-based secondary general illumination lighting source 119 may be incandescent, gas discharge, LED, or other general illumination lighting component. Certain embodiments of the general illumination lighting device or system 100 that can include a temperature regulating portion (not shown), that is configured to regulate the operating temperature of the lamp element. Certain embodiments of the at least one primary general illumination lighting component 107 or the at least one LED-based secondary general illumination lighting component 109 often attain end-of-life operating characteristics due to thermal failure of some key element, or some portion thereof. For example, certain embodiments of the incandescent filament or other element(s) 912 as described with respect to FIG. P34 typically fail to achieve relatively low energy luminescence efficiency near the geometric center of the filament (typically the hottest point of the incandescent filament or other element(s) 912).

The life-limiting temperature of the incandescent filament or other element(s) 912 can be monitored as well as controlled using actively serving to control/upper-bound in a manner that may prolong the service-life of the at least one primary general illumination lighting component 107 and/or the at least one LED-based secondary general illumination lighting component 109, and may be considered as a portion of temperature regulating portion 808 such as within the at least one sensor 316 of the sensor and/or control portion 303, and/or the general illumination lighting controller 97, as described with respect to FIGS. 1 to 5. Such enhancing the energy luminescence efficiency and/or increasing the useful life of the at least one primary general illumination lighting component 107 and/or the at least one LED-based secondary general illumination lighting component 109 could therefore be provided by maintaining of the temperature of the filament or other element(s) 912 may be particularly desirable in a number of circumstances, e.g., certain hard-to-replace light bulbs for which the total cost-to-replace light bulb is considerably more than the cost of the light bulb itself.

Certain embodiments of the at least one primary general illumination lighting component 107 and/or the at least one LED-based secondary general illumination lighting component 109 can include a photo sensor directed at or near the center-point of an incandescent filament or other element(s) 912 (to monitor the temperature or to determine the shape of the filament or other element(s) 912). Certain embodiments of the at least one primary general illumination lighting component 107 and/or the at least one LED-based secondary general illumination lighting component 109 can adjust or control the power-supply (e.g., in the bulb-base) so as to maintain the temperature at the selected prescribed temperature range such as to enhance deposition on at least a portion of the filament or other element(s) 912. By certain embodiments of the filament or other element(s) 912 operating at the desired range, which may perhaps be maintained according to an electronic and/or software program, e.g., at below such a hot temperature as to limit premature failure of the filament or other element(s) 912 via evaporation, but at a sufficiently warm temperature as to ensure the operation of the at least one primary general illumination lighting component 107 and/or the at least one LED-based secondary general illumination lighting component 109 at an enhanced energy luminescence efficiency.

At least a portion of the temperature regulating portion 808 might also be employed for other purposes. For example, the monitoring portion of the temperature regulating portion 808 could be used to indicate a lamp's impending failure by failure of the filament or other element(s) 912 such as may be useful for periodic-maintenance, or alternately to command 'emergency maintenance' of the filament or other element(s) 912. Certain embodiments of the at least one primary general illumination lighting component 107 and/or the at least one LED-based secondary general illumination lighting component 109 can be configured to reconfigure such an impending failure such as providing a release of evaporated filament material or supplied filament material in a manner that allows for deposition in-or-about the desired (failing) location of the filament or other element(s), as described in this disclosure.

There may therefore be a number of reasons, as described in this disclosure, why, as described relative to FIGS. 1 and/or 2, as well as other locations in this disclosure, the primary general illumination lighting effect or characteristic (such as color and/or intensity) as provided by the at least one primary general illumination lighting component 107 might be desired to be modified and/or altered based at least partially on the addition of a secondary general illumination lighting effect or characteristic as provided by the at least one LED-based secondary general illumination lighting component 109. Certain reasons why it may be desired to improve the general illumination lighting effect or characteristic can include, but are not limited to: improving the output color and/or intensity of the general illumination lighting device or system 100, allowing designed or customized general illumination lighting intensity at one or more colors and/or general illumination lighting color by the general illumination lighting device or system 100, providing improved lighting to certain areas within larger regions, causing more uniformity of general illumination lighting over the lifetime of the general illumination lighting device or system 100, increasing the rate of start-up of the general illumination lighting device or system 100, limiting flickering of the general illumination lighting device or system 100, and increasing the general illumination intensity at one or more colors of the general illumination lighting device or system 100 during start-up.

For example, such primary general illumination lighting effect or characteristic as the color(s) and/or intensities of general illumination lighting, flicker, frequency, as may be provided by the at least one primary general illumination lighting component 107 can be modified, changed, altered, etc. based at least in part by the addition of general illumination lighting as provided by the secondary general illumination lighting effect or characteristic provided by the at least one LED-based secondary general illumination lighting component 109.

Figure 17:
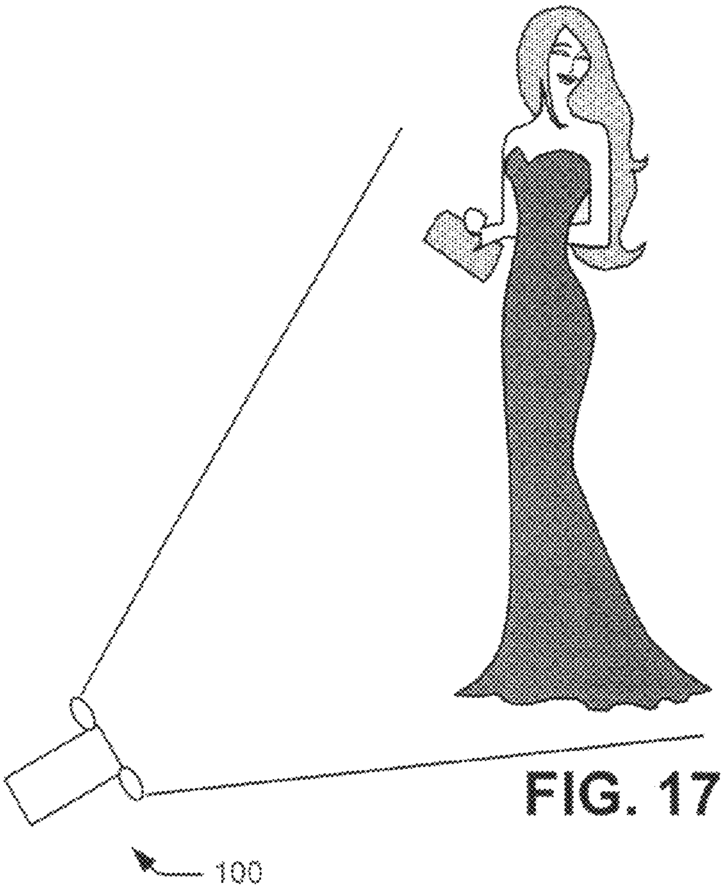
FIG. 17 is an illustration of a woman whose appearance of her, and/or her skin, may be enhanced using certain embodiment of the general illumination lighting device or system.

For instance, FIG. 17 shows one particular person (e.g., an actress) who might be concerned with making her skin tone, complexion, etc. such as to make her appearance as attractive as possible; and as such it may be desired to use outside lighting, incandescent light, etc. In reality, a number of people dislike the color of light generated by a number of conventional gas discharge light bulbs. It might be highly desirable if similar general illumination lighting color and/or intensities of at least one color could be provided by certain gas discharge, solid state, or other embodiments of the general illumination lighting device or system 100. Alternately, since certain gas discharge and other lights are in such common usage, it might be desirable to make the color of their general illumination lighting as attractive as practicable, and/or controllable. In addition to in real life, actors, actresses, models, etc. may appear better as well as more natural in photographs, movies, images, etc. when being lit by certain embodiments of the general illumination lighting device or system 100.

The appearances of normal people, animals, objects, surfaces, as well as actors, actresses, models, etc. be improved using certain embodiments of the general illumination lighting device or system 100. A variety of people will likely enjoy being illuminated by certain embodiments of the general illumination lighting device or system 100 that puts out more desirable or naturally appearing general illumination lighting in home, office, and/or other outdoor or indoor environments. Certain embodiments of the general illumination lighting device or system 100 can also be applied to improve the general illumination lighting being applied to pets, animals, fish tanks, etc.

Figure 18:
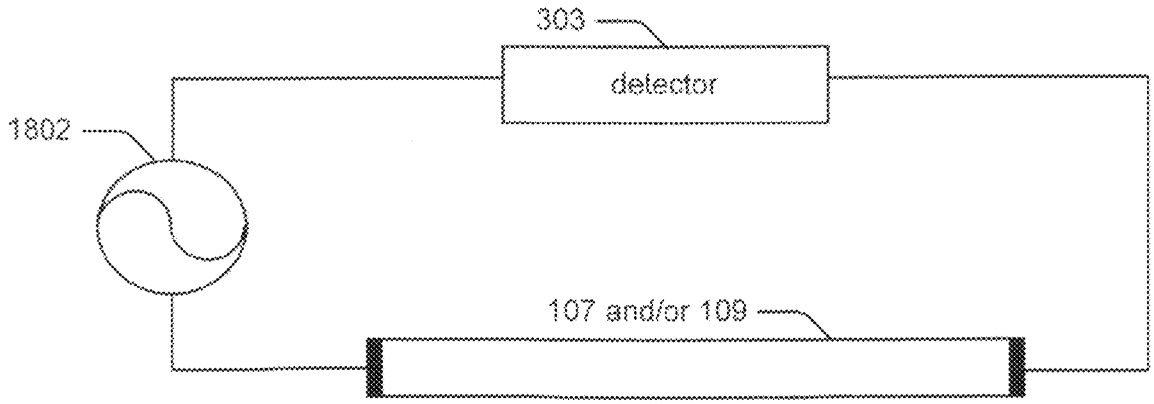
FIG. 18 is an illustration of an embodiment of the general illumination lighting device or system general illumination lighting device or system 100 whose electricity is provided by certain embodiments of an AC supply.
Figure 19:
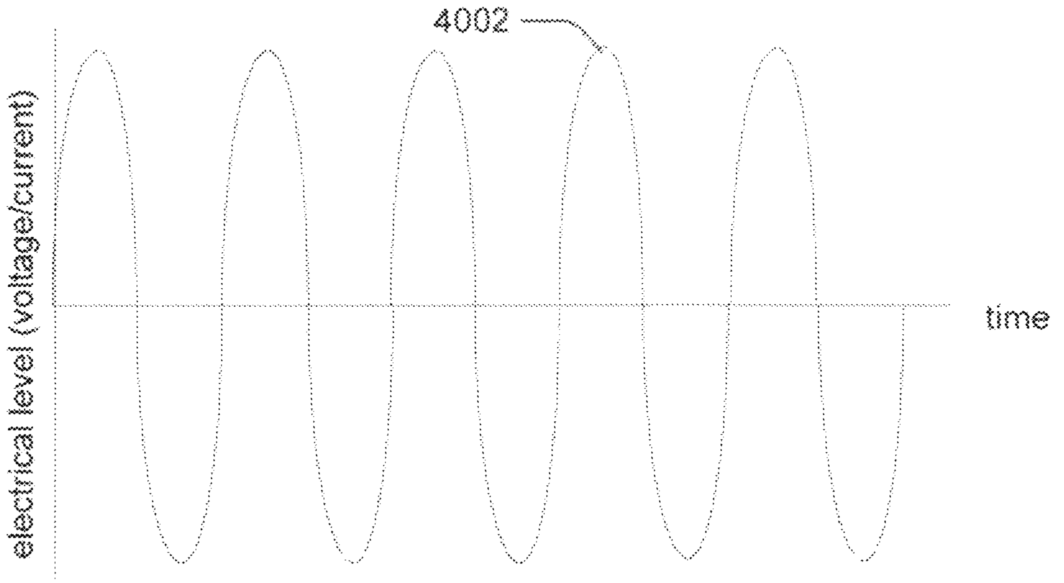
FIG. 19 is a graph plotting input electrical level as a function of time for certain embodiments of the general illumination lighting device or system.
Figure 20:
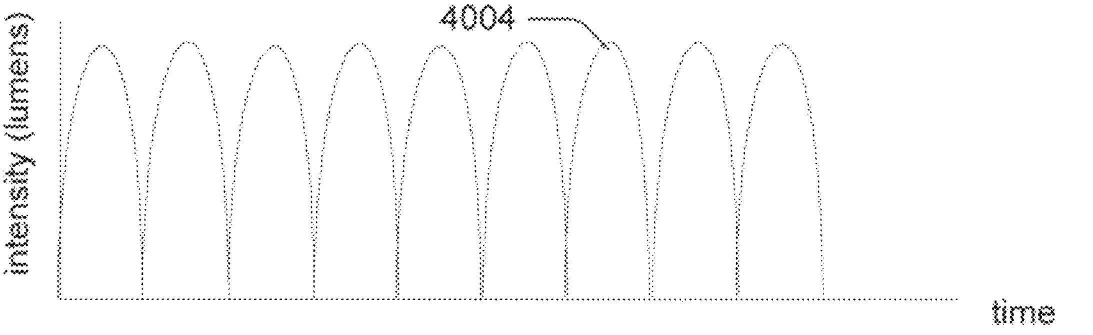
FIG. 20 is a graph plotting one embodiment of the output general illumination lighting intensity as a function of time for certain embodiments of the general illumination lighting device or system whose input is the input electrical level of FIG. 19.
Figure 21:
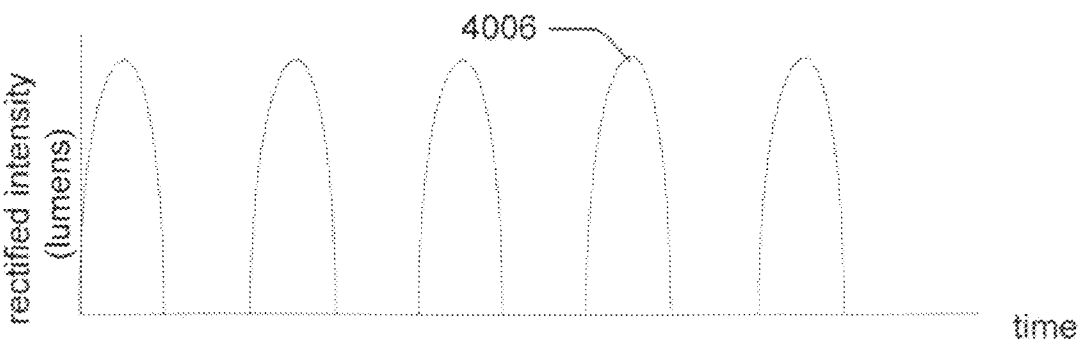
FIG. 21 is a graph plotting one embodiment of the output (rectified) general illumination lighting intensity as a function of time for certain embodiments of the general illumination lighting device or system whose input is the input electrical level of FIG. 19.
Figure 22:
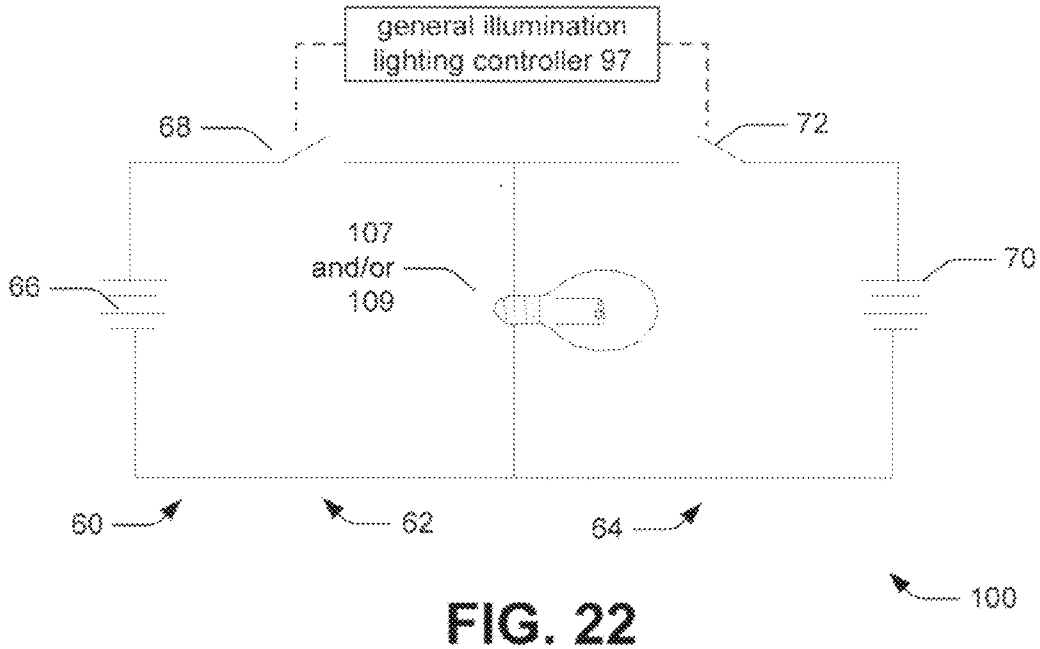
FIG. 22 is a diagram of one embodiment of a simmering circuit as may be used with certain general illumination lighting devices or systems.

There may be a variety of techniques by which the sensor and/or control portion 303 as described with respect to FIG. 5 could be used to sense and/or control the one or more colors and/or intensity at one or more colors of the general illumination light as provided by certain embodiments of the general illumination lighting device 100. FIGS. 20 and 21 show different aspects of certain embodiments of general illumination lighting intensity of two respective output optical or electrical signals 4004, 4006 as being modified from an input optical or electrical signal 4002 being supplied to certain embodiments of the general illumination lighting device or system 100 as described with respect to FIG. 19. FIG. 18 shows a number of embodiments of the general illumination lighting device or system 100 that can include, but is not limited to, an alternating current (AC) supply 1802 that could output a current or voltage similar to as described with respect to FIG. 19, the at least one sensor 316 of the sensor and/or control portion 303, and the at least one primary general illumination lighting component 107 and/or the at least one LED-based secondary general illumination lighting component 109.

Certain embodiments of the electrical current and/or voltage provided by the AC supply 1802 is configured to provide an electrical current that flows through the at least one of the primary general illumination lighting component 107 and/or at least one of the LED-based secondary general illumination lighting component 109. Since intensity of general illumination lighting being produced by certain embodiments of the general illumination lighting device or system 100 as driven by the general the AC supply 1802 can be identical regardless of the polarity of the electrical voltage and/or current provided by the AC supply 1802, and can result in an intensity being applied to the at least one primary general illumination lighting component 107 and/or the at least one LED-based secondary general illumination lighting component 109 as a half-wave rectifier as described with respect to FIG. 20. The spacing between successive pulses or burst can be controlled using such techniques as pulse width modulators. By comparison, FIG. 21 shows one embodiment of a full-wave rectification in which an AC input signal of the general illumination lighting device or system 100 producing general illumination lighting in which an input electrical signal of FIG. 19.

Certain embodiments of the at least one sensor 316 of the sensor and/or control portion 303, as described with respect to FIG. 5, could be utilized to improve the energy luminescence efficiency of the at least one general illumination lighting device or system 100. For instance, certain embodiments of the at least one sensor 316 of the sensor and/or control portion 303 can be actuated during a falling portion of an input frequency wave, and may operate by taking signals having a relatively low amplitude and continuous duration (e.g., long narrow voltage signal). Such relatively low amplitude signals can be converted the signal into a relatively high amplitude signal that have considerable durations of "off" amplitudes there between (e.g., burst type signals may be, for example, converted into relatively low level and/or relatively flat signals). The timing of the high amplitude, short burst voltage, may be in certain embodiments on for a relatively short, regularly spaced, duration (for example 1 percent of time), such as may be provided by certain embodiments of modulators such as pulse width modulators, rectifiers, such whose operation is generally understood by those skilled in the art of electronics.

Certain embodiments of the sensor and/or control portion 303 as described with respect to FIG. 5 could be used to control the one or more colors and/or intensity at one or more colors of the general illumination light as provided by the LED-based secondary general illumination lighting component 109 at least partially by utilizing a simmering circuit that can be configured to raise the typical level of the at least one primary general illumination lighting component 107 and/or the at least one LED-based secondary general illumination lighting component 109 as described with respect to FIGS. 1 to 5. Such simmering circuits can be configured such that when an initial start-up current is generated, the surge amount of energy applied to generate a prescribed color and/or intensity will be reduced. Certain embodiments of the simmering circuit can include a simmering portion 62 that maintains inactive ones of the at least one primary general illumination lighting component 107 and/or the at least one LED-based secondary general illumination lighting component 109 in a state that they can be readily turned on in a warm state; as well as a general illumination portion 64 that provides power to illuminate certain ones of the at least one primary general illumination lighting component 107 and/or the at least one LED-based secondary general illumination lighting component 109. Certain embodiments of the simmering portion 62 as well as the general illumination portion 62 can each be controlled by the general illumination lighting controller 97. Certain embodiments of the simmering portion 62 can include an at least one simmering power source 66 and an at least one simmering switch 68. Certain embodiments of the general illumination portion 64 can include an at least one general illumination power source 70 and an at least one general illumination switch 70. With certain embodiments of the simmering circuit 60, the voltage level as applied to the general illumination lighting device or system 100 is maintained at some simmering level, and by providing some relatively small additional voltage or current, the LED-based secondary general illumination lighting component 109 is turned on to provide general illumination lighting. Certain embodiments of the general illumination lighting device or system 100 can thereby be configured to maintain a simmering level of current, for instance an ionization maintenance (simmering current) state keeps gas faintly ionized such that controlling power source to affect light output.

Certain embodiments of the sensor and/or control portion 303 as included in certain embodiments of the general illumination lighting device or system 100 can therefore be configured to provide for control of the general illumination lighting device or system 100 made up between the at least one primary general illumination lighting component 107 and/or the at least one LED-based secondary general illumination lighting component 109. Consider that with certain embodiments the general illumination lighting device or system 100, it may be possible to control a temperature of lamp (e.g., using pre-heat, etc.). It may not be possible to control current of lamp, and it may not be possible to provide for or handle dimmer controls. With such embodiments, it may be possible to monitor current, and measure directly using certain embodiments of the at least one sensor 316 of the sensor and/or control portion 303 as described with respect to FIG. 5.

Certain embodiments of light emitting diodes (LED) can be configured to a variety of operational characteristics when applied to certain embodiments of the at least one primary general illumination lighting component 107 and/or the at least one LED-based secondary general illumination lighting component 109. Typically, LEDs have relatively low luminescence at low current, and exhibit a relatively high luminescence at higher current. Certain LED embodiments of the at least one primary general illumination lighting component 107 and/or the at least one LED-based secondary general illumination lighting component 109 can be operated to generate general illumination lighting having a square-wave configuration, such as may be used to enhance energy luminescence efficiency. Often, LEDs burn out relatively quickly would operate at above a high voltage threshold. Certain LED embodiments of the at least one primary general illumination lighting component 107 and/or the at least one LED-based secondary general illumination lighting component 109 can be excited with a high energy, while providing a relatively low duty cycle waveform to exploit certain physical aspects of the LEDs. Certain LED embodiments of the at least one primary general illumination lighting component 107 and/or the at least one LED-based secondary general illumination lighting component 109 can therefore control the average time current as a function of temperature. Such circuits can act as a circuit suicide prevention circuit, thereby being destroyed under excessive currents and limiting current applied to the filament or other element(s) within the at least one primary general illumination lighting component 107 and/or the at least one LED-based secondary general illumination lighting component 109.

Certain embodiments of the at least one sensor 316 of the sensor and/or control portion 303 can monitor optical characteristics (intensity at one or more colors and/or color), or alternatively can monitor electric characteristics. Such monitor may result at least partially from detecting respective specified spectral and/or frequency contents of the general illumination lighting is provided by the at least one primary general illumination lighting component 107 as well as the at least one LED-based secondary general illumination lighting component 109.

Certain incandescent embodiments of the at least one primary general illumination lighting component 107 and/or the at least one LED-based secondary general illumination lighting component 109 can be configured to perform with improved energy luminescent efficiencies if configured with a relatively thin (i.e., low thermal time-constant) heated elements that are repetitively pulsed, such as may utilize a modulator such as a pulse-width modulator, an oscillator, or another device that can provide such pulses, since they will yield a number of visible photons per inputted joule if they're 'flashed' to much higher surface temperatures. Certain embodiments of the at least one primary general illumination lighting component 107 and/or the at least one LED-based secondary general illumination lighting component 109 to output variable visible output-levels such as may thereby be realized by modifying the duty-cycle aspect as applied to the at least one primary general illumination lighting component 107 and/or the at least one LED-based secondary general illumination lighting component 109. Doing such excitation in a manner that utilizes repetitive pulses can be straightforward using, for example, solid-state power-control elements associated with a variety of reactive energy storage modules. In circumstances in which continuous supply-power isn't available, (e.g., when working with AC utility power) to whatever extent isn't attainable by merely slicing-into the cyclic voltage-wave that utility-power offers, though such embodiments operate with reduced energy luminescence efficiencies.

Certain embodiments of the general illumination lighting device or system 100 are configurable to convert a relatively long or continuous, low voltage into a relatively high short voltage, wherein the general illumination lighting device or system 100 can be actuated for some relatively small percentage of the time (e.g., 1 percent). This allows certain gas discharge/fluorescent lights work on in dimmer circuits. For example, energy from the lower voltage signal can be accumulated, and then applied through a gating device such as a diode such that when the signal voltage crosses a particular (e.g., zero) threshold, the inductor is crossed with a switch such as a bipolar junction transistor (BJT), MOSFETS, MISFETS, and other types of transistors particularly those configured as switches, may be configured to switch the inductance. In general illumination lighting component applications, the general illumination lighting that flickers at a relatively high rate such as 120 Hz (120 optical or electronic cycles per second) and above is considered as flickering above the level that humans can observe. As such, like flickering at such relatively high rates as 120 Hz and above may be considered as operating to provide efficient usable general illumination lighting.

Such flickering general illumination lighting may provide an intensity having a proportional representation to their output. Certain embodiments of the general illumination lighting device or system 100 may be operated with a variety of control circuitry, ranging, for example, from a distinct control circuit to a networked general illumination lighting control system. Such flickering of the general illumination lighting may maintain the filament material contained in the filament or other element(s) sufficiently charged or ionized such that when high pulse comes through, certain embodiments of the at least one primary general illumination lighting component 107 and/or the at least one LED-based secondary general illumination lighting component 109 can start quite quickly, such as in certain instances in the range of a few msecs. Certain embodiments of the capacitive circuit, for example, may be used to provide such charging or ionization.

There may be a variety of techniques by which general illumination lighting, as provided by certain embodiments of the primary general illumination lighting component 107, can be modified, altered, etc. as described in this disclosure. Certain embodiments of the general illumination lighting device or system 100 can be configured to alter (often may increase, decrease, modulate, and/or control) the electric current and/or voltage that may control over time as applied to the primary general illumination lighting component 107, particularly during start-up. As such, the primary general illumination lighting component 107 can be configured to provide effective and/or desired general illumination lighting during start-up more quickly. Certain conventional fluorescent lamps (such as those into not include an associated capacitive circuit) may be relatively slow to start-up in that they may draw a considerable power pulse while they start as well as warm up their mercury contents. Such power pulses may be associated with applying considerable electrical voltage and/or electrical current, during starting, to obtain a particular general illumination lighting signature. Thereupon, following start-up, the mercury contents may warm up, and certain embodiments of the general illumination lighting device or system 100 may not flicker thereafter during normal operation.

Such relatively slow start-up of certain embodiments of the gas discharge lamps, such as fluorescent lamps, may additionally represent a near-end-of-life behavior in which the emitted light of certain embodiments of conventional fluorescent lamps may appear unhealthy near the end of their normal useful lifetime. In addition, it may require a longer time for the general illumination lighting device or system 100 approaching the end of their lives to obtain desired or quality general illumination lighting.

Certain embodiments of the sensor and/or control portion 303 can be configured to improve the energy luminescence efficiency of the at least one primary general illumination lighting component 107 (which may be associated with the primary general illumination fixture 111 and/or the primary general illumination source 113) and/or the at least one LED-based secondary general illumination lighting component 109 (which may be associated with the secondary general illumination fixture 117 and/or the secondary general illumination source 119), at least partially by repetitively pulsing the source electricity applied to the at least one primary general illumination lighting component 107 and/or the at least one LED-based secondary general illumination lighting component 109 such as may be provided by a modulator such as a pulse-width modulator, or other oscillator), and may be viewed as operating as fractional-time operating lamps. Certain embodiments of the general illumination lighting device or system 100 can be configured to repetitively/cyclically control their general illumination lighting luminosity (e.g., in certain instances by order-of-magnitude, preferably, at frequencies substantially above the flicker-frequency of the human eye) in a designed, possibly user-variable manner as compared with more constrained applied AC power-usage. Such embodiments of the general illumination lighting device or system 100 which repetitively (e.g. cyclically) pulse their electrical source in a manner that enhances the general illumination lighting luminosity can permit exploitation of characteristics of lamp materials and devices to provide, in certain ways, ‘improved’ illumination performance in various metrics such as enhancing the energy luminescence efficiency.

Certain examples of increasing the energy luminescence efficiency of the primary general illumination lighting component 107 and/or the at least one LED-based secondary general illumination lighting component 109 is to repetitively pulsing the source electricity applied to the at least one primary general illumination lighting component 107 and/or the at least one LED-based secondary general illumination lighting component 109 with light emitting diodes (LEDs). Certain LED embodiments of the general illumination lighting device or system 100 can permit a higher energy luminous efficiencies than would continuous operation at the same time-averaged electrical power input; one technique to obtain a higher energy luminescence efficiency is to allow the semiconductor element to cool adequately (e.g., preferably passively, but alternatively actively) during the ‘dead time’ intervals in which little-or-no power is applied to the device. Such techniques may be particularly useful when utilizing excited semiconductor laser devices in those embodiments of the general illumination lighting device or system 100, particularly where the slope efficiencies that can be achieved may reach an order-of-magnitude higher than is usually attained in continuously-excited operation.

Certain embodiments of the general illumination lighting device or system 100 may be configured to such that they appear to the unaided eye of the user as to continue to appear ‘healthy’, normal, and/or as desired until, perhaps, at or near the actual end of their lifetime. In certain configuration of multiple lights such as arrays; certain replacement or supplemental embodiments of the primary general illumination lighting component 107 and/or the LED-based secondary general illumination lighting component 109 can be included such as to provide light following failure of at least one of the primary general illumination lighting component 107 and/or the LED-based secondary general illumination lighting component 109.

It might be possible for certain embodiments of the at least one primary general illumination lighting component 107 to be operated at less than the full operational voltage and/or current such as to provide somewhat limited primary general illumination lighting. The general illumination lighting target can be reached by the additional LED-based secondary general illumination lighting component 109 compensating with secondary general illumination lighting for the limited intensity, color, and/or spectral intensity of the primary general illumination lighting and/or the alternate general illumination lighting. Such compensation can be performed manually, such as by a user setting desired settings; or alternately by the general illumination lighting controller 97 setting the level of the LED-based secondary general illumination lighting based on a detected level of the primary general illumination lighting and/or the alternate general illumination lighting.

Certain aspects of the general illumination lighting operation of certain embodiments of the primary general illumination lighting component 107 and/or LED-based secondary general illumination lighting component 109 can be controlled, varied, modulated, etc. (in certain instances in a manner that can enhance the energy luminescence efficiency). Certain embodiments of the general illumination lighting device or system 100 can use multi-wavelength (or multi-spectral band) optical sensor as input by which the general illumination lighting controller 97, as described with respect to FIGS. 1 to 5, can be used to effect electrical supply to the at least one primary general illumination lighting component 107 and/or the at least one LED-based secondary general illumination lighting component 109.

This disclosure provides a variety mechanisms and techniques by which certain embodiments of the at least one primary general illumination lighting component 107 can synthesize gas discharge types of primary general illumination lighting and/or an alternate general illumination lighting (not shown). Certain colors and/or intensities of variety of (e.g., gas discharge) embodiments of primary general illumination lighting can be detected using at least one multi-color sensor or detector 316 of the sensor and/or control portion 303. Certain embodiments of the general illumination lighting device or system 100 may therefore be viewed as general illumination-generation devices that may be configured as, e.g., energy efficient residential embodiments of the general illumination lighting device or system 100 that can 'synthesize' quite exactly, or as desired, a particular color and/or intensity at one or more colors based on the spectral intensity at one or more colors-vs.-time output (e.g., within wide-but-finite limits). Such synthesizing of color and/or intensity at one or more colors can result from the combination of general illumination light as provided by the general illuminating device in a spectrally and/or time-dependent manner.

For color detecting, the intensity at one or more colors of the general illumination light can be sampled into one or multiple (e.g., one, two, or likely three or more) visible bands in a manner to sufficiently as to accurately reflect color changes. Such sampling can be performed at some appropriate and/or desirable rate, for example, every few milliseconds, and then in certain embodiments 'smartly' real-time-serving its photonic components in order to attain the specified spectral-intensity at one or more colors output-functional.

Certain embodiments of the general illumination lighting device or system 100 can act by agilely invoking time-dependent outputs of the at least one LED-based secondary general illumination lighting component 109 that may be configured as 'supplemental sources' of differing and/or known spectral-intensity at one or more colors characteristics "stacked in on top of" the known photonic characteristics of the at least one primary general illumination lighting component 107 as included in the general illumination lighting device or system 100." Certain embodiments of the general illumination lighting device or system 100 could include a conventional fluorescent device secured to a conventional fluorescent light that can be configured to operate as and/or including the at least one primary general illumination lighting component 107. For example, certain of such gas discharge or fluorescent embodiments may provide for good power-energy luminescence efficiency and relatively long lifetime). Certain embodiments of the general illumination lighting device or system 100 might also have a high-agility (e.g., which may be characterized by a low-diameter tungsten wire that may be included in the filament or other element(s) 912) incandescent embodiment of the at least one LED-based secondary general illumination lighting component 109. Certain embodiments of the LED-based secondary general illumination lighting component 109 might include at least one LED that can be used to provide effective provide as spectral (e.g., color and/or intensity at one or more colors) general illumination lighting.

For instance, certain embodiments of the at least one LED-based secondary general illumination lighting component 109 can be configured as 'supplemental photon sources' that can be driven via a sensor-informed processor and/or power-control that may be included in the sensor and/or control portion 303. Such spectral control can be used to limit, such as by summation of the primary general illumination lighting as provided by the at least one primary general illumination lighting component 107 with the secondary general illumination lighting as provided by the LED-based secondary general illumination lighting component 109, such as may be used to limit or reduce flicker as may occur during start-up where the intensity at one or more colors of the general illumination lighting as provided by the general illumination lighting device or system 100 may be limited. Such spectral control can also be used for such purposes as to spectrally modulate the output of the at least one primary general illumination lighting component 107, such as to respond to controlling user demands, to more gracefully accommodate dimming requirements, etc.).

Certain embodiments of the general illumination lighting device or system 100 can operate to adjust the nominal at least one primary general illumination lighting as provided by the at least one primary general illumination lighting component that may result from such aspects as: manufacturing variations, ageing (due to initial burn-in age-degradation, or some other factor), warm-up, customer preferences, etc. Certain embodiments of the general illumination lighting components (either the at least one primary general illumination lighting component 107 and/or the at least one LED-based secondary general illumination lighting component 109) can be illustratively configured as gas discharge lamps (e.g., a fluorescent, a compact fluorescent, a metal halide, etc.), incandescent lights, filament or other element(s), LEDs, etc.

A variety of techniques used to augment of the general illumination lighting of at least one primary general illumination lighting component 107 of the general illumination lighting as provided by the at least one LED-based secondary general illumination lighting component 109 can be provided by combining the general illumination lighting from these two source components 107 and 109. Certain embodiments of the combined general illumination lighting can be sensed, detected, or measured in a spectral and/or time-dependent manner. For example, the color and/or intensity at one or more colors of the general illumination lighting can be sampled at some prescribed and suitable duration (e.g., every few milliseconds in some embodiments, and into at least three visible bands). As a result of the sampling, the spectral density of the general illumination lighting can be compared to a desired spectral (color) or intensity at one or more colors of the at least one primary general illumination lighting component 107 and/or the alternate general illumination lighting. Thereupon, certain embodiments of the general illumination lighting device or system 100 can act at least partially by detecting (perhaps in real-time or near real time) of its photonic components in order to attain the specified color and/or intensity at one or more colors output-functional of the primary general illumination lighting component 107 as combined with the at least one LED-based secondary general illumination lighting component 109.

Certain embodiments of the at least one primary general illumination lighting component 107 and/or the LED-based secondary general illumination lighting component 109 can thereby invoke time-dependent outputs of at-least-one of ‘supplemental sources’ of differing and/or other color and/or intensity at one or more colors characteristics “stacked in on top of” the known photonic characteristics of the device’s “baseline source”. Certain ‘standard’ fluorescent devices may be included within the at least one primary general illumination lighting component 107, and may be configured as “baseline device” (e.g., for power-energy luminescence efficiency and lifetime reasons). Certain embodiments of gas discharge lamps such as fluorescent lamps could also be configured to have an high-agility (such as having a low-diameter wire filament or other element(s) 912) incandescent source and perhaps at least one LED as color and/or intensity at one or more colors ‘supplement’, e.g., ‘supplemental photon source’ of the at least one general illumination lighting device or system 100 driven via a sensor-informed processor and/or power-control of the at least one sensor 316 of the sensor and/or control portion 303. Certain embodiments of such fluorescent devices can be configured as to eliminate-via-summation early-time intensity at one or more colors flicker or to spectrally modulate the output of the at least one primary general illumination lighting component 107 (or to respond to controlling user demands, or to more gracefully accommodate dimming requirements, etc.). Certain embodiments of the at least one secondary general illumination lighting component 109 can be configured as to include at least one LED.

Certain embodiments of the general illumination lighting device or system 100 can be configured to make optical characteristics (color and/or intensity at one or more colors) of the combined general illumination (which may be produced by the at least one primary general illumination lighting component 107, the at least one LED-based secondary general illumination lighting component 109, and/or at least some alternate general illuminating lighting that may be naturally occurring or man-made. The determination of the general illumination lighting as produced by the at least one primary general illumination lighting component 107, the at least one LED-based secondary general illumination lighting component 109, and/or at least some alternate general illuminating lighting may be measured such as by using a detector after some intensity, color, or intensity change is provided, or alternately may be based on design specifications, and/or tables. As such, certain embodiments of the general illumination lighting controller 97 can be configured to operate such as by “knowing the general illumination lighting that the alternate general illumination lighting device provides (as well as the at least one primary general illumination lighting component 107, and/or the at least one LED-based secondary general illumination lighting component 109), and adjust the particular combined general illumination lighting as such I look at tables, etc. to approach a general illumination lighting target. As such, the at least one LED-based secondary general illumination lighting component 109, and/or at least some alternate general illuminating lighting can be configured in an open loop adjustment and/or control system to make the combined general illumination lighting provided thereby approach some desired, prescribed, or programmed general illumination lighting target.

Alternately, the at least one LED-based secondary general illumination lighting component 109, and/or at least some alternate general illuminating lighting can be configured in a closed loop adjustment and/or control system to make the combined general illumination lighting provided thereby approach some desired, prescribed, or programmed general illumination lighting target. Such closed loop adjustment or control can rely on feedback from one or more sensors, that consider a variety of optical or electric characteristics including, but not limited to: a) sensing electric characteristics of the at least one primary general illumination lighting component, b) sensing optical characteristics (color and/or intensity at one or more colors) of the least one primary general illumination lighting component, or c) sensing combined optical characteristics of the least one primary general illumination lighting component or the at least one secondary general illumination lighting component).

Certain embodiments of the general illumination lighting device or system 100 can operate by sensing the electric characteristics of at least one primary general illumination lighting component 107 and/or the at least one secondary general illumination lighting component 109. In these embodiments, the general illumination lighting does not have to be considered, detected, and/or observed.

By comparison, certain embodiments of the general illumination lighting device or system 100 can operate by sensing the optical characteristics of the at least one primary general illumination lighting component 107 and/or the at least one secondary general illumination lighting component 109, also include an optical profile from another general illumination light source. This can yield desired combined optical characteristics of the at least one primary general illumination lighting component 107 and the at least one LED-based secondary general illumination lighting component 109.

Certain embodiments of the general illumination lighting device or system 100 can be configured, for example, with the scenario that there are at least one primary general illumination lighting component 107 in a house, outdoors, or in a region to be general illumination lighting (which may or may not include ambient light such as provided by an alternate general illumination light). It may be desired to install another one of the at least one primary general illumination lighting component 107 in a manner such that the optical characteristics of the new general illumination light matches existing general illumination lighting. For example, a user can provide input indicating they wish to have a particular type of optical characteristics or spectra such as by providing a desired general illumination lighting spectral signature, and certain embodiments of the general illumination lighting device or system 100 can be operated to provide such general illumination lighting. The at least one sensor 316 of the sensor and/or control portion 303 can be configured to sense, in light unity, and thereupon make similar to the general illumination light target. Certain embodiments of the least one sensor or detector 316 can be configured to detect multi-color general illumination lighting, while other embodiments can be configured to detect only one color of general illumination lighting.

The least one sensor or detector 316 can be configured to sense, for example: a) electric characteristics of the at least one primary general illumination lighting component 107, b) the optical characteristics of the general illumination lighting provided by either the at least one primary general illumination lighting component 107, or alternately the general illumination lighting provided by the at least one primary general illumination lighting component 107 and the least one LED-based secondary general illumination lighting component 109. In other words, a user may have a number of lights in a house, building, outdoors, etc. It may be desired to install or replace certain embodiments of the general illumination lighting device or system 100, and the user may desire to have the optical characteristics of the general illumination lighting device or system 100 match the optical characteristics of the existing lights. Certain embodiments of the general illumination lighting device or system 100 may be configured to provide this matching functionality. The at least one sensor 316 of the sensor and/or control portion 303 can be configured in light unity, makes similar to detected light (could be, but doesn't have to be, multi-color).

Certain embodiments of the general illumination lighting device or system 100 may be configured to make the color and/or intensity at one or more colors of the at least one primary general illumination lighting component 107 and/or the at least one LED-based secondary general illumination lighting component 109 match a particular color, a particular light, a particular service, or an alternate light source. This matching may be based on design specifications or tables. That is, it can be determined what a particular primary general illumination lighting component produces, as such certain embodiments of a user, or the general illumination lighting controller 97, can consider specifications or tables, etc. of secondary general illumination lighting component 109 and/or primary general illumination lighting component 107 to make consistent to a desired general illumination lighting target.

Certain embodiments of the general illumination lighting device or system 100 may be configured as a closed loop, such as may include at least one sensor, that can be configured to sense the following (and/or other) optical or electric characteristics: a) sensing control electric characteristics of the at least one primary general illumination lighting component or an alternate general illumination lighting, b) sensing optical characteristics (color and/or intensity at one or more colors) of the least one primary general illumination lighting component or an alternate general illumination lighting, or c) sense combined optical characteristics of the least one primary general illumination lighting component, or an alternate general illumination lighting, or the at least one LED-based secondary general illumination lighting component).

Certain embodiments of the general illumination distortion limiting embodiments of the general illumination lighting device or system 100 can be configured to control and/or adjust such aspects of the at least one LED-based secondary general illumination lighting component 109 as variations of intensity at one or more colors and/or color of the general illumination-light output as provided by the at least one primary general illumination lighting component 107 and/or the at least one LED-based secondary general illumination lighting component 109. Such variations of intensity at one or more colors and/or color may be at least partially a result of such aspects as manufacturing variations, color degradation as a result of ageing, initial burn-in, intensity degradation of various colors or spectral intensities as provided by the primary general illumination lighting component due to ageing, warm-up, or some personal user preferences. Certain embodiments of the general illumination lighting device or system 100 can therefore be configured to adjust for such factors and/or variations of the colors, intensities, or spectral intensities of the general illumination lighting provided by the primary general illumination lighting component 107.

Certain embodiments of the primary general illumination lighting component 107 may be configured to generally include gas discharge lamps (e.g., a fluorescent, a compact fluorescent, a metal halide, etc.). The general illumination distortion limiting components may be incandescent lights, filament or other element(s) 912, LEDs, etc. In certain embodiments of the general illumination lighting device or system 100, the at least one sensor 316 of the sensor and/or control portion 303 can be situated at a variety of location relative to the at least one primary general illumination lighting component 107. For instance, certain embodiments of the at least one sensor 316 of the sensor and/or control portion 303 can be directed at least partially toward the at least one primary general illumination lighting component 107, or alternately certain embodiments of the at least one sensor 316 of the sensor and/or control portion 303, as described with respect to FIG. 5 can be directed towards at least some place of interest as may be at least partially lit by the at least one primary general illumination lighting component 107.

Certain incandescent embodiments of the at least one primary general illumination lighting component 107 and/or the at least one LED-based secondary general illumination lighting component 109 can be configured as halogen lamps, which represent an embodiment of incandescent lamps. Certain halogen embodiments of the at least one primary general illumination lighting component 107 and/or the at least one LED-based secondary general illumination lighting component 109 can be utilized in such non-limiting applications as automotive headlights, stadium lights, parking-lot lights, other external lamps, home lamps, office lamps, or other internal lamps, such as are in common usage.

Figure 15:
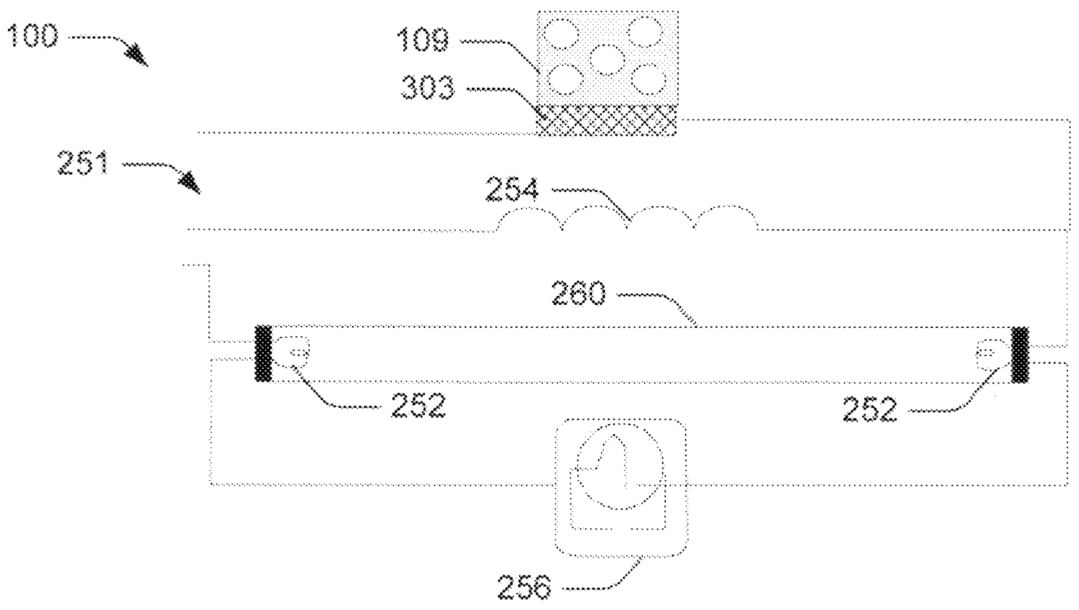
FIG. 15 is a diagram of a gas discharge (e.g., fluorescent) lamp embodiment of the general illumination lighting device or system.

Certain fluorescent embodiments of the primary general illumination lighting component 107 and/or the LED-based secondary general illumination lighting component 109 as described with respect to FIG. 15 may provide general illumination lighting that differs considerably from the spectral general illumination lighting signature of the blackbody radiation 330, and may be illustrated generally as the waveform described with respect to FIG. 16. Certain embodiments of fluorescent lamps 251, can utilize a considerably different mechanism to produce light than as with certain conventional incandescent lamps. By way of illustration, certain embodiments of fluorescent lamps, as described with respect to FIG. 15, can include a gas-discharge tube 250, at least one filament or other element(s) 912, an inductor 254, and a condenser 256. The interior of the fluorescent tube is typically coated with phosphors which allow the photons generated by the at least one filament or other element(s) 912 to be converted from infrared photons to generally visible photons, as the photons pass through the phosphors. Certain embodiments of the inductor can be configured, as a coil, to limit passage of electrical current too quickly through the circuit. Certain embodiments of the condenser 256 can act to at least partially separate some electricity that is used to generate the desired general illumination light from at least some other electricity.

Certain embodiments of the at least one primary general illumination lighting component 107 can be configured as a gas discharge source. This is configured in a manner such that the at least one sensor 316 of the sensor and/or control portion 303, as described with respect to FIG. 5, can sense multiple colors of general illumination lighting, and as such is considered to be multi-color. An electrical circuit may be used to alter gas concentration (vaporize different gas to get different intensity, color, and/or spectral intensity, for example) as described with respect to FIGS. 23 and 24. Certain embodiments of the at least one primary general illumination lighting component 107 and/or the at least one LED-based secondary general illumination lighting component 109, which are configured as gas-discharge devices as described with respect to FIGS. 23 and 24, can include the sensor and/or control portion 303, an at least one gas discharge element 350, an at least one electrode 353, an at least one gas discharge containment regions 353, and at least one barrier 354. fee at least one gas discharge element 350 can be configured to provide some gas to be used for general illumination lighting into the least one gas discharge containment regions 353. Certain embodiments of the barrier 354 can be configured to provide the separation of the gas is contained within each of the gas discharge containment regions 353. Certain embodiments of the sensor and/or control portion 303 can be configured to provide sufficient to gas this within each particular gas this charge containment region 353 to provide for general illumination lighting, such as by fluorescence.

Figure 23:
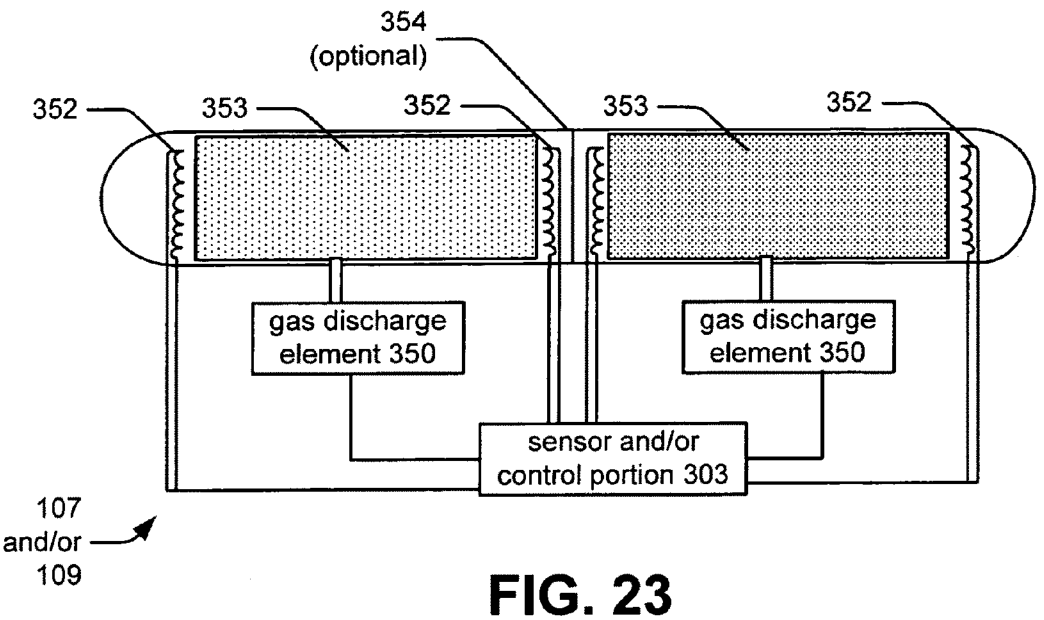
FIG. 23 is a diagram of one embodiment of the general illumination lighting device or system that can synthesize one or more colors, or intensities of at least one color.
Figure 24:
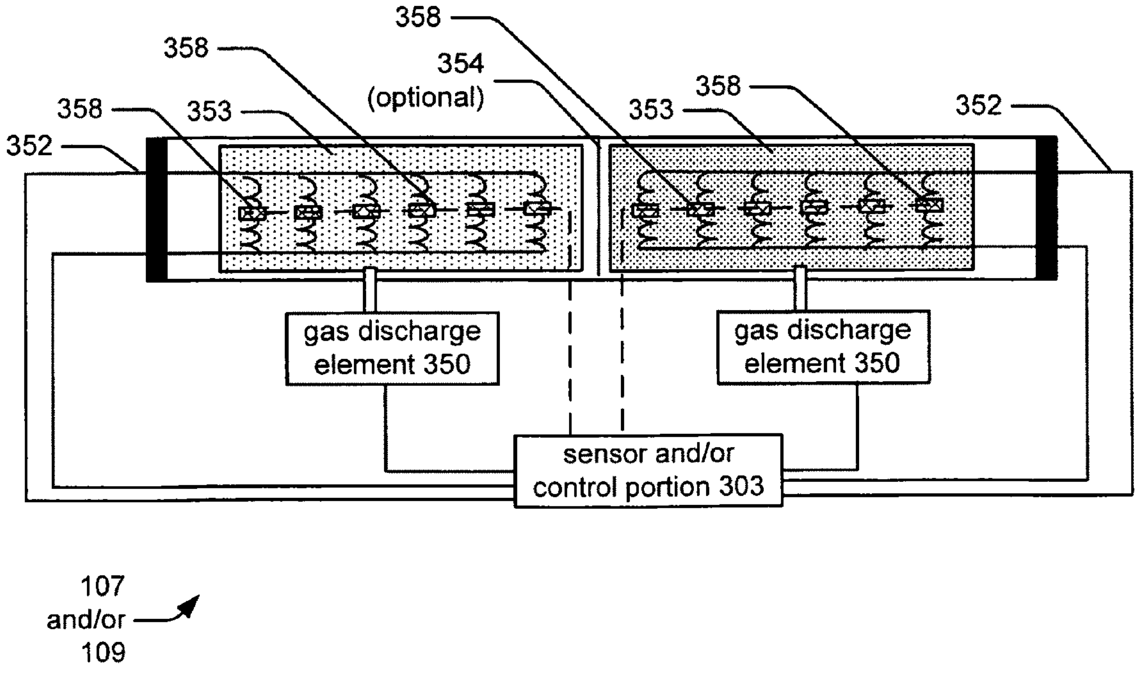
FIG. 24 is a diagram of one embodiment of the general illumination lighting device or system that can synthesize one or more colors, or intensities of at least one color.

Certain embodiment of the gas discharge containment regions 353, situated in the at least one primary general illumination lighting component 107 and/or the at least one LED-based secondary general illumination lighting component 109 as described with respect to FIGS. 23 and 24, can be configured with a variety of electrodes 352, such as to allow electricity to be applied across one or more of the gas discharge containment regions 353. Consider that such particulars as the particular configuration of the electrodes, where the electrical supply passes through the gas-discharge tubes, as well as the configuration of the gas-discharge tubes may be considered as a design choice. FIGS. 23 and 24 illustrate a variety of configurations of electrodes 352 as well as a variety of configurations of the gas-discharge tubes 250. Certain embodiments of such electrodes can have their electricity supplied by the sensor and/or control portion 303. Such configurations of electrodes as described with respect to FIGS. 23 and 24 are intended to be illustrative in nature and non-limiting in scope, since a variety of filaments are known to be used in gas-discharge or fluorescent embodiments of the at least one primary general illumination lighting component 107 and/or the at least one LED-based secondary general illumination lighting component 109. Consider, for example, that filament can prospectively extend through the side or the end of the gas-discharge tube 250, as described respectively in FIGS. 23 and 24.

Figure 26:
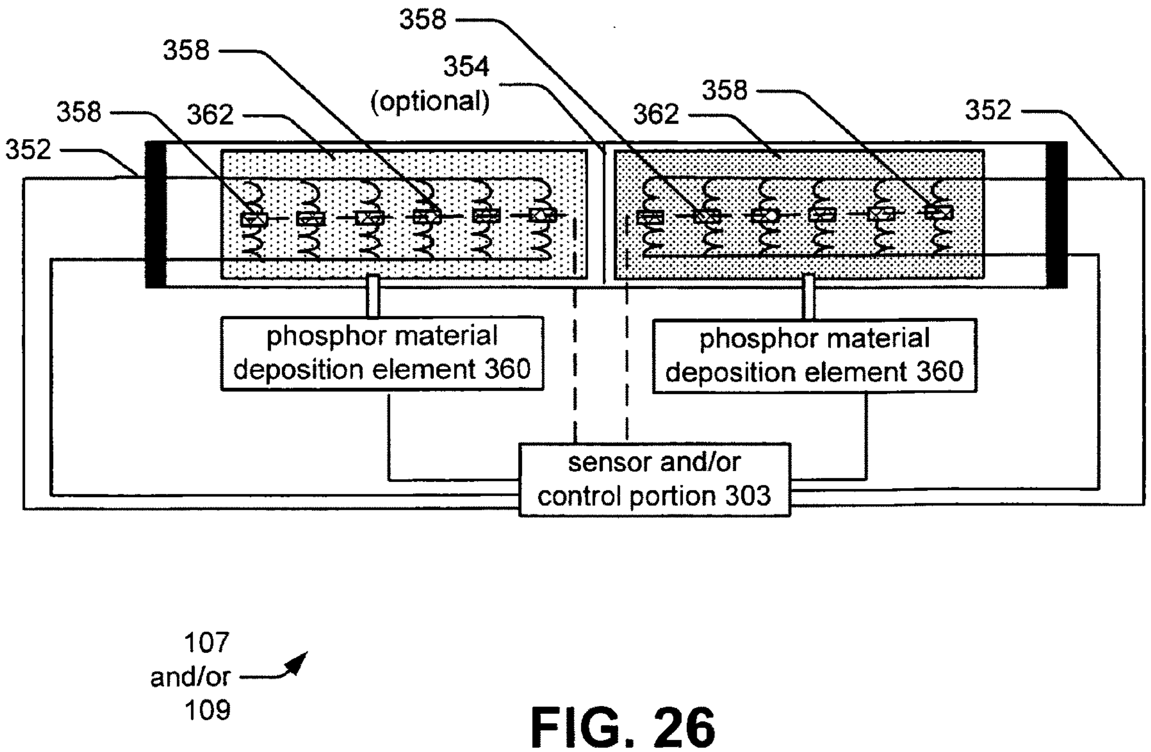
FIG. 26 is a diagram of one embodiment of the general illumination lighting device or system that can synthesize one or more colors, or intensities of at least one color.

Certain embodiments of the electrodes 352 can include, for example, a number of electrode control elements 358 as described with respect to FIGS. 24 and 26. The electric flow through each electrode control element 358 can be controlled, for example, by actuation or deactuation of certain of the electrode control elements 358 from certain embodiment of the sensor and/or control portion 303. Actuating a particular electrode control element 358 that provides a flow a greater distance to a gas discharge containment region 353, for example, would be expected to generate variety of greater intensity of general illumination lighting, for example, while also perhaps requiring a greater voltage to provide sufficient current flow for illumination.

The embodiments of the at least one primary general illumination lighting component 107 and/or the at least one LED-based secondary general illumination lighting component 109 as described with respect to FIGS. 23 and/or 24, to thereby adjust the general limitation lighting by varying the amount of gas discharge from the gas discharge element 350 into the gas discharge containment region 353, as well in this controlling the electricity flowing through each electrode 352, as well as the configuration of each electrode.

Figure 25:
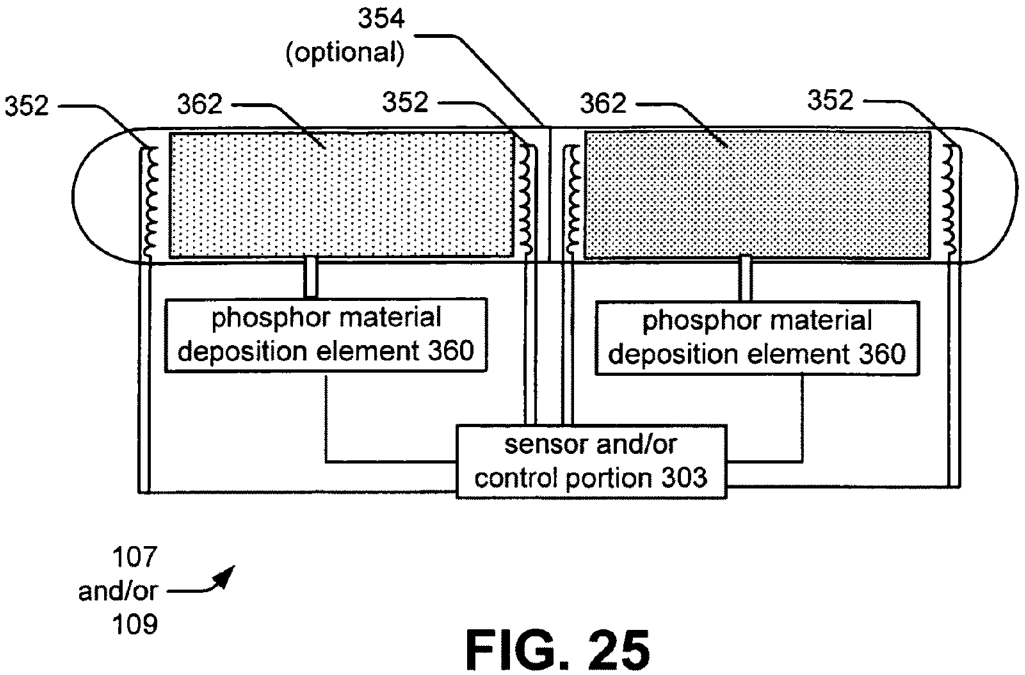
FIG. 25 is a diagram of one embodiment of the general illumination lighting device or system that can synthesize one or more colors, or intensities of at least one color.

By comparison, certain embodiment of the at least one primary general illumination lighting component 107 and/or the at least one LED-based secondary general illumination lighting component 109, as described with respect to FIGS. 25 and 26 are configured to adjust a makeup of phosphors deposited upon the surface of the gas discharge tube 250 within the phosphor deposition region 353. Certain embodiments of the at least one sensor 316 of the sensor and/or control portion 303 may be at least partially electrically-based, while other embodiments may be at least partially optically-based. Certain illustrative optical configurations have different portions of tube coated with different phosphors.

Certain phosphors are, for instance, coated onto certain embodiments of a gas-discharge tube 250 of certain gas-discharge (e.g., fluorescent) embodiments of the primary general illumination lighting component 107 and/or the LED-based secondary general illumination lighting component 109. Certain embodiments of the at least one sensor 316 of the sensor and/or control portion 303 can be configured to excite different regions of gas such that at least one particular area of phosphors is excited. During usage, certain gas discharge light as provided from the phosphors of certain gas discharge or fluorescence lamps may be configured as being arranged within multiple general illumination lighting spectra 334, 336. With the phosphors providing one or multiple general illumination lighting spectra 334, 336, there may be notches, spikes, holes, grooves, and/or other irregularities 338 from the blackbody radiation 330, as illustrated in FIGS. 15 and 16. Such irregularities from the desired blackbody radiation can result in undesired or unnatural appearing color or general illumination. Certain phosphors can degrade in quality over time and/or use, such as to not be able to maintain the quality, color, and/or intensity at one or more colors certain general illumination lighting which may be provided when new, for instance.

A variety of techniques may be used to adjust and/or control general illumination colors, intensities, etc. using certain embodiments of the sensor and/or control portion 303 as described with respect to FIG. 5, by which certain incandescent lighting of the at least one primary general illumination lighting component 107 and/or the at least one LED-based secondary general illumination lighting component 109 can be adjusted and/or controlled by, for example, adjusting the excitation of the photons in gas discharge lamps, filtering or directing the light such as by providing a colored glass bulb of gas discharge or incandescent lamps. Such techniques as controlling excitation of photons, filtering, directing, etc. may be used to effectively block and/or discard certain bandwidths outside of those ranges of colors and the light of the non-used bandwidths. FIGS. 23 to 26 show a variety of embodiments of gas discharge or fluorescent lamps that may be adjusted such as by actuating the amount of phosphors associated with various colors, intensities, and/or spectral intensities that may be energized (such as by energizing filament or other element (s) at distinct locations or positions. Much of the discarded light, e.g., in the form of photons, resulting at least partially from the filtering accounts for much of the associated energy that is filtered are thereupon converted into heat. Some of the broadband general illumination lighting that may be produced by certain incandescent lights may even fall outside of the visible light range (such as infrared or ultraviolet), and as such may not be usable for general illumination lighting. During operation, certain conventional incandescent lights can thereby consume considerable electrical power, and thereby may additionally produce considerable heat for a given output of general illumination lighting (e.g., as may be measured in lumens). Additionally, certain incandescent lamps (e.g., light bulbs) may have a relatively short lifetime, which can be challenging to replace if the at least one incandescent lamp is situated at a difficult to reach or change position or location. Certain municipalities, states, and even countries are considering limiting the use of certain incandescent lamps for certain applications in preference for use of certain gas discharge lamps, such as certain fluorescent lamps, certain mercury vapor lamps, etc.

There may be certain advantages and disadvantages to many conventional fluorescent lamps 251. For example, the color or intensity at one or more colors of the general illumination lighting interfacing with skin, hair, or other surfaces of many people may appear more attractive under incandescent general illumination lighting as compared with certain gas discharge general illumination lighting such as fluorescent lamps. Certain conventional gas discharge lamps such as fluorescent lamps, for example, can make certain surfaces, certain objects, skin, etc. appear relatively shiny, chalky, whitish, unnatural, un-lifelike, etc., often because they provide general illumination lighting of a relatively narrow-band.

Certain of the at least one primary general illumination lighting component 107 and/or the at least one LED-based secondary general illumination lighting component 109 may therefore include conventional gas discharge lamps, conventional fluorescent lamps, conventional halogen lamps, conventional mercury vapor lamps, conventional solid state lamps, and/or conventional LED lamps, etc. and may be configured to consume relatively little electrical power for a given general illumination lighting output as may be measured in lumens. Certain gas discharge lamps and other lamps, such as may be included in the at least one primary general illumination lighting component 107 and/or the at least one LED-based secondary general illumination lighting component 109, can have a relatively long lifetime. Generally though, certain gas discharge lamps may produce quite functional, yet in certain instances relatively undesirable or unflattering color (in the opinion of many people, particularly many women). One reason that the color produced by many of the gas discharge lamps may be considered undesirable or unflattering is the relatively stark unnatural or lifeless color of the general illumination lighting that is applied to certain regions, certain surfaces around a vicinity, etc. Additionally, certain general illumination lighting intensities and/or colors as produced by certain gas discharge lamps can control over its lifetime. For example, certain general illumination intensities (such as associated with red light) of at least certain general illumination colors of the general illumination lighting as provided by a variety of conventional gas discharge lamps may be diminished and a relatively quick rate over the lifetime of the conventional gas discharge lamps.

Certain embodiments of the at least one primary general illumination lighting component 107 and/or the at least one LED-based secondary general illumination lighting component 109 can include, for example, gas discharge lamps such as fluorescent lamps. Conventional gas discharge lamps may generally operate by generating general illumination lighting by sending an electrical discharge through an ionized gas, i.e. a plasma, in such a manner as characteristics of the gas discharge lamps as color, hue, intensity at one or more colors, etc. can thereby depend on the frequency or modulation of the current, as well as the characteristics of the plasma. Typically, such conventional gas discharge lamps as fluorescent lamps that may be used for the at least one primary general illumination lighting component 107 and/or the at least one LED-based secondary general illumination lighting component 109 can include a noble gas (argon, neon, krypton and xenon), or a mixture of such gasses as well as additional materials, like mercury, sodium, and/or metal halides.

In operation the gas within a variety of embodiments of the gas discharge lamp(s) can be ionized thereby emitting free electrons; and the free electrons which may be accelerated by the electrical field in the tube of the gas discharge lamp, can thereupon collide with gas and metal atoms. The use of electrically excited embodiments of gas discharges predates the invention of the incandescent lamp. Gas filled tubes such as are used in certain gas discharge lamps (e.g., fluorescent lamps) may be included in the at least one primary general illumination lighting component 107 and/or the at least one LED-based secondary general illumination lighting component 109 can be used, for such illustrative, numerous, and varied light generation and/or light general illumination applications or purposes including but not limited to: spectroscopy, materials analysis, studies of gas dynamics, and laser pumping, etc. A variety of embodiments and types of gas discharge lamps may be applied to a variety of areas of modern lighting technology, including but not limited to fluorescent lighting for home, external general illumination, and office. Certain embodiments of relatively high intensity at one or more colors gas discharge lamp embodiments of the at least one primary general illumination lighting component 107 the at least one primary general illumination lighting component 107 and/or the at least one LED-based secondary general illumination lighting component 109 may provide for quite efficient area lighting. Other types of the at least one primary general illumination lighting component 107 and/or the at least one LED-based secondary general illumination lighting component 109 can be used for such applications as may include, but are not limited to: neon and other miniature indicator lamps, germicidal and tanning lamps, neon signs, photographic electronic flashes and strobes, arc lamps for industry or stage lights, and certain audio-visual projectors, and many more.

Figure 27:
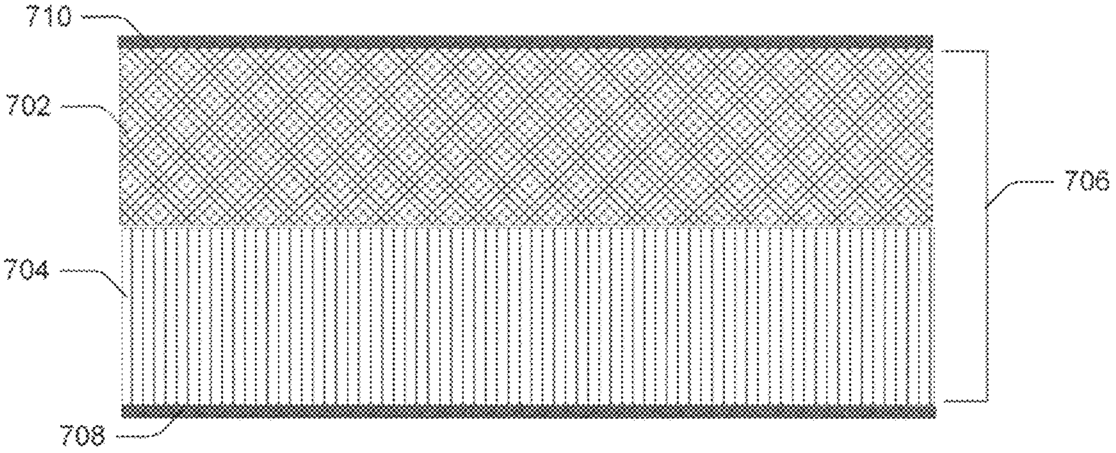
FIG. 27 is a cross-sectional diagram of LED-based secondary general illumination lighting component 109 that can be configured to include an organic light-emitting diode (OLED)

Certain embodiments of the at least one primary general illumination lighting component 107 and/or the at least one LED-based secondary general illumination lighting component 109 can be configured to include an organic light-emitting diode (OLED), as described with respect to FIG. 27. Certain embodiments of the OLED can include, but is not limited to, an at least one emissive layer 702, an at least one conductive layer 704, an at least one substrate 706, an at least one anode terminal 708, and an at least one cathode terminal 710. At least certain ones of the layers 702, 704, 706, 708, or 710 may be made of organic polymer molecules, certain of which may be configured as organic semiconductors, such as may be fabricated using deposition, etching, metallization, and other such techniques. Certain embodiments of the OLED may be a light emitting diode (LED) whose emissive layer is configured as an organic film. The organic film can be deposited (e.g. in rows and columns) using, for example, a photolithographic process. The resulting pattern can be formed as picture elements (pixels) that can emit light of selected or designed colors. During operation, the OLED can be biased, causing an electrical current to flow through the device (e.g., flowing from the at least one cathode terminal 710 to the at least one anode terminal 708). As a result of the electrical current resulting from the biasing of the OLED, the at least one emissive layer 702 can become relatively negatively charged, while the at least one conductive layer 704 can become relatively positively charged. Electrostatic forces can thereupon bring the electrons and the holes towards each other and recombine. This recombination causes a drop in the energy levels of electrons within the at least one emissive layer 702, resulting in an emission of visible photons. That is why this layer is referred to as the at least one emissive layer 702.

Figure 28:
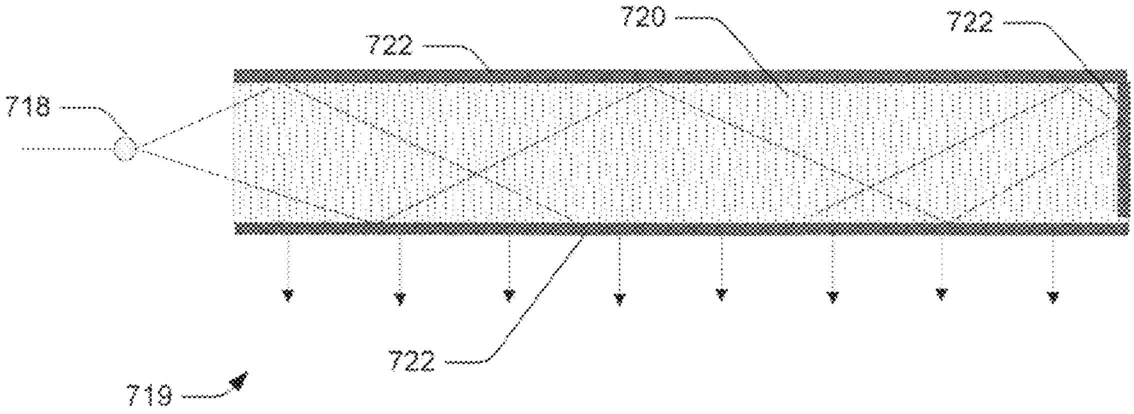
FIG. 28 is a cross-sectional diagram of a general illumination lighting component 109 that can be configured to include a sulfer lamp.

Certain embodiments of the primary general illumination lighting component 107 can include sulfur lamps as described with respect to FIG. 28. General illumination lighting applied from a sulfur lamp 718 to within a sulfur lamp assembly 719, for instance, travels within a transmissive layer arranged between at least one substantially reflective layer 722 and one partially transmissive layer 724. Some percentage of the general illumination lighting exits from the partially transmissive layer 724.

The intensity of certain wavelengths (specific wavelengths correspond to certain emitted colors such as within certain visible, ultra-violet (UV), infrared, or other spectra) of certain gas discharge lamps such as can be included in certain of the at least one primary general illumination lighting component 107 such as can be reduced during start-up. In this manner, the intensity at one or more colors and colors of the gas discharge lamp can be distorted or limited during start-up until the particular gas discharge lamp warms up to a particular operating level. It may require a considerable amount of time for the gas discharge lamp(s) of certain embodiments of the at least one primary general illumination lighting component 107, that may be included in certain parking-lot, sport stadium, building exteriors, and other areas, regions, or views lit by certain embodiments of gas discharge such as certain mercury vapor lights to produce close to their normal operating general illumination lighting (e.g., when warming up, as well as when operating with end-of-life type characteristics). Additionally, certain conventional gas discharge lamps that may be used in certain embodiments of the at least one primary general illumination lighting component 107 such as may include certain fluorescent lamps, certain mercury vapor lamps, etc. can be aggravating to the eyes of many people as a result of flicker and/or their relatively stark color.

Additionally, certain aspects of this disclosure may, depending on context, relate to providing general illumination lighting from an at least one gas discharge lamp that may be made or adjusted to be more attractive, appealing, and/or more natural appearing, etc. Alternatively, light to be provided by gas discharge lamp embodiments of the general illumination lighting device or system 100 may be made customizable or adjustable such as to allow general illumination lighting to be provided having a particular desired color, intensity at one or more colors, limited-flicker, or other desired characteristic.

In certain instances, certain conventional incandescent lamps such as can be configured as the at least one LED-based secondary general illumination lighting component 109 may be operated integral with, or relative to, certain conventional gas discharge lamps configured as the at least one primary general illumination lighting component 107 (such as certain fluorescent lamps, mercury vapor lamps, etc.) to overcome certain adverse effects. Examples of such adverse effects can include, but are not limited to, e.g., provide a desirable overall general illumination lighting color and/or limiting starkness of general illumination lighting in such applications as within a room or outside, providing more uniform light or spectral characteristics, etc. However, such combination of multiple distinct general illumination lighting types (e.g., one or more incandescent lights positioned in the same illuminated area as one or more gas discharge types) may be difficult to relatively control and/or adjust, and thereby may result in somewhat lack adjustable intensity at one or more colors, color, etc.; and as such may also provide a relatively inefficient lighting general illumination.

One challenge with many conventional illumination lights is to provide light of a desired color and/or intensity at one or more colors. It may therefore be desired to synthesize or create certain general illumination lighting colors and/or illumination lighting intensities based, at least in part, on some control of primary general illumination lighting as provided by certain embodiments of the at least one primary general illumination lighting component 107, as well as secondary general illumination lighting as provided by certain embodiments of the at least one LED-based secondary general illumination lighting component 109 as described with respect to FIGS. 1 and 2, and other locations as described in this disclosure. Certain embodiments of the at least one primary general illumination lighting component 107 (such as certain fluorescent lamps, incandescent lamps, mercury vapor lamps, etc.) may be configured as to emit (e.g., provide) improved color as viewed, detected, or used by certain persons or the at least one sensor 316 of the sensor and/or control portion 303. In other words, general illumination lighting of certain intensities and/or colors may be synthesized by certain embodiments of the general illumination lighting device or system 100.

The color, intensity, and spectral intensity for certain gas discharge lamps as well as certain incandescent lamps can be adjusted or controlled, and in the instance of multi-color gas discharge lamps, each color can be individually adjusted and/or controlled using the sensor and/or control portion 303 as described with respect to FIGS. 5, 23-26, and other locations in this disclosure. Certain embodiments of the sensor and/or control portion 303 may be desired to limit flicker, and/or improve lighting characteristics relative to certain embodiments of the at least one primary general illumination lighting component 107, but certain such techniques for control are often relatively expensive, energy inefficient, and may be difficult to produce or maintain. For example, certain conventional fluorescent lamps may not have their luminescence, color, or other general illumination lighting effect altered without considerably affecting their performance. For example, if the power to certain primary general illumination lighting components (such as certain fluorescent lamps, mercury vapor lamps, etc.) are reduced in an effort to reduce the intensity at one or more colors of the illuminated light, then it may operate in some undesirable manner such as with a more pronounced flickering, and not generating as much or any general illumination lighting, etc.

Certain primary general illumination lighting components such as mercury vapor lamps, for example, can be used to provide considerable outside area general illumination lighting, such as in sporting stadiums or parking lots. Certain mercury vapor lamps may be relatively cost efficient to provide sufficient general illumination lighting that can light relatively large areas. Certain embodiments of the mercury vapor lamps may require a considerably time to “start” or turn on before a full general illumination level is reached. The color of certain mercury vapor lamps may appear quite unclear or stark, and/or may be considered of relatively limited quality. It may therefore be desired to improve or enhance the quality, color, hue, intensity at one or more colors, or other characteristics of the light provided by mercury vapor lamps.

The color and/or intensity at one or more colors of general illumination lighting generated by the at least one primary general illumination lighting component 107 can therefore be considerably greater than the general illumination lighting generated by the at least one LED-based secondary general illumination lighting component 109. As such, the general illumination lighting generated by the at least one primary general illumination lighting component 107 can sometimes be configured as general area general illumination, while the general illumination lighting being generated by the at least one LED-based secondary general illumination lighting component 109 can alter, synthesize, control, or otherwise modify light within a relatively limited area such as that which a person or group thereof may be within. As such, certain embodiments of the at least one LED-based secondary general illumination lighting component 109 can relatively efficiently modify light in certain embodiments within a relatively small region (or in other embodiments within a larger region) in a desired or suitable manner.

While considerable portions of this disclosure may describe a variety of the at least one primary general illumination lighting component 107 configured as such relatively broadband lights as fluorescent lamps, there may be a variety of embodiments of the general illumination lighting device or system 100 that may individually fall within at least some of the concepts of this disclosure. For instance, certain embodiments of the at least one primary general illumination lighting component 107 as certain fluorescent lamps, certain halogen lamps, certain mercury vapor lamps, etc. may each have one or more advantage in their particular use; but typically also have one or more disadvantage that may be augmented by the addition of the at least one LED-based secondary general illumination lighting component 109. Certain embodiments of the at least one LED-based secondary general illumination lighting component 109 may be configured as a solid state device, and as such may be relatively easily implemented, fabricated, or associated with the at least one primary general illumination lighting component 107. A variety of such solid-state devices may be provided, many of which may provide relatively controllable, variable, and/or modulatable general illumination light.

Certain embodiments of the at least one primary general illumination lighting component 107 and/or the at least one LED-based secondary general illumination lighting component 109 can be configured to use a solid state device. Examples of solid state devices can include but are not limited to light emitting diodes (LEDs), organic light emitting diodes (OLEDs) as described with respect to FIG. 27, and/or solid state lasers.

A number of embodiments of the general illumination lighting device or system 100 can provide for interactive operation between the at least one primary general illumination lighting component 107, as described relative to FIGS. 1, 2, 3, and/or 4 as to improve or enhance the color and/or intensity at one or more colors of general illumination lighting or limit adverse lighting effects resulting from the at least one primary general illumination lighting component 107 and/or the at least one LED-based secondary general illumination lighting component 109. With certain embodiments of the general illumination lighting device or system 100, at least some of multiple ones of the at least one primary general illumination lighting component 107 can be configured to be similar or dissimilar to each other. Certain embodiments of the at least one primary general illumination lighting component 107 can provide general illumination lighting which can interact to provide a variety of general illumination lighting effects that may be modified as desired or designed by the application of the at least one LED-based secondary general illumination lighting component 109. Such modifying effects as provided within the general illumination lighting device or system 100 of the at least one primary general illumination lighting component 107 by the at least one LED-based secondary general illumination lighting component 109 can be temporal and/or spatial in nature. Certain embodiments of the at least one primary general illumination lighting component 107 and the at least one LED-based secondary general illumination lighting component 109 may therefore be employed in two-or-more distinct modes-of-operation. As such, certain embodiments of the general illumination lighting device or system 100 may be configured as physically separated lighting components that can act as a source of at least two types of general illumination at least partially under the control of the general illumination lighting controller 97, as described with respect to FIGS. 1 to 5.

Certain embodiments of the general illumination lighting device or system 100 can be provided with provision for such features as user-cueing of device performance such as with pre-sets, real-time commands, etc. Such pre-sets, commands, etc. can be customized for particular individuals, and/or generalized to provide particular general illumination lighting. Such techniques may be used as a signaling device, a spoken command, a gesture, etc.

With certain embodiments of the general illumination lighting device or system 100, as described with respect to FIGS. 1 and/or 2, the at least one primary general illumination lighting component 107 can be operationally distinct and physically separated from the at least one LED-based secondary general illumination lighting component 109. Certain embodiments of the primary general illumination lighting component 107 as described with respect to FIGS. 1 and/or 2 may be configured to include a general illumination component of one type and one or more LED-based secondary general illumination lighting components of another type, as described in this disclosure. Certain embodiments of the general illumination lighting device or system 100 can be configured to use the sensor and/or control system 303 to affect (e.g., modulate, control, adjust, etc.) the temporal and/or spectral output of the LED-based secondary general illumination lighting component 109 relative to the primary general illumination lighting component 107 such that the combined output may achieve a desired time and/or spectral output range. As such, certain embodiments of the primary general illumination lighting component 107 and/or the LED-based secondary general illumination lighting component 109 can be configured to provide desired output may include a feedback loop, or negative feedback loop, such as to maintain the general illumination lighting signature (such as can be maintained in the form of data representative of one or more colors, as well as intensities of one or more colors), as described with respect to FIG. 5. In certain instances, the general illumination lighting signature can be personalized to a particular person, location, situation (office, home, work, romantic, reading, school, etc.). As such, certain embodiments of the general illumination lighting device or system 100 can include the at least one sensor 316 of the sensor and/or control portion 303 which can be used to monitor optical characteristics (intensity at one or more colors and/or color) of the primary general illumination lighting component 107 and/or the LED-based secondary general illumination lighting component 109, or can monitor electric characteristics such as to provide a suitable output.

As such, various types of the general illumination lighting, as can be provided by certain embodiments of the general illumination lighting device or system 100, can therefore provide general illumination representing a compromise between such aspects as quality lighting of a desired color and output intensity at one or more colors energy luminescence efficiency or energy usage for a provided given input energy. General illumination lighting can be applied to a variety of such applications as house, but not limited to, interior or exterior general illumination, apartment general illumination, office general illumination, building general illumination, certain outdoor region general illumination, park general illumination, parking-lot general illumination, stadium general illumination, etc. Certain embodiments of the general illumination lighting device or system 100 can be configured to provide general illumination lighting of a desired intensity at one or more colors, color, and/or energy luminescence efficiency even under considerably different lighting conditions.

Certain more recently-developed lamps that are relatively efficient that may have been relatively recently developed and/or commercialized may include light emitting diode (LED) lights, organic light emitting diodes (OLEDs), and/or compact fluorescent lamps (CFLs), as well as developments and derivatives there from, etc. Certain primary general illumination lighting components such as fluorescent lamps or mercury vapor lamps are generally more energy efficient than those incandescent lights that are outputting a similar color and/or intensity at one or more colors, and may provide a relatively considerable amount of general illumination. Certain primary general illumination lighting components can suffer during lone operation from providing relatively undesirable color and/or undesirable lighting characteristics, as well as other spectral and/or time-varying characteristics as compared with, for example, the prescribed general illumination lighting signature. An example of such spectral and/or time-varying undesirable lighting characteristic can include flicker, that can be characterized as cyclic general illumination resulting from the ballast that supplies electricity to the primary general illumination lighting components (such as certain fluorescent lamps, mercury vapor lamps, etc.). Some flicker may occur with certain embodiments of the at least one primary general illumination lighting component 107 as well as certain conventional fluorescent lights either during start-up, normal operation, and/or end-of-life operation. Such flicker, as may occur in certain embodiments of the at least one primary general illumination lighting component 107 and/or the at least one LED-based secondary general illumination lighting component 109, as well as certain conventional fluorescent lights, may be particularly annoying to those exposed to the general illumination lighting (such as in traditional offices or other environments) for considerable durations. Certain embodiments of conventional fluorescent lamps can also provide an increased energy luminescence efficiency (since many of them use a fraction of the energy of a comparable incandescent light bulb) as compared with a variety of conventional incandescent lamps, but can suffer from one or more of undesirable color characteristics, relatively slow start-up, general illumination characteristics, flicker, etc.

At least certain ones of the conventional general illumination lighting effects or characteristics as may be provided by such conventional lights, such as the primary general illumination lighting effects or characteristics as provided by certain embodiments of the at least one primary general illumination lighting component 107 when operating alone can have, or be envisioned to be adverse or undesirable. Examples of such adverse or undesirable affects or characteristics may thereby generally include, but are not limited to, general illumination oscillation or frequency effects, general illumination spectral effects, general illumination color effects, etc. as described in this disclosure. For example, certain persons, particularly women, may consider one adverse or undesirable effect of certain conventional gas discharge lamps (such as certain fluorescent lamps, halogen lamps, mercury vapor lamps, etc.) is that they may be particularly harsh, and often not complementary to their appearance, complexion, and/or skin hue or color. Additionally, certain people consider that certain conventional gas discharge lamps (such as certain fluorescent lamps, mercury vapor lamps, etc.) may be difficult to read by and/or may strain their eyes after a relative duration of being exposed thereto. Such adverse or undesirable effects of many conventional gas discharge lamps (such as certain fluorescent lamps, mercury vapor lamps, etc.) may have even limited their use largely to certain commercial or business regions, outdoor locations, or alternately relatively transitory areas of homes such as bathrooms, garages, hallways, etc.

The embodiment of the general illumination lighting device or system 100 as described with respect for the incandescent and fluorescent embodiments, respectively in FIGS. 15 and 18, as well as other locations through this disclosure, can involve physically distinct versions of the at least one primary general illumination lighting component 107 and the at least one LED-based secondary general illumination lighting component 109, as described with respect to FIGS. 1 and 2. However, the at least one primary general illumination lighting component 107 and the at least one LED-based secondary general illumination lighting component 109 of the general illumination lighting device or system 100 may also be configured as a modular unit such as the primary general illumination lighting component 107 and/or the LED-based secondary general illumination lighting component 109 described with respect to FIGS. P3 and P4 that is capable of operating at least partially under the control of the general illumination lighting controller 97, as described with respect to FIGS. 1 to 5.

Such control of the general illumination lighting device or system 100 by the general illumination lighting controller 97, as described with respect to FIGS. 1 to 5, may be useful such as to personalize or maintain the general illumination lighting of a particular illuminated area at a desired level or color. For example, consider that the embodiment of the general illumination lighting device or system 100 is providing more general illumination lighting of a particular color/wavelength and/or too little general illumination lighting of a particular color/wavelength, then the suitable ones of the at least one primary general illumination lighting component 107 and/or the at least one LED-based secondary general illumination lighting component 109 can be adjusted accordingly. With certain embodiments of the general illumination lighting device or system 100, such general illumination lighting color as well as general illumination lighting color and/or intensity at one or more colors can be sensed by the at least one sensor 316 of the sensor and/or control portion 303 as described with respect to FIG. 5. Other examples of the at least one sensor 316 of the sensor and/or control portion 303 may be described elsewhere in this disclosure.

Certain embodiments of the at least one LED-based secondary general illumination lighting component 109 can utilize a variety of relatively narrow-ban general illumination lamps, such as OLEDs, LEDs, solid state lasers, etc. Certain LED embodiments of the LED-based secondary general illumination lighting component 109 generally produce light within designed ranges. Such relatively narrow-band general illumination may be concentrated within one or more ranges of light illumination, which other correspond to one or more colors of the general illumination lighting (e.g., blue general illumination lighting, green general illumination lighting, red general illumination light, etc., or some combination thereof). Certain embodiments of general illumination lighting represent relatively narrow-band light. As such, certain LED embodiments of the LED-based secondary general illumination lighting component 109 can be expected to provide a relatively narrow-band version of the secondary general illumination lighting effect or characteristic that can be adjusted to adjust the color of the general illumination lighting as desired. As such, certain embodiments of the general illumination lighting device or system 100 can include a relatively narrow-band version of the secondary general illumination lighting effect or characteristic that can be tailored to augment the primary general illumination lighting effect or characteristic.

Certain embodiments of this disclosure therefore describes production of a combined general illumination lighting from a number of general illumination lighting from at least one primary general illumination lighting component 107 and/or at least one LED-based secondary general illumination lighting component 109 that has a variety of altered aspects of the general illumination lighting as compared with the general illumination lighting provided by the at least one primary general illumination lighting component 107 alone. Certain embodiments of the primary general illumination lighting component of the at least one primary general illumination lighting component 107 may be configured as a gas discharge lamp (e.g., a fluorescent lamp, a compact fluorescent lamp, a mercury vapor lamp, a metal halide lamp, etc.). Certain gas discharge lamps that can be configured as the at least one primary general illumination lighting component 107 can have certain primary general illumination lighting effects or characteristics that may be desired to be improved or overcome using the secondary general illumination lighting effects or characteristics of the at least one LED-based secondary general illumination lighting component 109. Examples of such primary general illumination lighting effects or characteristics that may be undesirable and/or desired to be improved or overcome using the secondary general illumination lighting effects or characteristics may include, but are not limited to: relatively long start-up durations, relatively undesirable color; un-modifiable or non-changeable general illumination lighting, and/or flicker.

There are a variety of embodiments of the secondary general illumination lighting effect or characteristic of the at least one LED-based secondary general illumination lighting component 109 that can be used to limit or reduce certain (e.g., undesirable) primary general illumination lighting effects or characteristics of the gas discharge embodiments of the at least one primary general illumination lighting component 107, as described in this disclosure. Examples of the at least one LED-based secondary general illumination lighting component 109 that can be used to provide the secondary general illumination lighting effect or characteristic can include, but are not limited to: incandescent lamp(s), light emitting diode (LED) lamp(s), gas discharge lamp(s), etc.

Certain of the secondary general illumination lighting effect or characteristic that can be limited by using certain embodiments of the general illumination lighting device or system 100 is flicker as described with respect to this disclosure. Certain embodiments of the gas discharge lamps (such as certain fluorescent lamps, mercury vapor lamps, etc.) can provide general illumination lighting that corresponds in rectified intensity at one or more colors to the input electrical source power, which is typically in the from of alternating current. As such, the general illumination lighting as produced by certain gas discharge lamps as fluorescent lamps (particularly early and/or inexpensive designs) may operationally flicker at the rectified rate of twice the oscillation of the input electrical source (e.g., 120 times per second for a provided 60 Hz input electric supply). Flicker can thereby represent the gas discharge general illumination lighting waveform 402 as illustrated in FIGS. 1 and 2 of the general illumination lighting of the primary general illumination lighting component 107 cycling (oscillating) between zero light production (which is generated when zero volts are applied to the at least one primary general illumination lighting component 107) and maximum light production (which is generated when the maximum normal operating voltage is applied to the at least one primary general illumination lighting component 107). Certain embodiments of the at least one LED-based secondary general illumination lighting component 109 may be configured to provide an general illumination augmenting lighting equalizing waveform 404 (which can be equated to generating as at least a portion of the secondary general illumination lighting effect or characteristic) that, when combined with the gas discharge general illumination lighting waveform, can produce a more consistent combined general illumination lighting waveform 406 as compared with the gas discharge general illumination lighting waveform 402. Flicker can be aggravated and/or provided in certain instances by inconsistent or improper electrical supply, worn general illumination lights (near the end of their lives), cold or starting general illumination lights, etc.

Another example of an general illumination lighting effect or characteristic that can be limited with certain embodiments of the general illumination lighting device or system 100 is non-uniformity and/or inconsistency of gas discharge lamp over the life of the at least one LED-based secondary general illumination lighting component 109 as described in this disclosure. Consider that with certain gas discharge lamps (particularly fluorescent, mercury vapor, halogen, etc.) the color and/or intensity at one or more colors of certain intensities at certain wavelengths of the general illumination lighting from certain conventional gas discharge lamps as produced can diminish near end of life of the conventional gas discharge lamps. For example, the color and/or intensity at one or more colors of the illuminated light of certain conventional gas discharge lamps tend to decrease near the end of their useful lives, particularly at certain wavelengths corresponding to particular colors (e.g., reds tend to diminish over the lifetime of certain gas discharge lamps, as a result in changes to the phosphors, such as the phosphors burning out, that correspond to the diminished wavelengths). Certain embodiments of the at least one LED-based secondary general illumination lighting component 109 may thereby be configured to generate an at least a portion of the secondary general illumination lighting effect or characteristic that, when combined with the primary general illumination lighting effect or characteristic as produced by the at least one primary general illumination lighting component 107, can compensate for reduction of particular general illumination lighting colors (or alternatively provide certain general illumination lighting colors) light as provided by the general illumination lighting device or system 100.

Figure 29:
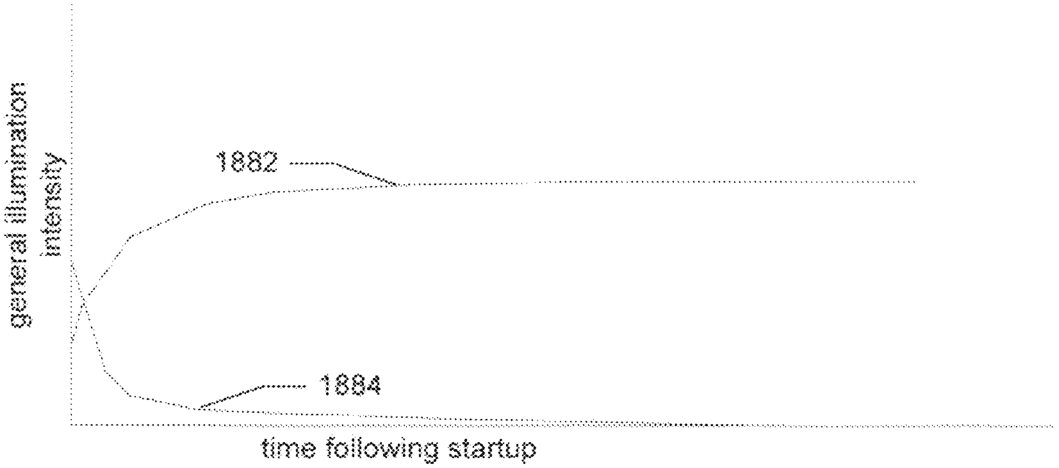
FIG. 29 is a start-up electric diagram of general illumination lighting as provided by one embodiment of the general illumination lighting device or system.

Another example of the secondary general illumination lighting effect or characteristic that can be limited with certain embodiments of the general illumination lighting device or system 100 is improving uniformity of gas discharge lamp at or near initial start-up. For instance, certain embodiments of the at least one LED-based secondary general illumination lighting component 109 may be viewed as providing particular spectra of light not present in the at least one primary general illumination lighting component 107 during start-up, near end of life, to synthesize a particular color and/or intensity at one or more colors, or during some other operational phase. As such, certain embodiments of the at least one secondary general illumination lighting component 109 may be viewed as "turbo charging" or increasing at least one intensity or at least one spectral intensity of the gas discharge lamps certain gas discharge embodiments of the at least one LED-based secondary general illumination lighting component 109. Additionally, certain embodiments of the at least one LED-based secondary general illumination lighting component 109 can be configured as, or to include, thermal elements to provide heat to certain embodiments of the at least one primary general illumination lighting component 107. During the periods that certain general illumination lights start up, the intensity at one or more colors and color of the primary general illumination lighting effect or characteristic that can be produced by the at least one primary general illumination lighting component 107 can be relatively low, or of an undesired color or intensity at one or more colors often largely as a result of a relatively cool bulb, or other element(s), etc. FIG. 29, for example, illustrates an initial start-up curve 1882 in which the overall output color and/or intensity at one or more colors of certain general illumination lights which may be configured as the at least one primary general illumination lighting component 107, increases gradually. Such gradual increase may take a number of seconds, or even a number of minutes. For example, certain gas discharge lamps such as fluorescent lamps, mercury vapor lamps, etc. can produce a relatively low level of general illumination and provide a relatively distorted color during start-up. Certain embodiments of the LED-based secondary general illumination lighting component may be configured to provide secondary general illumination lighting that can augment the reduced primary general illumination lighting and/or additional general illumination lighting during start-up; and additionally can provide an increased heat to heat the primary general illumination lighting component, and therefore reduce the start-up duration.

Another example of an effect or characteristic associated with the second augmenting general illumination lighting that can be limited by use of certain embodiments of the general illumination lighting device or system 100 is improving color and/or general illumination level of the gas discharge lamp near the end of life of the at least one primary general illumination lighting component 107. Certain embodiments of conventional gas discharge lamps such as fluorescent lamps and/or mercury vapor lamps can therefore be exposed to provide illuminating light of a particular color (e.g., frequency) near the end of their life. To sense the color and/or intensity level at one or more colors for general illumination light, certain embodiments of multiple color embodiments of the at least one sensor 316 of the sensor and/or control portion 303 can be utilized as described with respect to FIG. 5. For example, certain gas discharge lamps such as fluorescent lamps, mercury vapor lamps, etc. can alter their general structure and associated general illumination color light producing a relatively low level of general illumination and provide a relatively distorted color near the end of the life of the general illumination light.

Another example of the secondary general illumination lighting effect or characteristic that can be limited with certain embodiments of the general illumination lighting device or system 100 is customizing of synthesizing color of gas discharge lamp to particular situation/person. For example, it may be desirable to allow a person (such as a user, a manufacturer, a lighting designer, or a system provider of certain embodiments of the general illumination lighting device or system 100, to set the general illumination lighting color and/or intensity at one or more colors. Certain embodiments of the general illumination lighting device or system 100 can be selected for a particular space as they approach the room, space, or alternately such general illumination lighting values can be set remotely such as by using wireless communication techniques to provide for relatively consistent lighting even in different room, spaces, regions, etc. Certain users can set the general illumination lighting to indicate a desired color. Certain users may wish to be able to control or adjust the lighting intensity at one or more colors and/or color of the general illumination lighting depending on what they are doing in the room (e.g. reading, watching television, eating, working, etc.). Such control and/or adjustment of the light intensity at one or more colors and/or color the general illumination lighting device or system 100 can be based at least partially on a sensed light intensity at one or more colors and/or color as detected by the at least one sensor 316 of the sensor and/or control portion 303 as described with respect to FIG. 3. Certain embodiments of the at least one sensor 316 of the sensor and/or control portion 303 can be positioned in close proximity to, and/or attached to, a user such as a person such as to allow detection of the general illumination lighting and/or color proximate the person.

Another example of the secondary general illumination lighting effect or characteristic that can be limited with certain embodiments of the general illumination lighting device or system 100 is predicting failure of gas discharge lamp. Consider that by detecting or sensing the illuminated light color and/or intensity at one or more colors, a variety of information can be derived pertaining to the potential life of the general illumination lighting device or system 100 and/or the primary general illumination lighting component 107. For instance, certain illuminated light colors tend to be reduced near the end of life of certain general illumination lighting device or system 100 and/or certain primary general illumination lighting component 107.

2. GAS DISCHARGE EMBODIMENTS OF GENERAL ILLUMINATING LIGHTING DEVICE(S)

This disclosure describes a variety of gas discharge (e.g., fluorescent, metal halide, etc.) embodiment of the at least one primary general illumination lighting component 107 and/or the at least one gas discharge LED-based secondary general illumination lighting component 109. Such gas discharge embodiments of the at least one primary general illumination lighting component 107 can be applied to a variety of general illumination lighting systems, configurations, operating frequencies or energies, intensities, fluorescing light characteristics or colors, applications, etc. Certain gas discharge embodiments of the at least one primary general illumination lighting component 107 and/or the at least one LED-based secondary general illumination lighting component 109 can operate using a variety of gas discharge devices and/or gas discharge techniques, but typically share considerable commonality. Examples of gas discharge embodiments of the at least one primary general illumination lighting component 107 as well as gas discharge embodiments of the at least one LED-based secondary general illumination lighting component 109, can produce general illumination lighting by using electricity to excite a plasma-producing gas (e.g., mercury vapor in argon or neon gas), thereby providing a plasma. Certain embodiments of the excitation of the plasma-producing gas can, depending on context, produce a relatively short-wave ultraviolet light. The ultraviolet light can thereupon cause the phosphor (typically coated on the envelope of the gas-discharge light, to fluoresce thereupon producing visible light.

A variety of embodiments of phosphors are generally understood from a variety of gas discharge tube technology, such as with fluorescent lamps. Within this disclosure, the phosphor represents a material that typically coats the gas discharge tube or envelope, which when exposed to radiation, can emit visible light. This disclosure provides a variety of embodiments of the general illumination lighting device or system 100 by which phosphors in gas discharge general illumination lights can be controlled such as to provide adjustable or controllable general illumination light. The radiation might include ultraviolet light, a beam of electrons, or other electromagnetic radiation, in certain embodiments of the at least one primary general illumination lighting component 107 and/or the at least one LED-based secondary general illumination lighting component 109.

A variety of colors and/or intensities of the general illumination lighting can be associated with particular phosphors as well as other particular of the gas discharge tube or envelope. For example, the phosphors as associated with the particular fluorescent color can be configured to absorb the particular invisible ultraviolet light, and emit visible light at a characteristic color. Degradation of phosphors, such as may occur after considerable use, can considerably affect such spectral characteristics as color(s) and/or intensities of the general illumination lighting, etc. such as may be provided by certain embodiments of the at least one primary general illumination lighting component 107, the at least one LED-based secondary general illumination lighting component 109, as well as ambient or other natural or man made light.

The cathode of certain embodiments of the general illumination lighting component (107 and/or 109) may be made of such material as coiled tungsten which may, for example, be coated with a mixture of barium, strontium and calcium oxides (chosen to have a relatively low thermal emission). When the fluorescent embodiment of the general illumination lighting component 107 and/or 109 is turned on, the electric power can heat up the cathode sufficiently to allow it to emit electrons.

Certain embodiments of the general illumination lighting component (107 and/or 109) that are configured as fluorescent lamps are configured as negative resistance devices. As such, as more current flows through them, more gas can become ionized, and the electrical resistance of the fluorescent lamp can thereby drop, thereby allowing even more current to flow. If certain embodiments of the general illumination lighting component (107 and/or 109) were connected directly to a constant-voltage mains power line, certain embodiments of the gas discharge lamp would rapidly self-destruct due to the uncontrolled current flow. Such uncontrolled current flow may be limited by the ballast, which is typically designed to regulate the current flow through the fluorescent tube or envelope.

There are a variety of techniques to start, or preheat, certain gas discharge embodiments of the at least one primary general illumination lighting component 107 and/or the at least one LED-based secondary general illumination lighting component 109. During preheating, certain embodiments of the filament or other element(s) can be configured to emit electrons into the gas column by thermionic emission, thereby creating a glow discharge around the filament or other element(s). Then, when the starting switch opens, certain inductive embodiments of the ballast can create a high voltage, which can act to strike the arc.

Certain embodiments of the general illumination lighting component (107 and/or 109) may thereby be configured as such gas discharge lamps as fluorescent lamps, mercury vapor lamps, etc. as described herein. Modification between particular types of gas discharge lamps may result based on certain embodiments of the at least one primary general illumination lighting component 107 and/or the at least one LED-based secondary general illumination lighting component 109. Unlike incandescent lamps, certain embodiments of the gas discharge lamps such as fluorescent lamps and mercury vapor lamps require a ballast to regulate the flow of electrical power through the light. Compact fluorescent lamps represent another embodiment of the gas discharge lamps that represent an energy efficient alternative that may have ballast located in the fixture or they may have ballasts integrated in the bulbs. Certain compact fluorescent lamps are formed in a helical pattern, such that a relatively long fluorescent tube or envelope can be contained in a relatively small area. For example, certain compact fluorescence embodiments the at least one primary general illumination lighting component 107 can be contained in a relatively small volume, similar to a conventional incandescent lamp. A variety of gas discharge embodiments of the at least one primary general illumination lighting component 107 may be contained in light holders of a type used for, or modified from, conventional incandescent lights.

The production of certain gas discharge embodiments of the general illumination lighting component (107 and/or 109) may rely at least partially upon a scattering of photons. For example, initially incident electrons (such as may be emitted from the coating on the coils of wire forming the cathode electrode) can be configured to collide with a target atom situated in the plasma gas (e.g., mercury, argon and/or krypton depending on the type of gas discharge tube or envelope) that may be configured or considered as an ultraviolet photon emitter. Certain embodiments of the plasma gas may be contained within the tube or envelope of such gas discharge primary general illumination lighting component 107. This collision of the electron with the target atom situated in the plasma gas may cause an electron in the atom to temporarily jump up to a higher energy level to absorb some, or all, of the kinetic energy delivered by the colliding electron. This higher energy state of the target atom is unstable, and the target atom will thereupon emit an ultraviolet photon as the electron of the target atom reverts to a lower, more stable, energy level. The photons that are released from the chosen plasma gas mixtures for fluorescent, mercury vapor, halogen, and other such gas discharge tubes or envelopes tend to have an ultraviolet spectrum wavelength. These electrons may collide with and ionize noble gas atoms in the bulb surrounding the filament or other element(s) 912 to form the plasma gas by a process of impact ionization. In certain embodiments, as a result of avalanche ionization, the conductivity of the ionized gas rapidly may rise, allowing higher currents to flow through certain embodiments of the general illumination lighting component (107 and/or 109). In certain instances, the gas forming the gas plasma, such as mercury, exists at a stable vapor pressure equilibrium point of about one part per thousand in the inside of the tube or envelope in a manner which can then be likewise ionized, causing it to emit photons in the ultraviolet (UV) region of the spectrum.

Certain embodiments of the general illumination lighting device or system 100 are configured to allow reconfiguring the gas plasma contained within the gas discharge tube or envelope. By reconfiguring the contents of the gas plasma within the gas discharge tube or envelope (included in at least one primary general illumination lighting component 107), the color of the general illumination lighting as provided by certain embodiments of the at least one primary general illumination lighting component 107 can be varied.

Certain embodiments of the at least one primary general illumination lighting component 107 can be configured to change at least one color or at least one intensity of one or more colors at least partially by altering the mixture within the gas plasma. This can be accomplished, for example, by adding the cesium to at least some mercury which may be included in the gas plasma. Certain embodiments of the general illumination lighting device or system 100 can be configured such that some percentage of mercury in gas plasma included in the at least one primary general illumination lighting component, for example, be changed. In other words, by changing the amount and/or type of gas that is included in the gas plasma, the general illumination lighting produced thereby can be altered. This changing of the chemical-make up of the gas can be provided, for example, by including a heater that can be used to heat the desired gas, such as to provide more cesium, and thereby effect the general illumination lighting provided thereby.

Certain embodiments of the at least one primary general illumination lighting component 107 and/or the at least one LED-based secondary general illumination lighting component 109 can be configured to change at least one color or at least one intensity of one or more colors at least partially by altering the pulse waveform as applied. By providing pulses, can keep the filament of the gas-discharge light excited or be reduced such as to lapse into a drop-off of the provided general illumination lighting. Certain embodiments of the voltage and/or current as provided to the at least one primary general illumination lighting component 107 and/or the at least one LED-based secondary general illumination lighting component 109 can be altered, in this manner.

Figure 30:
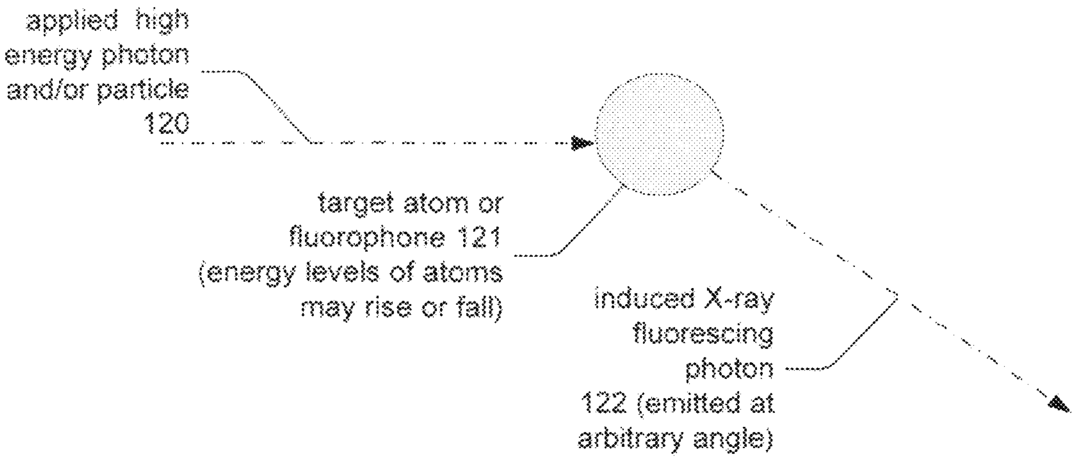
FIG. 30 is a diagram illustrating one embodiment of one aspect of fluorescence.

The scattering of certain photons as associated with certain embodiments of the general illumination lighting device or system 100, such as the gas plasma included in the fluorescence or mercury vapor of the at least one primary general illumination lighting component 107 and/or the at least one LED-based secondary general illumination lighting component 109, are now described. A number of embodiments of the production of the photons using fluorescent within certain embodiments of the at least one primary general illumination lighting component 107 (as well as certain embodiments of the at least one LED-based secondary general illumination lighting component 109) are described with respect to FIGS. 30, 31, 32, and/or 33. Such production of photons in FIGS. 30, 31, 32, and/or 33 can be applied to the photons provided by the plasma gas that is typically used to provide ultraviolet photons, as well as the photons provided by the phosphors typically coated on fluorescent tubes or envelopes, etc. that is typically used to provide visible photons as described in this disclosure. FIG. 30 shows, for example, a diagram of a fluorescing event associated with an photon of the at least one applied photon 120 contacting a target atom 121, such as may occur within a fluorescent embodiment of the gas discharge lamp as described in this disclosure. After the at least one applied photon 120 contacts at least a portion of the target atom 121, then an at least one emitted fluorescing photon 122 can be generated/emitted (usually in a somewhat random direction) from the target atom 121. It is entirely possible, and indeed the operation of certain embodiments of fluorescent lamps may depend on, certain of the at least one emitted fluorescing photon 122, being operationally configured as at least one applied photon 120 that can thereupon contact another target atom 121 and thereupon produce another emitted fluorescing photon 122. In general, energy may be loss, and the resulting color changes, as the at least one applied photon 120 is converted into the emitted fluorescing photon 122 during a particular fluorescing event. Such loss of energy may at least partially result from heat and transition of displaced atoms between the various valence bands within the target atom 121 (included as at least a portion of the "matter" of the individual as described in this disclosure). Such loss of energy within the fluorescing of the target atom 121 during the fluorescing event can be overcome by the addition of energy through the electricity supply of the general illumination lighting device or system 100. Such elements or atoms that can undergo fluorescence can be in their natural state and/or may include the fluorescence enhancing additives, filters, etc. to enhance the general illumination lighting.

Figure 31:
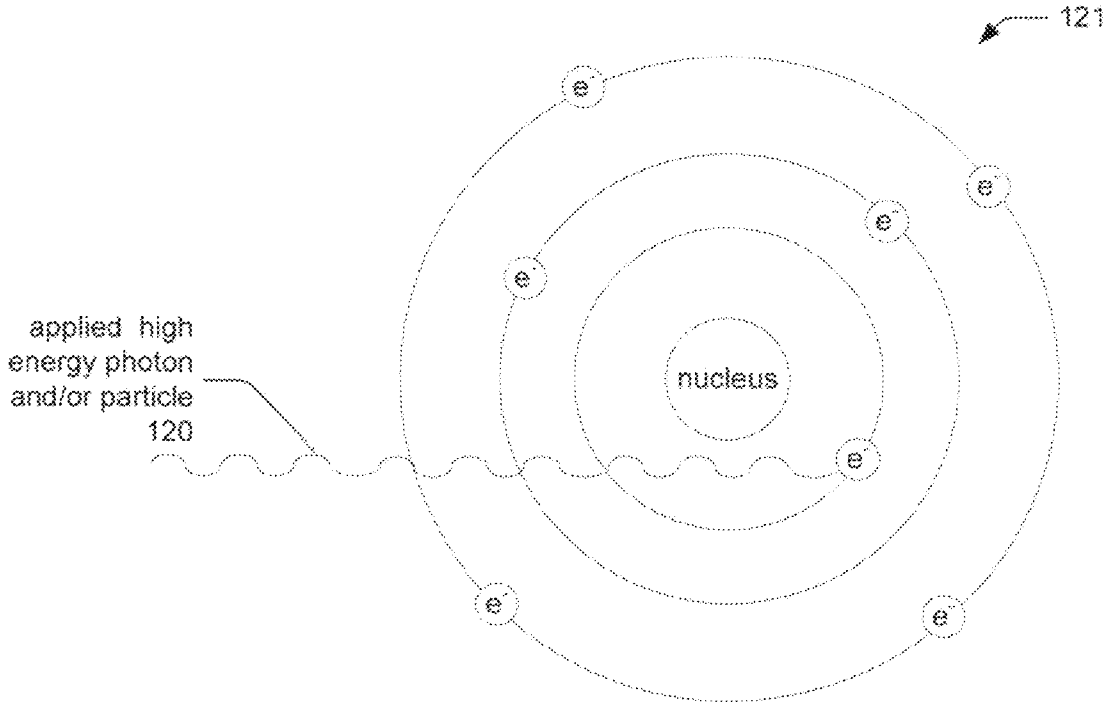
FIG. 31 is an atomic diagram illustrating one embodiment of one aspect of fluorescence where an applied high-energy photon is applied to a target atom.
Figure 32:
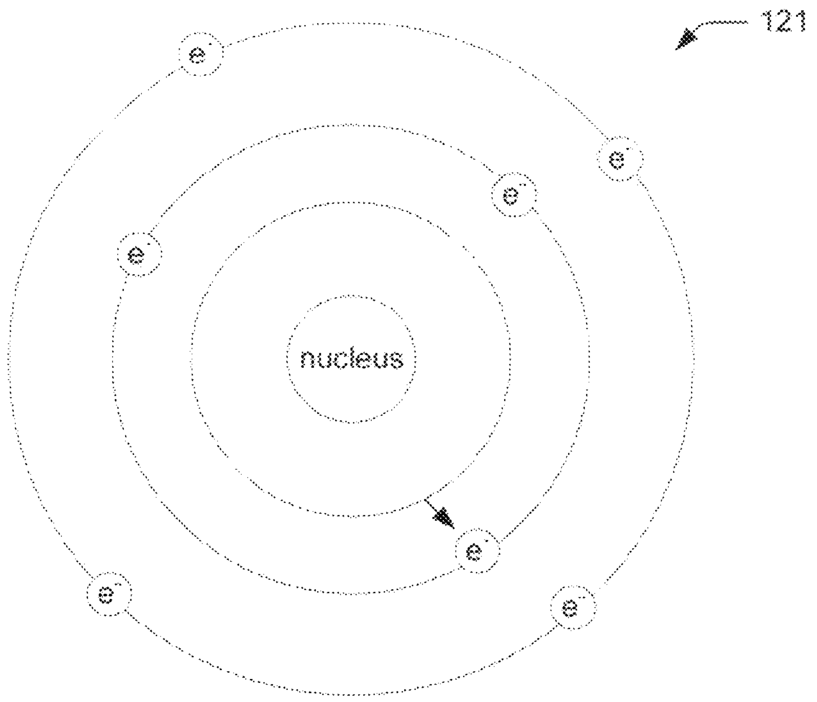
FIG. 32 is an atomic diagram illustrating one embodiment of one aspect of fluorescence where an energy level of one of the electrons of the target atom is raised as a result of the applied high-energy photon being applied to a target atom.

Fluorescence, as described generally with respect to FIGS. 30, 31, 32, and/or 33, may be considered to be a type of luminescence, in which susceptible molecules emit photons from electronically excited states. Fluorescence can result from at least one applied photon 120 being applied either from within the optical, X-ray, infrared, ultraviolet, gamma or certain other spectra. For the purpose of this disclosure, though, the emitted fluorescing photon 122 may, depending on context, be considered to be within the spectra. Certain aspects of this disclosure may, depending on context, be particularly directed to high energy photons or particles, such as the X-ray, gamma, or other spectra that are particularly applicable to penetrate into the matter of the individual 82, and are therefore useful for general illumination lighting.

Figure 33:
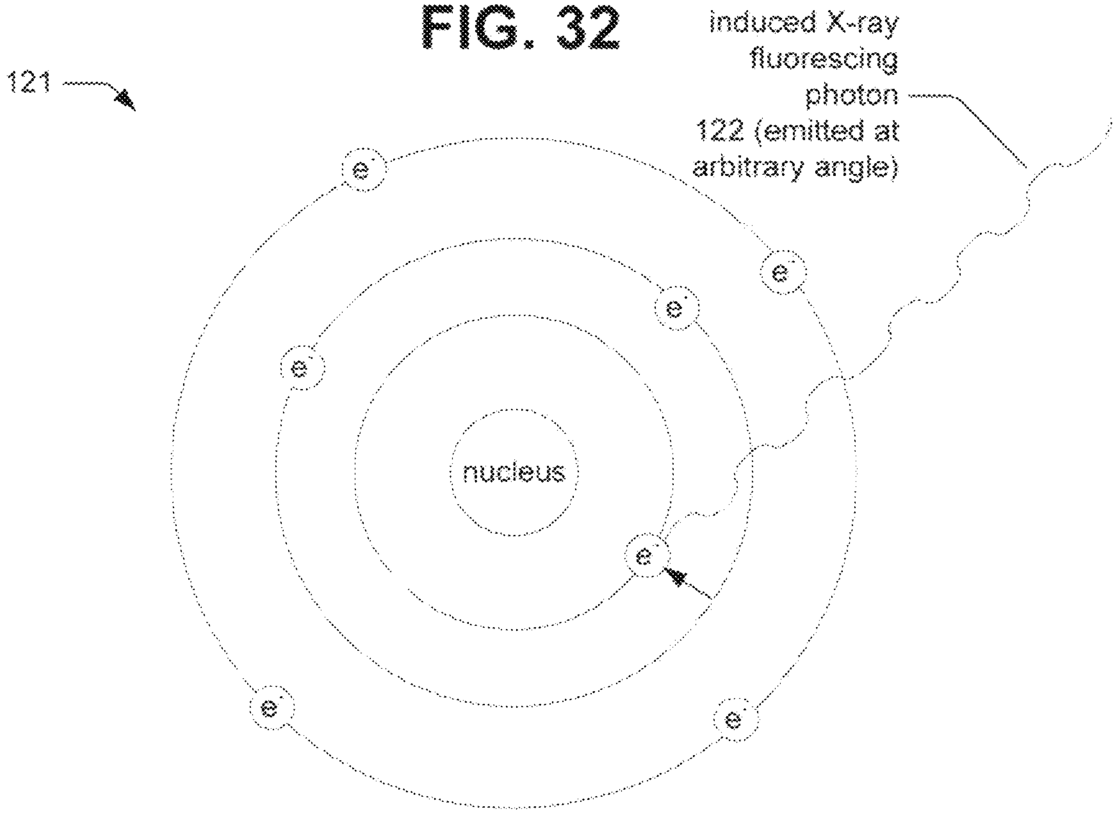
FIG. 33 is an atomic diagram illustrating one embodiment of one aspect of fluorescence where a fluorescent photon is produced as a result of the electrons of the target atom of the target atom dropping from its raised energy state to its original energy state.

Fluorescence may be established using a variety of mechanisms, but within this disclosure fluorescence can, depending upon context such as described with respect to FIG. 31, may relate to a high energy photon or particle in the form of the at least one applied photon 120 being applied to the target element, thereby raising the energy level of at least one of the electrons of the target elements to a higher energy state and as described with respect to FIG. 32. Thereupon, the electron whose energy state is raised returns to the normal state, and the high energy photon in the form of the at least one emitted fluorescing photon 122 can be emitted as described with respect to FIG. 33. The characteristic energy, and associated wavelength, of the emitted fluorescing photon 122 as described with respect to FIG. 33 may be characterized according to the at least one element included in high energy photon, and may be characterized according to the characteristic energy level. As such, the term "fluorescence" may, depending on context, relate to an phenomenon in which the molecular absorption of a photon triggers the emission of another photon with a longer wavelength (i.e., lower frequency or lower photonic energy level) such as comparing the energy of the at least one applied photon 120 of FIG. 31 with respect to the energy of the at least one emitted fluorescing photon 122 as described with respect to FIG. 33. The energy difference between the absorbed and emitted photons may result in the production of molecular vibrations and/or heat. Usually the absorbed photon is in the fluorescence range, or other suitable range; while and the emitted light is in the fluorescence range, but this depends on the absorbance curve and Stokes shift of the particular target atom or fluorophore 121. Certain embodiments of fluorescence can thereby occur when a molecule relaxes to its ground state after the electrons of the target atom or fluorophore 121 is electronically excited as described with respect to FIGS. 30, 31, 32, and/or 33.

Those emitted fluorescing photons 122 emitted from identical elements of the at least some matter (e.g., the target atom) should have similar or identical characteristic energy levels of the at least one emitted fluorescing photons 122, as may be referred to the characteristic energy for that particular element. As such, certain embodiments of the general illumination lighting device or system 100 can operate to detect the presence or absence of certain elements in the volume by filtering (such as by using a notch filter) those fluorescing photons 122 being applied to the at least one fluorescence receiving portion(s) 151 as described with respect to FIG. 33, which typically fall within a particular energy level/frequency corresponding to the characteristic energy of the elements (or chemicals, compounds, and/or biological materials) indicative of the presence of elements forming the general illumination lighting device or system 100, as described in this disclosure.

As such, the characteristic energy as produced by certain photon that have undergone fluorescence generally corresponds to the energy loss resulting at least partially from the fluorescing event, and the characteristic energy should be similar or identical for fluorescing events occurring from the same element. For example, certain electrons of certain elements (such as may be included within the fluorescing element and/or as plasma within the fluorescent lamp) may produce by fluorescence at least one emitted fluorescing photon 122 having identical energies, and therefore frequencies when their electrons return to their relaxed state, which corresponds to the characteristic energy level or characteristic wavelength of the at least one emitted fluorescing photon 122. Fluorescent lights may thereby emit their at least one emitted fluorescing photon 122 forming the illuminating light having at least one (and often more) characteristic energy. The fluorescing position of the fluorescing event generating the at least one emitted fluorescing photon 122 can be determined based at least partially on the fluorescence equations, photonic equations, Stokes equations, energy equations, etc. as described herein, as well as geometric equations.

Such ultraviolet photons as passing within many of the gas discharge tubes or envelopes are thereby not visible to at lest some human eyes, so with certain embodiments of the primary general illumination lighting component, the ultraviolet photons provided thereby may be desirably converted into visible light to provide general illumination light, using a process known generally as fluorescent conversion. Such fluorescent conversion may occur within the phosphor, such as may be situated within a phosphor coating on the inner surface of the phosphor lamp tube or envelope. During the fluorescent conversion, certain of the ultraviolet photons may be absorbed by electrons in the phosphor's atoms, thereby cause an energy jump of the phosphor electrons, then a drop in energy level of the phosphor electrons, with a corresponding emission of a further visible photon that typically has a lower energy level than the ultraviolet photon. As such, certain embodiments of the phosphors may be designed to emit visible light of particular colors. The visible photon that is emitted from this second interaction has a lower energy than the ultra-violet photon that caused it. The chemicals that make up the phosphor may be configured to be at wavelengths visible to the human eye within at least one particular color (s). The difference in energy between the absorbed ultraviolet photon and the emitted visible light photon may be converted to heat which can act to heat up the phosphor coating, and thereby act to decrease the start-up time of the gas discharge lamp.

The UV light can thereupon be absorbed by the fluorescent coating, which re-radiates the energy at lower frequencies to emit visible light. The blend of phosphors controls the color of the general illumination light, and along with the bulb's glass, acts to shield the harmful UV light from escaping from within the tube or envelope of the gas discharge lamp to the surrounding environment. Certain embodiments of the gas discharge lamp embodiment of the general illumination lighting component (107 and/or 109) may thereby be filled with the plasma gas that may contain such low pressure gasses as mercury vapor, argon (or xenon), argon-neon, krypton, etc. A typically internal surface of the tube or envelope, glass, or other such surface of the primary general illumination lighting component 107 may thereby be coated with a fluorescent (and often slightly phosphorescent) coating made of varying blends of metallic and rare-earth phosphor salts. While certain embodiments of the ballast may be configured to be structurally as simple as a resistor, substantial power may be wasted in resistive ballast. As such, certain embodiments of the ballast may be configured as a reactance (inductor or capacitor) device to limit the power requirements. Certain embodiments of the primary general illumination lighting component 107 may include a ballast providing operation from AC mains voltage, the use of simple inductor in a so-called "magnetic ballast" is common. In countries that use 120 V AC mains, the amount of voltage may be insufficient to light large fluorescent lamps so the ballast for these larger fluorescent lamps can include a step-up autotransformer. Both types of inductive ballast may also include a capacitor.

There are a variety of potential configurations of ballasts for such gas discharge tubes or envelopes that may be used in certain embodiments of the primary general illumination lighting component 107. Certain embodiments of the primary general illumination lighting component 107 can be configured as fluorescent lamps may run directly from a DC supply of sufficient voltage to strike an arc, in which cases, the ballast should be resistive rather than reactive. Certain embodiments of the general illumination lighting component (107 and/or 109) that are configured as fluorescent lamps are not operated directly from a DC electrical source; and instead an inverter can converts the DC into AC and provides the current-limiting function as described below for electronic ballasts. Certain embodiments of general illumination lighting component (107 and/or 109) configured with relatively sophisticated ballasts may employ transistors or other semiconductor and/or solid state components to convert mains voltage into high-frequency AC while also regulating the current flow in the light. These semiconductor and/or solid state ballasts may be referred to as "electronic ballasts".

With certain embodiments of general illumination lighting component (107 and/or 109), configured as fluorescent lamps, the mercury atoms in the fluorescent tube or envelope should be ionized before the arc can strike within the tube or envelope. For relatively small lights, it does not take much voltage to strike the arc and turn on the general illumination lighting device or system 100. Larger tubes or envelopes may require a substantial voltage (in the range of a thousand volts) for startup, however. With certain gas discharge embodiments of the general illumination lighting device or system 100, so-called "instant start" gas discharge embodiments of the primary general illumination lighting component 107 or LED-based secondary general illumination lighting component 109 can be used that use a high enough voltage to break down the gas and mercury column and thereby start arc conduction. In other gas discharge embodiments of the general illumination lighting device or system 100, a separate starting aid may be provided. Some fluorescent designs, such as those that are configured to provide preheating, use a combination filament or other element(s) 912/cathode at each end of the light in conjunction with a mechanical or automatic switch that preheats the filaments (such as by connecting the filament or other element(s) 912 in series with the ballast) prior to striking the arc. Electronic starters can also sometimes be used with these electromagnetic ballast fittings to start the general illumination lighting device or system 100.

Certain "rapid start" ballast designs provide filament or other element(s) 912 power windings within the ballast. With such systems, there is no starter. Instead, the ballast keeps a low flow of current running through the filaments at all times or during the start-up period, and uses a capacitor or other techniques to start the lamp by ionizing the gas, which is another way to reduce the initial resistance of gas to a flow of electrical current. When the gas discharge lamp lights, the voltage and frequency across the tube and capacitor of the gas discharge lamp typically both drop, thus capacitor current also drops. Generally the capacitor and the inductor, which provides current limiting in normal operation, form a resonant circuit, increasing the voltage across the light so it can easily start. Some electronic ballasts use programmed start. The output AC frequency is started above the resonance frequency of the output circuit of the ballast; and after the filaments are heated, the frequency is rapidly decreased. If the frequency approaches the resonant frequency of the ballast, the output voltage will increase so much that the light will ignite. If the light does not ignite, an electronic circuit stops the operation of the ballast.

Certain fluorescent lamps require a ballast to stabilize the light and to provide the initial striking voltage required to start the arc discharge. This increases the cost of fluorescent luminaries, though often one ballast could be shared between two or more lights. Electromagnetic ballasts with a minor fault can produce an audible humming or buzzing noise. Conventional light ballasts do not operate on direct current. If a direct current supply provided with a high enough voltage to strike the arc is available, a resistor can be used to ballast the light but this leads to low energy luminescence efficiency because of the power lost in the resistor. Also, the mercury tends to migrate to one end of the tube leading to only one end of the light producing most of the light.

A number of embodiments of the general illumination lighting device or system 100 are now further described. Certain embodiments of the general illumination lighting device or system 100 can therefore utilize multiple ones of the primary general illumination lighting component 107 and/or the LED-based secondary general illumination lighting component 109 that may be characterized as multi-component solid-state devices such as described with respect to FIG. 1 or 2 that can be used to provide spectral, energy luminescence efficiency, and/or frequency-content-specified general illumination. Certain embodiments of a general illumination lighting device or system 100 can utilize the primary general illumination lighting component 107 and/or the LED-based secondary general illumination lighting component 109 as described with respect to FIG. 1, in which each of the multiple general illumination lighting component(s) may be situated relative to each other to do some manner to enhance the general illumination lighting effect.

Such embodiments of the general illumination lighting device or system 100 can therefore be used for general illumination, and generally not image display or projection. Certain embodiments of the general illumination lighting device or system 100 can be solid state, and can be used for residential, industrial, vehicular applications. A variety of the user control can be digital (e.g., selection from menu), analog (e.g., dial), program (e.g., time of day, ambient general illumination, pre-selected preferences), etc. With certain embodiments of the general illumination lighting device or system 100, the user can control color as well. Certain embodiments of the general illumination lighting device or system 100 can utilize user-entered values for the target spectral and/or time profile of the general illumination lighting. It might be desirable to set the time and/or spectral preferences based on those of one or more other general illumination devices.

Certain embodiments of the general illumination lighting device or system 100 can thereby be configured to combine the general illumination light provided by a gas discharge lamp embodiment of the primary general illumination lighting component 107 with one or more incandescent light embodiment of the LED-based secondary general illumination lighting component 109 (e.g., even providing an incandescent filament or other element(s) 912 approximates a gas discharge embodiment of the primary general illumination lighting component 107. The incandescent output can thereby be controlled relative to the gas discharge output in order that the combined output achieves a desired time and/or spectral output range. Certain embodiments of the general illumination lighting device or system 100 can use the at least one sensor 316 of the sensor and/or control portion 303 to monitor optical characteristics (spectral intensity at one or more colors and/or color), or electric characteristics. For instance, a sensor signal at least partially provided by the at least one sensor 316 of the sensor and/or control portion 303 could be used in the control system to enhance the operation of certain embodiments of the general illumination lighting controller 97, as described with respect to FIGS. 1 to 5 and elsewhere in this disclosure.

2. CERTAIN EMBODIMENTS OF THE GENERAL ILLUMINATION LIGHTING CONTROLLER

This disclosure describes a number of embodiments of the general illumination lighting controller 97 as described with respect to FIGS. 1, 2, 3, 4, and/or 5, as well as other locations in this disclosure, which are intended to control and/or adjust general illumination lighting by the general illumination lighting device or system 100 that includes the at least one primary general illumination lighting component 107 and/or the at least one LED-based secondary general illumination lighting component 109. As such, certain embodiments of the general illumination lighting device or system 100 can operate without interaction from, the general illumination lighting controller 97, as described with respect to FIGS. 1 to 5. By comparison, certain embodiments of the general illumination lighting device or system 100 can utilize considerable input from, and/or entirely utilizing input from, the general illumination lighting controller 97.

Certain embodiments of the general illumination lighting device or system 100, as described with respect to FIGS. 1, 2, 3, 4, and/or 5 as well as other locations in this disclosure, can thereby include the general illumination lighting controller 97; while other embodiments of the general illumination lighting device or system 100 may not include utilizing the general illumination lighting controller such as, for example, those embodiments that many be manually operated or controlled by a person. Certain embodiments of the general illumination lighting device or system 100 may operate at least partially by converting received based photons to into viewable and/or visible to allow direct general illumination lighting. Such direct general illumination lighting may limit the necessity of image processing that may largely rely on the general illumination lighting controller 97. By comparison, certain embodiments of the general illumination lighting device or system 100 can utilize input from the user, such as to determine factors or characteristics relating to the color and/or intensity at one or more colors of the general illumination lighting. Such general illumination lighting characteristics may be selected, controlled, and/or altered using certain embodiments of the general illumination lighting controller 97.

Some imaging and/or information associated with certain embodiments of the general illumination lighting device or system 100 and/or the general illumination lighting controller 97, as described with respect to FIGS. 1 to 5, may be digital based, while other embodiments may be analog based. For instance, certain embodiments of the general illumination lighting device or system 100 including the general illumination lighting controller 97, which are largely digital and/or microprocessor-based, can provide for largely automated actuation of general illumination lighting and/or signals of the general illumination lighting device or system 100. A number of the components of the general illumination lighting device or system 100 may rely on analog and/or digital controllers and/or computers which may be capable of generating signals with sufficient power. Other lower-powered signals from the general illumination lighting device or system 100 may be either analog and/or digitally controlled. Certain general illumination lighting controller 97 that may be configured to turn at least one primary general illumination lighting component 107 and/or at least one LED-based secondary general illumination lighting component 109 on to one or more intensities or off, for example, may be particularly efficient and/or effective if digital based. Certain embodiments of the general illumination lighting controller 97 can be configured to generate or synthesize particular general illumination lighting. FIGS. 1, 2, 3, 4, and/or 5, as well as other locations in this disclosure can represent a block diagram of certain respective embodiments of the general illumination lighting device or system 100 that can include the general illumination lighting controller 97 to either control and/or adjust the general illumination lighting within the general illumination lighting device or system 100, or some other related operations.

A variety of embodiments of the adjustment or control mechanism 302 of FIGS. 34 and 35 can adjust or control a variety of combined general illumination lighting 120 of FIG. 34 (as well as the combined general illumination lighting having different frequency components 120*x*, 120*y*, and 120*z* of FIG. 35). Certain embodiments of the the general illumination lighting device or system 100 can utilize certain embodiments of the general illumination lighting controller 97 to operate the adjustment or control mechanism 302 to adjust or control a variety of combined general illumination lighting 120 of FIG. 34 (as well as the combined general illumination lighting having different frequency components 120*x*, 120*y*, and 120*z* of FIG. 35).

Certain embodiments of the combined general illumination lighting 150 may include at least one LED-based secondary general illumination lighting (as provided by the at least one LED-based secondary general illumination lighting component 109), at least one primary general illumination lighting (as provided by the at least one primary general illumination lighting component 107), and/or the at least one alternate general illumination lighting.

Certain embodiments of the general illumination lighting controller 97, as described with respect to FIGS. 1 to 5, are configured to provide control and/or adjustability of the general illumination lighting device or system 100 based, at least in part, on the general illumination lighting operation and/or configuration of the general illumination lighting device or system 100. For example, if a user wishes to control and/or adjust an angle, a position, a photon frequency or energy level, a resolution, the within the at least one general illumination lighting parameter; then the user could provide suitable input to the general illumination lighting controller 97. Such input to the general illumination lighting controller 97 can be provided via the input/output interface, which in certain embodiments may be a graphical user interface (GUI), for example. Certain embodiments of the input/output interface 811 can additionally provide an indication to the user of some aspect of the general illumination lighting.

Certain embodiments of the general illumination lighting controller 97 can be configured to control the maintaining or adjusting of the optical characteristics (color and/or intensity at one or more colors) of the combined general illumination by the general illumination lighting device or system 100 (which may be produced by the at least one primary general illumination lighting component 107, the at least one LED-based secondary general illumination lighting component 109, and/or at least some alternate general illuminating lighting that may be naturally occurring or man-made. The determination of the general illumination lighting as produced by the at least one primary general illumination lighting component 107, the at least one LED-based secondary general illumination lighting component 109, and/or at least some alternate general illuminating lighting may be measured such as by using a detector after some intensity, color, or intensity change is provided, or alternately may be based on design specifications, and/or tables. As such, certain embodiments of the general illumination lighting controller 97 can be configured to operate such as by "knowing or being able to determine the general illumination lighting that the alternate general illumination lighting device provides (as well as the at least one primary general illumination lighting component 107, and/or the at least one LED-based secondary general illumination lighting component 109), and adjust the particular combined general illumination lighting as such I look at tables, etc. to approach a general illumination lighting target. As such, the at least one LED-based secondary general illumination lighting component 109, and/or at least some alternate general illuminating lighting can be configured in an open loop adjustment and/or control system to make the combined general illumination lighting provided thereby approach some desired, prescribed, or programmed general illumination lighting target.

Alternately, certain embodiments of the general illumination lighting controller 97 can be configured to control the at least one LED-based secondary general illumination lighting component 109 and/or at least some alternate general illuminating lighting can be configured in a closed loop adjustment to make the combined general illumination lighting provided thereby approach some desired, prescribed, or programmed general illumination lighting target. Such closed loop adjustment or control can rely on feedback from one or more sensors, that consider a variety of optical or electric characteristics including, but not limited to: a) sensing electric characteristics of the at least one primary general illumination lighting component, b) sensing optical characteristics (color and/or intensity at one or more colors) of the least one primary general illumination lighting component, or c) sensing combined optical characteristics of the least one primary general illumination lighting component or the at least one secondary general illumination lighting component).

Certain embodiments of the general illumination lighting device or system 100 can thereby include, but are not limited to, a variety 6*f* configurations of the general illumination lighting controller 97, as described with respect to FIGS. 1 to 5. Certain embodiments of the general illumination lighting controller 97 can also be at least partially computer based, controller based, mote based, cellular telephone-based, and/or electronics based. Certain embodiments of the general illumination lighting controller can be segmented into modules, and can utilize a variety of wireless communications and/or networking technologies to allow information, data, etc. to be transferred to the various distinct portions or embodiments of the general illumination lighting device or system 100. Certain embodiments of the general illumination lighting controller 97 can be configured as a unitary device, a networked device, a stand alone device, and/or any combination of these and other known type devices.

Certain embodiments of the general illumination lighting controller 97, as described with respect to FIGS. 1 to 5, can vary as to their automation, complexity, and/or sophistication; and can be utilized to control, setup, establish, and/or maintain communications between multiple communicating devices during general illumination lighting operation(s). As described within this disclosure, multiple ones of the different embodiments of the general illumination lighting device or system 100 can transfer information or data relating to the communication link to or from a remote location and/or some intermediate device as might be associated with communication, monitoring and/or other activities. Certain embodiments of the general illumination lighting device or system 100 can vary as to the particular visualization modality, imaging modality, and/or information providing modality.

Certain embodiments of the general illumination lighting controller 97, as described with respect to FIGS. 1 to 5, as well as certain embodiments of the general illumination lighting device or system 100 (in general), can utilize distinct firmware, hardware, and/or software technology. For example, certain embodiments of the general illumination lighting device or system 100 can at least partially utilize one or more of: mote-based technology, microprocessor-based technology, microcomputer-based technology, display technology, imaging technology, general-purpose computer technology, specific-purpose computer technology, Application-Specific Integrated Circuits (ASICs), and/or a variety of other computer, electronics, electromagnetic, imaging, visualizing, and/or information providing technologies, such as can be utilized by certain embodiments of the visualization, imaging, or information provider controller 97.

Certain embodiments of the general illumination lighting controller 97 can as described with respect to FIGS. 1 to 5, as well as other locations in this disclosure can include depending on context a processor 803 such as a central processing unit (CPU), a memory 807, a circuit or circuit portion 809, and an input output interface (I/O) 811 that may include a bus (not shown). Certain embodiments of the general illumination lighting controller 97 of the general illumination lighting device or system 100 can include and/or be a portion of a general-purpose computer, a specific-purpose computer, a microprocessor, a microcontroller, a personal display assistant (PDA), a cellular phone, a wireless communicating device, a hard-wired communication device, and/or any other known suitable type of communications device or phone, computer, and/or controller that can be implemented in hardware, software, electromechanical devices, and/or firmware. Certain embodiments of the processor 803, as described with respect to FIGS. 1, 2, 3, 4, and/or 5, as well as other locations in this disclosure, can perform the processing and arithmetic operations for certain embodiments of the general illumination lighting controller 97 of the general illumination lighting device or system 100. Certain embodiments of the general illumination lighting controller 97 of the general illumination lighting device or system 100 can control the signal processing, database querying and response, computational, timing, data transfer, and other processes associated with general illumination lighting such as can be adjusted by and/or controlled by certain embodiments of the general illumination lighting controller 97 of the general illumination lighting device or system 100.

Certain embodiments of the general illumination lighting controller 97, as described with respect to FIGS. 1 to 5, (depending in part of the general illumination lighting process being attempted or performed by the general illumination lighting device or system 100), will undergo considerable image processing by the processor 803. Particularly, those embodiments of the general illumination lighting device or system 100 that can visualize, image, and/or provide information relating to a relatively large area, image to relatively high resolution, image continuously, sequentially, and/or repetitively will provide a large amount of images or image information. As such, certain embodiments of the components of the general illumination lighting controller 97 should be designed and configured to handle the type of general illumination and/or lighting. Certain types of image compression (e.g., lossy and/or lossless data compression techniques) may be utilized in the general illumination lighting controller 97 to limit production or storage of excessive volumes of redundant data.

Certain embodiments of the memory 807 of the general illumination lighting controller 97 can include a random access memory (RAM) and/or read only memory (ROM) that together can store the computer programs, operands, and other parameters that control the operation of certain embodiments of the general illumination lighting controller 97 of the general illumination lighting device or system 100. The memory 807 can be configurable to contain data, information, images, visualizations, image information, etc. that can be obtained, retained, or captured by that particular general illumination lighting controller 97, as described in this disclosure.

Certain embodiments of the bus can be configurable to provide for digital information transmissions between the processor 803, circuits 809, memory 807, I/O 811, the visualization, image, and/or provided information memory or storage device (which may be integrated or removable), other portions within the general illumination lighting device or system 100, and/or other portions outside of the general illumination lighting device or system 100. In this disclosure, the memory 807 can be configurable as RAM, flash memory, semiconductor-based memory, of any other type of memory that can be configurable to store data pertaining to depth visualizations, images, and/or provided information. Certain embodiments of the bus can also connects I/O 811 to the portions of certain embodiments of the general illumination lighting controller 97 of either the general illumination lighting device or system 100 that can either receive digital information from, or transmit digital information to other portions of the general illumination lighting device or system 100, or other systems and/or networking components associated therewith.

Certain embodiments of the general illumination lighting controller 97 of the general illumination lighting device or system 100, as described with respect to FIGS. 1, 2, 3, 4, and/or 5, as well as other locations in this disclosure, can include a separate, distinct, combined, and/or associated transmitter portion (not shown) that can be either included as a portion of certain embodiments of the general illumination lighting controller 97 of the general illumination lighting device or system 100. Certain embodiments of the general illumination lighting controller 97 can alternately be provided as a separate and/or combined unit (e.g., certain embodiments might be processor-based and/or communication technology-based).

Certain embodiments of the general illumination lighting controller 97 of the general illumination lighting device or system 100 as described with respect to FIGS. 1, 2, 3, 4, and/or 5, as well as other locations in this disclosure can include an operation altering or controlling portion (described with respect to FIG. 5) that can be either included as a portion of certain embodiments of the general illumination lighting controller 97 of the general illumination lighting device or system 100, or alternately can be provided as a separate or combined unit.

Certain embodiments of the memory 807 can provide an example of a memory storage portion. In certain embodiments, the monitored value includes but is not limited to: a percentage of the memory 807, an indication of data that is or can be stored in the memory 807, or for data storage or recording interval. Such memory can include information about general illumination lighting settings, desired general illumination lighting aspects of the individual(s) using the region, etc.; and also may include one or more general illumination lighting settings as provided by certain embodiments of the general illumination lighting device or system 100.

In certain embodiments, a general illumination lighting communication link can be established between the certain embodiments of the general illumination lighting controller 97, as described with respect to FIGS. 1 to 5, of the general illumination lighting device or system 100. The general illumination lighting communication link can be structured similar to as a communication link, or alternatively can utilize network-based computer connections, Internet connections, etc. to provide information and/or data transfer between certain embodiments of the general illumination lighting controller 97 of the general illumination lighting device or system 100.

In certain embodiments of the general illumination lighting controller 97 of the general illumination lighting device or system 100, the particular elements of certain embodiments of the general illumination lighting controller 97 of the general illumination lighting device or system 100 (e.g., the processor 803, the memory 807, the circuits 809, and/or the I/O 811) can provide a monitoring function to convert raw data as displayed by an indicator. A monitoring function as provided by certain embodiments of the general illumination lighting controller 97 of the general illumination lighting device or system 100 can be compared to a prescribed limit, such as whether the number of settings for general illumination lighting-based information contained in the memory 807, the amount of data contained within the memory 807, or some other measure relating to the memory is approaching some value. The limits to the value can, in different embodiments, be controlled by the user or the manufacturer of certain embodiments of the general illumination lighting controller 97 of the general illumination lighting device or system 100. In certain embodiments, the memory 807 can store such information as data, information, displayable information, readable text, motion depth visualizations, images, and/or provided information, video depth visualizations, images, and/or provided information, and/or audio depth visualizations, images, and/or provided information, etc.

In certain embodiments, the I/O 811 provides an interface to control the transmissions of digital information between each of the components in certain embodiments of the general illumination lighting controller 97 of the general illumination lighting device or system 100. The I/O 811 also provides an interface between the components of certain embodiments of the general illumination lighting controller 97 of the general illumination lighting device or system 100. The circuits 809 can include such other user interface devices as a display and/or a keyboard. In other embodiments, the general illumination lighting controller 97 of the general illumination lighting device or system 100 can be constructed as a specific-purpose computer such as an application-specific integrated circuit (ASIC), a microprocessor, a microcomputer, or other similar devices.

3. CERTAIN EMBODIMENTS OF THE GENERAL ILLUMINATION LIGHTING DEVICE OR SYSTEM WITH RELEVANT FLOWCHARTS

Within the disclosure, flow charts of the type described in this disclosure apply to method steps as performed by a computer or controller as could be contained within certain embodiments of the general illumination lighting device or system 100, as described in this disclosure. Additionally, the flow charts as described in this disclosure apply operations or procedures that can be performed entirely and/or largely utilizing mechanical devices, electromechanical devices, or the like, such as certain embodiments of the general illumination lighting device or system 100 as described in this disclosure. The flow charts can also apply to apparatus devices, such as an antenna or a node associated therewith that can include, e.g., a general-purpose computer or specialized-purpose computer whose structure along with the software, firmware, electromechanical devices, and/or hardware, can perform the process or technique described in the flow chart.

An embodiment of the general illumination lighting device or system 100 that can act to compensate for a distortion by the depth visualizer has been described with respect to FIGS. 1, 2, 3, 4, and/or 5, as well as other locations in this disclosure. There can be a variety of embodiments of the general illumination lighting device or system 100 that can be used to generate general illumination lighting of a at least one particular color and/or a particular intensity of at least one color.

Figure 36:
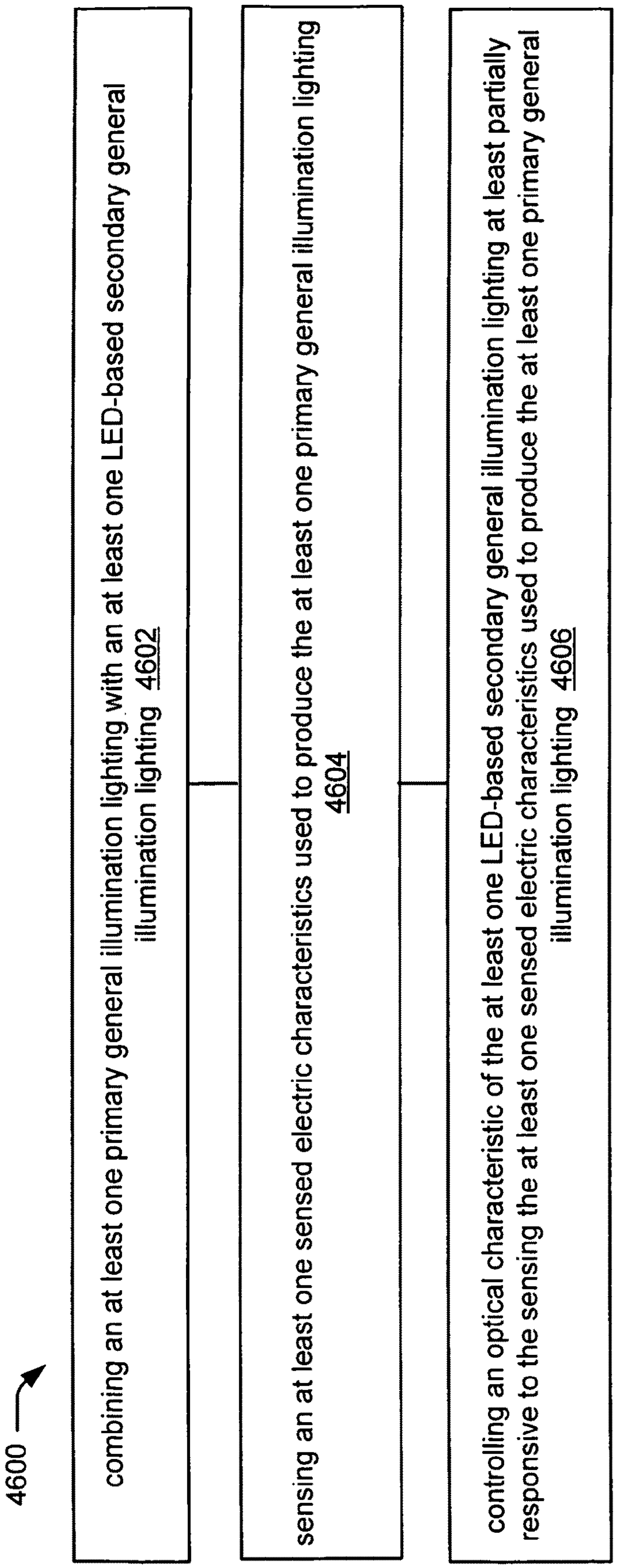
FIG. 36 is a flow chart of one embodiment of a general illumination lighting technique.

FIG. 36 shows certain embodiments of a general illumination lighting technique 4600 such as described with respect to, but not limited to, the general illumination lighting device or system 100 of FIG. 1, and elsewhere in this disclosure. Certain embodiments of a high-level flowchart of the general illumination lighting technique 4600 is described with respect to FIG. 36 and can include, but is not limited to, operations 4602, 4604, and 4606. Certain embodiments of operation 4602 can include, but is not limited to, combining an at least one primary general illumination lighting with an at least one LED-based secondary general illumination lighting. For example, certain embodiments of the at least one LED-based secondary general illumination lighting as provided by the at least one LED-based secondary general illumination lighting component 109 as described with respect to FIG. 1 or 2, as well as other locations in this disclosure can be combined with the at least one at least one primary general illumination lighting as provided by the at least one primary general illumination lighting component 107, which in certain instances can produce a combined general illumination lighting that may be contained within a region and/or directed at a surface. Certain embodiments of the at lest one primary general illumination lighting component can be incandescent-based, gas-discharge-based, LED-based, or some other suitable configuration to provide general illumination lighting. Certain embodiments of operation 4604 can include, but is not limited to, sensing an at least one sensed electric characteristics used to produce the at least one primary general illumination lighting. For example, certain embodiments of the at least one sensor 316 of the sensor and/or control portion 303, as described with respect to FIG. 5, can sense the combined general illumination lighting. Certain embodiments of operation 4606 can include, but is not limited to, controlling an optical characteristic of the at least one LED-based secondary general illumination lighting at least partially responsive to the sensing the at least one sensed electric characteristics used to produce the at least one primary general illumination lighting. Certain of the sensed electric characteristics can, depending on context, include at least one determined electric characteristics, which could be measured, computed, or derived. For example, certain embodiments of the general illumination lighting controller 97 as described with respect to FIGS. 1 to 4, as well as other locations in this disclosure, can control the at least one controlled optical characteristics of the at least one LED-based secondary general illumination lighting at least partially responsive to the sensing the at least one sensed electric characteristics used to produce the at least one primary general illumination lighting.

In one or more various aspects as described with respect to FIGS. 1 to 5, 36, and other locations in this disclosure, related systems include but are not limited to circuitry and/or programming for effecting the herein-referenced method aspects; the circuitry and/or programming can be virtually any combination of hardware, software, electro-mechanical system, and/or firmware configurable to effect the herein-referenced method aspects depending upon the design choices of the system designer.

4. CONCLUSION

This disclosure provides a number of embodiments of the general illumination lighting device or system 100 that can provide a variety of types of general illumination lighting, as described in this disclosure. The embodiments of the general illumination lighting device or system as described with respect to this disclosure are intended to be illustrative in nature, and are not limiting its scope.

Those having skill in the art will recognize that the state of the art in computer, controller, communications, networking, and other similar technologies has progressed to the point where there is little distinction left between hardware, firmware, and/or software implementations of aspects of systems, such as may be utilized in the general illumination lighting device or system. The use of hardware, firmware, and/or software can therefore generally represent (but not always, in that in certain contexts the choice between hardware and software can become significant) a design choice representing cost vs. energy luminescence efficiency tradeoffs. Those having skill in the art will appreciate that there are various vehicles by which processes and/or systems and/or other technologies described herein can be effected (e.g., hardware, software, and/or firmware), and that the preferred vehicle can vary with the context in which the processes and/or systems and/or other technologies are deployed. For example, if an implementer determines that speed and accuracy are paramount, the implementer and/or designer of the general illumination lighting device or system may opt for mainly a hardware and/or firmware implementation to control and/or provide the general illumination lighting. In alternate embodiments, if flexibility is paramount, the implementer and/or designer may opt for mainly a software implementation to control and/or provide the general illumination lighting. In yet other embodiments, the implementer and/or designer may opt for some combination of hardware, software, and/or firmware implementation to control and/or provide the general illumination lighting. Hence, there are several possible techniques by which the processes and/or devices and/or other technologies described herein may be effected, none of which is inherently superior to the other in that any vehicle to be utilized is a choice dependent upon the context in which the vehicle can be deployed and the specific concerns (e.g., speed, flexibility, or predictability) of the implementer, any of which may vary.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, target individual 82 and/or collectively, by a wide range of hardware, software, firmware, or virtually any combination thereof. In certain embodiments, several portions of the general illumination lighting subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the systems of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

All of the above U.S. patents, U.S. patent application publications, U.S. patent applications, foreign patents, foreign patent applications and non-patent publications referred to in this specification and/or listed in any Application Data Sheet, are incorporated herein by reference, in their entireties.

It is to be understood by those skilled in the art that, in general that the terms used in the disclosure, including the drawings and the appended claims (and especially as used in the bodies of the appended claims), are generally intended as "open" terms. For example, the term "including" should be interpreted as "including but not limited to"; the term "having" should be interpreted as "having at least"; and the term "includes" should be interpreted as "includes, but is not limited to"; etc. In this disclosure and the appended claims, the terms "a", "the", and "at least one" positioned prior to one or more goods, items, and/or services are intended to apply inclusively to either one or a plurality of those goods, items, and/or services.

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that could have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that could have A alone, B alone, C alone, A and B together, A and C together, B and C together, and/or A, B, and C together, etc.).

Those skilled in the art will appreciate that the herein-described specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. An apparatus, comprising:

at least one primary general illumination lighting fixture which, when electrically connected with at least one primary general illumination lighting source, is configured to emit at least one primary general illumination lighting;

at least one LED-based secondary general illumination lighting fixture that when electrically connected with at least one LED-based secondary general illumination lighting source is configured to emit at least one LED-based secondary general illumination lighting;

at least one sensor configured to sense at least one sensed electric characteristic of the at least one primary general illumination lighting fixture or the at least one primary general illumination lighting source; and at least one general illumination lighting control circuit configured to control at least one controlled optical characteristic of the at least one LED-based secondary general illumination lighting at least partially responsive to the at least one sensed electric characteristic of the at least one primary general illumination lighting fixture or the at least one primary general illumination lighting source.

2. The apparatus of claim 1, further including:

electrical circuitry configured to determine at least one of a determined characteristic of the at least one general primary general illumination lighting fixture of the at least one primary general lighting source; and wherein the at least one general illumination lighting control circuit configured to control at least one controlled optical characteristic of the at least one LED-based secondary general illumination lighting at least partially responsive to the at least one sensed electric characteristic of the at least one primary general illumination lighting fixture or the at least one primary general illumination lighting source, includes:

at least one general illumination lighting control circuit configured to control the at least one controlled optical characteristic of the at least one LED-based secondary general illumination lighting at least partially responsive to the at least one determined electric characteristic of the at least one primary general illumination lighting fixture or the at least one primary general illumination lighting source, electrical circuitry configured to determine the at least one determined characteristic and;

wherein the at least one controlled optical characteristic of the at least one LED-based secondary general illumination lighting is responsive to the at least one sensed electric characteristic of the at least one primary general illumination lighting fixture or the at least one primary general illumination lighting source.

3. The apparatus of claim 2, wherein the at least one determined electric characteristic is substantially the same as the at least one sensed electric characteristic.

4. The apparatus of claim 2, wherein the electrical circuitry configured to determine the at least one determined electric characteristic is configured to determine at least partially based on determined Fourier components of the at least one sensed electric characteristic.

5. The apparatus of claim 2, wherein the electrical circuitry configured to determine the at least one determined electric characteristic is configured at least partially based on a determined phase difference between two or more sensed electrical characteristics of the sensed electrical characteristics.

6. The apparatus of claim 2, wherein the electrical circuitry configured to determine the at least one determined electric characteristic is configured at least partially based on filtering of at least part of the at least one sensed electrical characteristic.

7. The apparatus of claim 2, wherein the electrical circuitry configured to determine the at least one determined electric characteristic is configured at least partially based on a determined real or imaginary impedance components of the at least one sensed electric characteristic.

8. The apparatus of claim 2, wherein the electrical circuitry configured to determine the at least one determined electric characteristic is configured at least partially based on a determined capacitance components of the at least one sensed electric characteristics.

9. The apparatus of claim 2, wherein the electrical circuitry configured to determine the at least one determined electric characteristic is configured at least partially based on a determined inductance components of the at least one sensed electric characteristics.

10. The apparatus of claim 1, wherein the at least one general illumination lighting control circuit models at least one optical characteristic of the primary general illumination lighting as a function of the at least one electric characteristic.

11. The apparatus of claim 1, wherein the at least one general illumination lighting control circuit models at least one optical characteristic of the primary general illumination lighting as a function of a deviation of the at least one electric characteristic from a reference electrical characteristic.

12. The apparatus of claim 1, wherein the at least one sensor is configured to directly sense the at least one sensed electric characteristic of the at least one primary general illumination lighting fixture or the at least one primary general illumination lighting source.

13. The apparatus of claim 1, wherein the at least one sensor is configured to remotely sense the at least one sensed electric characteristic of the at least one primary general illumination lighting fixture or the at least one primary general illumination lighting source.

14. The apparatus of claim 1, wherein the at least one sensed electrical characteristic is a current.

15. The apparatus of claim 1, wherein the at least one sensed electrical characteristic is a voltage.

16. The apparatus of claim 1, wherein the at least one sensed electrical characteristic is at least one of a capacitance, an inductance, a resistance, a real impedance, an imaginary impedance, or a complex impedance.

17. The apparatus of claim 1, wherein the at least one sensor is configured to capacitively sense the at least one sensed electric characteristic of the at least one primary general illumination lighting fixture or the at least one primary general illumination lighting source.

18. The apparatus of claim 1, wherein the at least one sensor is configured to inductively sense the at least one sensed electric characteristic of the at least one primary general illumination lighting fixture or the at least one primary general illumination lighting source.

19. The apparatus of claim 1, wherein the at least one sensor is configured to sense the at least one sensed electric characteristic of the at least one primary general illumination lighting fixture or the at least one primary general illumination lighting source over a frequency band.

20. The apparatus of claim 1, wherein the at least one primary general illumination lighting fixture and the at least one sensor are included in a modular unit.

21. The apparatus of claim 1, further comprising at least one primary general illumination lighting component that includes the at least one primary general illumination lighting and the at least one primary general illumination lighting source.

22. The apparatus of claim 1, wherein the at least one primary general illumination lighting fixture, the at least one LED-based secondary general illumination lighting fixture, and the at least one sensor are included in a modular unit.

23. The apparatus of claim 1, wherein the at least one LED-based secondary general illumination lighting fixture, and the at least one general illumination lighting control circuit are included in a modular unit.

24. The apparatus of claim 1, wherein the at least one primary general illumination lighting fixture, the at least one sensor, and the at least one general illumination lighting control circuit are included in a modular unit.

25. The apparatus of claim 1, wherein the at least one primary general illumination lighting fixture, the at least one LED-based secondary general illumination lighting fixture, the at least one sensor, and the at least one general illumination lighting control circuit are included in a modular unit.

26. The apparatus of claim 1, further comprising an at least one LED-based secondary general illumination lighting component that includes the at least one LED-based secondary general illumination lighting fixture and the at least one LED-based secondary general illumination lighting source.

27. The apparatus of claim 1, wherein the at least one general illumination lighting control circuit configured to control at least one controlled optical characteristics of the at least one LED-based secondary general illumination lighting, comprises:

the at least one general illumination lighting control circuit configured to control at least one color of the at least one LED-based secondary general illumination lighting.

28. The apparatus of claim 1, wherein the at least one general illumination lighting control circuit configured to control at least one controlled optical characteristics of the at least one LED-based secondary general illumination lighting, comprises:

the at least one general illumination lighting control circuit configured to control at least one intensity of the at least one LED-based secondary general illumination lighting.

29. The apparatus of claim 1, wherein the at least one general illumination lighting control circuit configured to control at least one controlled optical characteristic of the at least one LED-based secondary general illumination lighting, comprises:

the at least one general illumination lighting control circuit configured to control at least one spectral intensity of the at least one LED-based secondary general illumination lighting.

30. The apparatus of claim 1, wherein the at least one general illumination lighting control circuit configured to control at least one controlled optical characteristic of the at least one LED-based secondary general illumination lighting, comprises:

the at least one general illumination lighting control circuit configured to control at least one time averaged optical characteristic of the at least one LED-based secondary general illumination lighting.

31. The apparatus of claim 1, further comprising at least one sensor configured to sense one or more sensed optical characteristics of the at least one primary general illumination lighting.

32. The apparatus of claim 1, further comprising at least one sensor configured to sense one or more sensed optical characteristics of the at least one LED-based secondary general illumination lighting.

33. The apparatus of claim 1, further comprising at least one sensor configured to sense one or more sensed optical characteristics of the at least one primary general illumination lighting as combined with the at least one LED-based secondary general illumination lighting.

34. An apparatus, comprising:

at least one primary general illumination lighting fixture which, when electrically connected with at least one primary general illumination lighting source, is configured to emit at least one primary general illumination lighting;

at least one LED-based secondary general illumination lighting fixture that when electrically connected with at least one LED-based secondary general illumination lighting source is configured to emit at least one LED-based secondary general illumination lighting;

at least one sensor configured to sense at least one sensed electric characteristic of the at least one primary general illumination lighting fixture or the at least one primary general illumination lighting source; and at least one targeting general illumination lighting control circuit configured to control at least one controlled optical characteristic of the at least one LED-based secondary general illumination lighting at least partially responsive to the at least one sensed electric characteristic of the at least one primary general illumination lighting fixture or the at least one primary general illumination lighting source and at least partially responsive to at least one general illumination lighting target.

35. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control the at least one controlled optical characteristic of the at least one LED-based secondary general illumination lighting so at least one color of the at least one LED-based secondary general illumination lighting as combined with the at least one primary general illumination lighting substantially matches a color of the at least one general illumination lighting target.

36. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control the at least one controlled optical characteristic of the at least one LED-based secondary general illumination lighting in such a manner so at least one intensity of the at least one LED-based secondary general illumination lighting as combined with the at least one primary general illumination lighting substantially matches an intensity of the at least one general illumination lighting target.

37. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control the at least one controlled optical characteristic of the at least one LED-based secondary general illumination lighting in such a manner so at least one spectral intensity of the at least one LED-based secondary general illumination lighting as combined with the at least one primary general illumination lighting substantially matches a spectral intensity of the at least one general illumination lighting target.

38. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control the at least one controlled optical characteristic of the at least one LED-based secondary general illumination lighting so at least one color of the at least one LED-based secondary general illumination lighting as combined with the at least one primary general illumination lighting substantially corresponds to a function of one or more optical characteristics of the at least one general illumination lighting target.

39. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control the at least one controlled optical characteristic of the at least one LED-based secondary general illumination lighting so at least one intensity of the at least one LED-based secondary general illumination lighting as combined with the at least one primary general illumination lighting substantially corresponds to a function of one or more optical characteristics of the at least one general illumination lighting target.

40. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control the at least one controlled optical characteristic of the at least one LED-based secondary general illumination lighting so at least one spectral intensity of the at least one LED-based secondary general illumination lighting as combined with the at least one primary general illumination lighting substantially corresponds to a function of one or more optical characteristics of the at least one general illumination lighting target.

41. The apparatus of claim 40, wherein the function of one or more optical characteristics of the at least one general illumination lighting target comprises one or more color characteristics of the at least one general illumination lighting target.

42. The apparatus of claim 40, wherein the function of one or more optical characteristics of the at least one general illumination lighting target comprises one or more intensity characteristics of the at least one general illumination lighting target.

43. The apparatus of claim 40, wherein the function of one or more optical characteristics of the at least one general illumination lighting target comprises one or more spectral intensity characteristics of the at least one general illumination lighting target.

44. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control at least one time averaged optical characteristic of the at least one LED-based secondary general illumination lighting.

45. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control at least one color of the at least one LED-based secondary general illumination lighting.

46. The apparatus of claim 34, wherein the at least one targeting general illumination lighting control circuit configured to control at least one controlled optical characteristic of the at least one LED-based secondary general illumination lighting, comprises:

the at least one targeting general illumination lighting control circuit configured to control at least one intensity of the at least one LED-based secondary general illumination lighting.

47. The apparatus of claim 34, wherein the at least one targeting general illumination lighting control circuit configured to control at least one controlled optical characteristics of the at least one LED-based secondary general illumination lighting, comprises:

the at least one targeting general illumination lighting control circuit configured to control at least one spectral intensity of the at least one LED-based secondary general illumination lighting.

48. The apparatus of claim 34, wherein the at least one general illumination lighting target is configured to substantially correspond to the at least one primary general illumination lighting.

49. The apparatus of claim 34, wherein the at least one general illumination lighting target is configured to substantially correspond to the at least one primary general illumination lighting as combined with the at least one LED-based secondary general illumination lighting.

50. The apparatus of claim 34, wherein the at least one general illumination lighting target is configured to substantially correspond to the at least one alternate general illumination lighting.

51. The apparatus of claim 34, wherein the at least one targeting general illumination lighting control circuit has an onboard memory storing one or more controlled optical characteristics of the at least one general illumination lighting target.

52. The apparatus of claim 34, wherein the at least one targeting general illumination lighting control circuit has a receiver configured to acquire one or more characteristics of the at least one general illumination lighting target.

53. A method, comprising:

combining at least one primary general illumination lighting with at least one LED-based secondary general illumination lighting;

sensing at least one sensed electric characteristic used to produce the at least one primary general illumination lighting; and controlling optical characteristics of the at least one LED-based secondary general illumination lighting at least partially responsive to the sensing the at least one sensed electric characteristic used to produce the at least one primary general illumination lighting.

54. The method of claim 53, wherein the controlling optical characteristic of the at least one LED-based secondary general illumination lighting at least partially responsive to the sensing the at least one sensed electric characteristic comprises:

controlling an optical characteristic of the at least one LED-based secondary general illumination lighting at least partially responsive to deriving at least one derived electric characteristic and wherein the deriving the at least one derived electrical characteristic is performed in response to the sensing the at least one sensed electric characteristic.

55. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a color of the at least one LED-based secondary general illumination lighting.

56. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling intensity of the at least one LED-based secondary general illumination lighting.

57. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a spectral intensity of the at least one LED-based secondary general illumination lighting.

58. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a time averaged optical characteristic of the at least one LED-based secondary general illumination lighting.

59. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a color of the at least one LED-based secondary general illumination lighting so at least one color of the at least one LED-based secondary general illumination lighting as combined with the at least one primary general illumination lighting substantially matches a color of at least one general illumination lighting target.

60. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling an intensity of the at least one LED-based secondary general illumination lighting so at least one intensity of the at least one LED-based secondary general illumination lighting as combined with the at least one primary general illumination lighting substantially matches intensity of at least one general illumination lighting target.

61. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a spectral intensity of the at least one LED-based secondary general illumination lighting so at least one spectral intensity of the at least one LED-based secondary general illumination lighting as combined with the at least one primary general illumination lighting substantially matches a spectral intensity of at least one general illumination lighting target.

62. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a color of the at least one LED-based secondary general illumination lighting so at least one color of the at least one LED-based secondary general illumination lighting as combined with the at least one primary general illumination lighting substantially matches a function of one or more optical characteristics of at least one general illumination lighting target.

63. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling an intensity of the at least one LED-based secondary general illumination lighting so at least one intensity of the at least one LED-based secondary general illumination lighting as combined with the at least one primary general illumination lighting substantially matches a function of one or more optical characteristics of at least one general illumination lighting target.

64. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling a spectral intensity of the at least one LED-based secondary general illumination lighting so at least one spectral intensity of the at least one LED-based secondary general illumination lighting as combined with the at least one primary general illumination lighting substantially matches a function of one or more optical characteristics of at least one general illumination lighting target.

65. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling the optical characteristics of the at least one LED-based secondary general illumination lighting so at least one spectral feature of the at least one LED-based secondary general illumination lighting as combined with the at least one primary general illumination lighting is enhanced relative to that of at least one general illumination lighting target.

66. The method of claim 53, wherein the controlling at least one optical characteristic of the at least one LED-based secondary general illumination lighting at least partially responsive to the sensing the at least one electric characteristic used to produce the at least one primary general illumination lighting comprises:

controlling the optical characteristics of the at least one LED-based secondary general illumination lighting so at least one spectral feature of the at least one LED-based secondary general illumination lighting as combined with the at least one primary general illumination lighting is limited relative to that of at least one general illumination lighting target.

67. The method of claim 53, wherein the sensing the at least one electric characteristic of the at least one primary general illumination lighting comprises:

sensing a voltage associated with a primary general illumination component.

68. The method of claim 53, wherein the sensing the at least one electric characteristics of the at least one primary general illumination lighting comprises:

sensing a current associated with a primary general illumination component.

69. The method of claim 53, wherein the sensing the at least one electric characteristic of the at least one primary general illumination lighting comprises:

sensing at least one of a capacitance, an inductance, a resistance, a real impedance, an imaginary impedance, or a complex impedance associated with a primary general illumination component.

70. The method of claim 53, wherein the deriving the at least one derived electrical characteristic comprises:

computing the least one derived electrical characteristic in response to the sensing the at least one sensed electric characteristics.

71. The method of claim 53, wherein the deriving the at least one derived electrical characteristic is at least partially based on one or more determined Fourier components of the at least one sensed electric characteristic.

72. The method of claim 53, wherein the deriving the at least one derived electrical characteristic is at least partially based on filtering of at least part of the at least one sensed electric characteristic.

73. The method of claim 53, further comprising:

sensing one or more optical characteristics of the at least one primary general illumination lighting.

74. The method of claim 53, further comprising:

sensing one or more optical characteristics of at least one general illumination lighting target.

75. The method of claim 53, further comprising:

sensing one or more optical characteristics of the at least one LED-based secondary general illumination lighting as combined with the at least one primary general illumination lighting.

* * * * *